(12) United States Patent
Takemoto et al.

(10) Patent No.: US 12,447,173 B2
(45) Date of Patent: *Oct. 21, 2025

(54) PHARMACEUTICAL COMPOSITION CONTAINING DOUBLE-STRANDED RIBONUCLEIC ACID INHIBITING EXPRESSION OF COMPLEMENT C5

(71) Applicant: Eisai R&D Management Co., Ltd., Tokyo (JP)

(72) Inventors: Seiji Takemoto, Nagoya (JP); Shuntaro Arase, Mizuho (JP); Yuta Suzuki, Tsukuba (JP)

(73) Assignee: Eisai R&D Management Co., Ltd., Tokyo (JP)

( * ) Notice: Subject to any disclaimer, the term of this patent is extended or adjusted under 35 U.S.C. 154(b) by 698 days.

This patent is subject to a terminal disclaimer.

(21) Appl. No.: 17/768,283

(22) PCT Filed: Dec. 24, 2020

(86) PCT No.: PCT/JP2020/048441
§ 371 (c)(1),
(2) Date: Apr. 12, 2022

(87) PCT Pub. No.: WO2021/132462
PCT Pub. Date: Jul. 1, 2021

(65) Prior Publication Data
US 2024/0050462 A1    Feb. 15, 2024

(30) Foreign Application Priority Data

Dec. 26, 2019   (JP) ................................ 2019-236918

(51) Int. Cl.
| C07H 21/02 | (2006.01) |
| A61K 9/107 | (2006.01) |
| A61K 9/1272 | (2025.01) |
| A61K 31/713 | (2006.01) |
| A61P 13/02 | (2006.01) |

(52) U.S. Cl.
CPC ............ *A61K 31/713* (2013.01); *A61K 9/107* (2013.01); *A61K 9/1272* (2013.01); *A61P 13/02* (2018.01)

(58) Field of Classification Search
CPC .......................... C12N 15/113; C12N 2310/14
See application file for complete search history.

(56) References Cited

U.S. PATENT DOCUMENTS

| 10,526,603 | B1 | 1/2020 | Suzuki et al. |
| 2015/0247143 | A1 | 9/2015 | Fitzgerald et al. |
| 2016/0237438 | A1 | 8/2016 | Brown et al. |
| 2016/0326116 | A1 | 11/2016 | Suzuki et al. |
| 2017/0253874 | A1 | 9/2017 | Borodovsky et al. |
| 2018/0169132 | A1 | 6/2018 | Borodovsky |
| 2019/0218180 | A1 | 7/2019 | Suzuki et al. |

FOREIGN PATENT DOCUMENTS

| CN | 105324485 | 2/2016 |
| CN | 105916839 | 8/2016 |
| CN | 109311809 | 2/2019 |
| EP | 3312281 | 6/2018 |
| EP | 3871680 | 9/2021 |
| JP | 2016-518331 | 6/2016 |
| JP | 6725776 | 6/2020 |
| RU | 2016147047 | 6/2018 |
| RU | 2670988 | 10/2018 |
| WO | WO 2014/160129 | 10/2014 |
| WO | WO 2015/105131 | 7/2015 |
| WO | WO 2015/191951 | 12/2015 |
| WO | WO 2016/040589 | 3/2016 |
| WO | WO 2016/044419 | 3/2016 |
| WO | WO 2016/201301 | 12/2016 |
| WO | WO 2017/214518 | 12/2017 |
| WO | WO 2017/222016 | 12/2017 |
| WO | WO 2019/014360 | 1/2019 |
| WO | WO 2020/085456 | 4/2020 |

OTHER PUBLICATIONS

Office Action in Chinese Patent Application No. 201980063326.X, dated Aug. 24, 2023, 13 pages (with English Translation).
Office Action in Chinese Patent Application No. 202080083622.9, dated Aug. 30, 2023, 14 pages (with English Translation).
Notice of Allowance in Taiwanese Patent Application No. 110101897, dated Jul. 5, 2023, 7 pages (with English Translation).
Notice of Allowance in Chinese Patent Application No. 201980063326. X, dated May 15, 2024, 2 pages (with English Translation).
Notice of Allowance in South African Patent Application No. 2021/02104, dated Jun. 2, 2022, 2 pages.
Office Action in Chilean Patent Application No. 202100826, dated Apr. 3, 2023, 44 pages (with English Translation).
Office Action in Gulf Cooperation Council Patent Application No. GC2019-38533, dated Apr. 30, 2023, 2 pages (with English Translation).
Notice of Allowance in Taiwanese Patent Application No. 110101897, dated Jul. 1, 2023, 7 pages (with English Translation).
Office Action in Columbian Patent Application No. NC2021/0004029, dated Jul. 24, 2023, 16 pages (with English Translation).
Submission Document in Chilean Patent Application No. 202100826, dated Jul. 3, 2023, 14 pages (with English Translation).
Submission Document in Chilean Patent Application No. 202301965, dated Jul. 3, 2023, 4 pages (with English Translation).
Submission Document in Gulf Cooperation Council Patent Application No. GC2019-38533, dated Jun. 14, 2023, 680 pages (with English Translation).
Notice of Allowance in Chinese Patent Application No. 202080083622. 9, dated Jun. 10, 2024, 4 pages (with English Translation).
Notice of Allowance in Israeli Patent Application No. 281902, dated Feb. 9, 2022, 3 pages (with English Translation).

(Continued)

Primary Examiner — Amy Rose Hudson
(74) Attorney, Agent, or Firm — Fish & Richardson P.C.

(57) ABSTRACT

Disclosed is a pharmaceutical composition comprising a lipid complex, wherein the lipid complex comprises a double-stranded ribonucleic acid comprising a sense strand consisting of a nucleotide sequence set forth in SEQ ID NO: 145 and an antisense strand consisting of a nucleotide sequence set forth in SEQ ID NO: 146, and a pH of a solution of the lipid complex is 5.0 or less, or 7.5 or more.

20 Claims, 6 Drawing Sheets

Specification includes a Sequence Listing.

(56) References Cited

OTHER PUBLICATIONS

Notice of Allowance in Japanese Patent Application No. P2020-215326, dated Jul. 13, 2021, 7 pages (with English Translation).
Notice of Allowance in Japanese Patent Application No. P2020-500919, dated Jun. 2, 2020, 6 pages (with English Translation).
Notice of Allowance in Japanese Patent Application No. P2021-534788, dated Sep. 21, 2021, 8 pages (with English Translation).
Notice of Allowance in Taiwanese Patent Application No. 108138380, dated Nov. 27, 2020, 5 pages (with English Translation).
Notice of Allowance in U.S. Appl. No. 16/354,916, dated Jul. 19, 2019, 8 pages.
Notice of Allowance in U.S. Appl. No. 16/354,916, dated Sep. 18, 2019, 5 pages.
Office Action in Gulf Cooperation Council Patent Application No. GC2019-38533, dated Jan. 2, 2021, 7 pages (with English Translation).
Office Action in Israeli Patent Application No. 281902, dated Oct. 17, 2021, 5 pages (with English Translation).
Office Action in Japanese Patent Application No. P2020-500919, dated Mar. 10, 2020, 7 pages (with English Translation).
Office Action in Pakistani Patent Application No. 711/2019, dated Oct. 8, 2020, 3 pages.
Office Action in Taiwanese Patent Application No. 108138380, dated Aug. 20, 2020, 6 pages (with English Translation).
Office Action in U.S. Appl. No. 16/354,916, dated May 9, 2019, 7 pages.
Submission Document in Gulf Cooperation Council Patent Application No. GC2019-38533, dated Mar. 30, 2021, 10 pages (with English Translation).
Submission Document in Israeli Patent Application No. 281902, dated Feb. 8, 2022, 11 pages (with English Translation).
Submission Document in Japanese Patent Application No. P2020-500919, dated Apr. 28, 2020, 10 pages (with English Translation).
Submission Document in Taiwanese Patent Application No. 108138380, dated Sep. 24, 2020, 11 pages (with English Translation).
Submission Document in U.S. Appl. No. 16/354,916, dated Jun. 21, 2019, 3 pages.
Submission Document in U.S. Appl. No. 16/354,916, dated Sep. 6, 2019, 15 pages.
Office Action in Vietnamese Patent Application No. 1-2021-01795, dated Aug. 23, 2023, 4 pages (with English Translation).
Submission Document in European Patent Application No. 20906116.7, dated Mar. 3, 2025, 136 pages.
Office Action in European Patent Application No. 20906116.7, dated Dec. 4, 2024, 7 pages.
Notice of Allowance in Russian Patent Application No. 2022114885, dated Dec. 2, 2024, 17 pages (with English translation).
Submission Document in Brazilian Patent Application No. BR1120220107420, dated Oct. 26, 2022, 23 pages (with English Translation).
Submission Document in Chilean Patent Application No. 202100826, dated Dec. 27, 2022, 153 pages (with English Translation).
Office Action in Chilean Patent Application No. 202100826, dated Sep. 29, 2022, 36 pages (with English Translation).
Search Report in European Patent Application No. 20906116.7, dated Jan. 25, 2024, 6 pages.
Submission Document in Korean Patent Application No. 10-2022-7018069, dated Jul. 28, 2022, 12 pages (with English Translation).
Submission Document in Indonesian Patent Application No. P00202102558, dated Feb. 3, 2023, 10 pages (with English Translation).
Submission Document in Vietnamese Patent Application No. 1-2021-01795, dated Oct. 26, 2023, 14 pages (with English Translation).
Ball et al., "Achieving long-term stability of lipid nanoparticles: examining the effect of pH, temperature, and lyophilization," International Journal of Nanomedicine, 2017, 12:305-315.
Hillmen et al., "Effect of Eculizumab on Hemolysis and Transfusion Requirements in Patients with Paroxysmal Nocturnal Hemoglobinuria," The New England Journal of Medicine, 2004, 350(6):552-559.
Howard Jr. et al., "A randomized, double-blind, placebo-controlled phase II study of eculizumab in patients with refractory generalized myasthenia gravis," Muscle & Nerve, 2013, 48(1):76-84.
International Preliminary Report on Patentability in International Appln. No. PCT/JP2019/041783, dated May 6, 2021, 9 pages.
International Search Report in International Appln. No. PCT/JP2019/041783, dated Jan. 21, 2020, 2 pages.
International Search Report in International Appln. No. PCT/JP2020/048441, dated Mar. 2, 2021, 3 pages.
Lengendre et al., "Terminal Complement Inhibitor Eculizumab in Atypical Hemolytic-Uremic Syndrome," The New England Journal of Medicine, 2013, 368(23):2169-2181.
Office Action in Russian Patent Application No. 2021108956, dated Apr. 15, 2022, 15 pages (with English Translation).
Pittock et al., "Eculizumab in AQP4-IgG-positive relapsing neuromyelitis optica spectrum disorders: an open-label pilot study," The Lancet Neurology, 2013, 12(6):554-562.
Stegall et al., "Terminal complement inhibition decreases antibody-mediated rejection in sensitized renal transplant recipients," American Journal of Transplantation, 2011, 11:2405-2413.
Submission Document in Russian Patent Application No. 2022114885, dated Jun. 14, 2024, 22 page (with English Translation).
Office Action in Indonesian Patent Application No. P00202102558, dated Nov. 4, 2022, 7 pages (with English Translation).
Notice of Allowance in Israeli Patent Application No. 281902, dated Jun. 2, 2022, 4 pages.
Submission Document in European Patent Application No. 19876529.9, dated Dec. 8, 2022, 152 pages.
Notice of Allowance in Vietnamese Patent Application No. 1-2021-01795, dated May 2, 2024, 2 pages (with English Translation).
Office Action in Russian Patent Application No. 2022114885, dated Mar. 15, 2024, 16 pages (with English Translation).
Risitano et al., "Toward complement inhibition 2.0: Next generation anticomplement agents for paroxysmal nocturnal hemoglobinuria," Am J Hematol, 2018, 93(4):564-577.
Submission Document in European Patent Application No. 20906116.7, dated Jul. 29, 2024, 1 page.
Submission Document in Chinese Patent Application No. 201980063326.X, dated Dec. 5, 2023, 6 pages (with English Translation).
Submission Document in Chinese Patent Application No. 202080083622.9, dated Dec. 7, 2023, 8 pages (with English Translation).
Submission Document in Russian Patent Application No. 2022114885, dated Nov. 1, 2023, 13 pages (with English Translation).
Notice of Allowance in Russian Patent Application No. 2021108956, dated Sep. 1, 2022, 16 pages (with English Translation).
Search Report in European Patent Application No. 19876529.9, dated Aug. 19, 2022, 5 pages.
Submission Document in Australian Patent Application No. 2020413311, dated Aug. 29, 2022, 11 pages.
Office Action in Russian Patent Application No. 2022114885, dated Jul. 24, 2024, 10 pages (with English Translation).
International Preliminary Report on Patentability in International Appln. No. PCT/JP2020/048441, dated Jul. 7, 2022, 8 pages.
Notice of Allowance in Indonesian Patent Application No. P00202102558, dated Mar. 7, 2023, 4 pages (with English Translation).
Office Action in Egyptian Patent Application No. PCT543/2021, dated Feb. 19, 2023, 12 pages (with English Translation).
Submission Document in Singaporean Patent Application No. 11202102881P, dated Apr. 3, 2023, 14 pages.
Notice of Allowance in European Patent Application No. 19876529.9, Oct. 5, 2023, 9 pages.
Submission Document in Russian Patent Application No. 2022114885, dated Oct. 15, 2024, 17 pages (with English Translation).
Submission Document in Russian Patent Application No. 2021108956, dated Jul. 4, 2022, 11 pages (with English Translation).

SEQUENCE LISTING

```
<160> NUMBER OF SEQ ID NOS: 172

<210> SEQ ID NO 1
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (4)..(4)
<223> OTHER INFORMATION: cm
<220> FEATURE:
<221> NAME/KEY: misc_feature
<222> LOCATION: (10)..(10)
<223> OTHER INFORMATION: um
<220> FEATURE:
<221> NAME/KEY: misc_feature
<222> LOCATION: (12)..(13)
<223> OTHER INFORMATION: um
<220> FEATURE:
<221> NAME/KEY: misc_feature
<222> LOCATION: (14)..(14)
<223> OTHER INFORMATION: cm
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 1
aggcaaaggu guucaaagan n                                              21

<210> SEQ ID NO 2
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (9)..(9)
<223> OTHER INFORMATION: cm
<220> FEATURE:
<221> NAME/KEY: misc_feature
<222> LOCATION: (20)..(21)
```

```
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 2
ucuuugaaca ccuuugccun n                                              21

<210> SEQ ID NO 3
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (1)..(1)
<223> OTHER INFORMATION: cm
<220> FEATURE:
<221> NAME/KEY: misc_feature
<222> LOCATION: (2)..(2)
<223> OTHER INFORMATION: um
<220> FEATURE:
<221> NAME/KEY: misc_feature
<222> LOCATION: (4)..(4)
<223> OTHER INFORMATION: um
<220> FEATURE:
<221> NAME/KEY: misc_feature
<222> LOCATION: (5)..(5)
<223> OTHER INFORMATION: cm
<220> FEATURE:
<221> NAME/KEY: misc_feature
<222> LOCATION: (6)..(7)
<223> OTHER INFORMATION: um
<220> FEATURE:
<221> NAME/KEY: misc_feature
<222> LOCATION: (10)..(10)
<223> OTHER INFORMATION: cm
<220> FEATURE:
<221> NAME/KEY: misc_feature
<222> LOCATION: (11)..(13)
<223> OTHER INFORMATION: um
<220> FEATURE:
<221> NAME/KEY: misc_feature
<222> LOCATION: (14)..(14)
<223> OTHER INFORMATION: cm
<220> FEATURE:
<221> NAME/KEY: misc_feature
<222> LOCATION: (16)..(16)
<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 3
cugucuuaac uuucauagan n                                              21

<210> SEQ ID NO 4
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (3)..(3)
<223> OTHER INFORMATION: um
<220> FEATURE:
<221> NAME/KEY: misc_feature
```

```
<222> LOCATION: (12)..(12)
<223> OTHER INFORMATION: um
<220> FEATURE:
<221> NAME/KEY: misc_feature
<222> LOCATION: (17)..(17)
<223> OTHER INFORMATION: cm
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 4
ucuaugaaag uuaagacagn n                                                 21

<210> SEQ ID NO 5
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (1)..(1)
<223> OTHER INFORMATION: um
<220> FEATURE:
<221> NAME/KEY: misc_feature
<222> LOCATION: (4)..(4)
<223> OTHER INFORMATION: cm
<220> FEATURE:
<221> NAME/KEY: misc_feature
<222> LOCATION: (6)..(6)
<223> OTHER INFORMATION: um
<220> FEATURE:
<221> NAME/KEY: misc_feature
<222> LOCATION: (8)..(8)
<223> OTHER INFORMATION: um
<220> FEATURE:
<221> NAME/KEY: misc_feature
<222> LOCATION: (10)..(11)
<223> OTHER INFORMATION: cm
<220> FEATURE:
<221> NAME/KEY: misc_feature
<222> LOCATION: (14)..(14)
<223> OTHER INFORMATION: cm
<220> FEATURE:
<221> NAME/KEY: misc_feature
<222> LOCATION: (15)..(15)
<223> OTHER INFORMATION: um
<220> FEATURE:
<221> NAME/KEY: misc_feature
<222> LOCATION: (17)..(17)
<223> OTHER INFORMATION: cm
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 5
uagcaugugc cagcuacaan n                                                 21

<210> SEQ ID NO 6
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
```

```
<221> NAME/KEY: misc_feature
<222> LOCATION: (4)..(4)
<223> OTHER INFORMATION: um
<220> FEATURE:
<221> NAME/KEY: misc_feature
<222> LOCATION: (11)..(11)
<223> OTHER INFORMATION: cm
<220> FEATURE:
<221> NAME/KEY: misc_feature
<222> LOCATION: (13)..(13)
<223> OTHER INFORMATION: cm
<220> FEATURE:
<221> NAME/KEY: misc_feature
<222> LOCATION: (18)..(18)
<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 6
uuguagcugg cacaugcuan n                                              21

<210> SEQ ID NO 7
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (1)..(1)
<223> OTHER INFORMATION: cm
<220> FEATURE:
<221> NAME/KEY: misc_feature
<222> LOCATION: (2)..(2)
<223> OTHER INFORMATION: um
<220> FEATURE:
<221> NAME/KEY: misc_feature
<222> LOCATION: (4)..(4)
<223> OTHER INFORMATION: um
<220> FEATURE:
<221> NAME/KEY: misc_feature
<222> LOCATION: (7)..(8)
<223> OTHER INFORMATION: um
<220> FEATURE:
<221> NAME/KEY: misc_feature
<222> LOCATION: (13)..(14)
<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 7
cugugauugg aauuagaaan n                                              21

<210> SEQ ID NO 8
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (5)..(5)
<223> OTHER INFORMATION: um
```

-continued

```
<220> FEATURE:
<221> NAME/KEY: misc_feature
<222> LOCATION: (11)..(11)
<223> OTHER INFORMATION: cm
<220> FEATURE:
<221> NAME/KEY: misc_feature
<222> LOCATION: (15)..(15)
<223> OTHER INFORMATION: cm
<220> FEATURE:
<221> NAME/KEY: misc_feature
<222> LOCATION: (17)..(17)
<223> OTHER INFORMATION: cm
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 8
uuucuaauuc caaucacagn n                                              21

<210> SEQ ID NO 9
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (5)..(5)
<223> OTHER INFORMATION: cm
<220> FEATURE:
<221> NAME/KEY: misc_feature
<222> LOCATION: (11)..(11)
<223> OTHER INFORMATION: um
<220> FEATURE:
<221> NAME/KEY: misc_feature
<222> LOCATION: (13)..(14)
<223> OTHER INFORMATION: um
<220> FEATURE:
<221> NAME/KEY: misc_feature
<222> LOCATION: (15)..(15)
<223> OTHER INFORMATION: cm
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 9
aaggcaaagg uguucaaagn n                                              21

<210> SEQ ID NO 10
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (8)..(8)
<223> OTHER INFORMATION: cm
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
```

<223> OTHER INFORMATION: phosphorothioate bond

<400> SEQUENCE: 10
cuuugaacac cuuugccuun n                                                    21

<210> SEQ ID NO 11
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (9)..(9)
<223> OTHER INFORMATION: cm
<220> FEATURE:
<221> NAME/KEY: misc_feature
<222> LOCATION: (10)..(10)
<223> OTHER INFORMATION: um
<220> FEATURE:
<221> NAME/KEY: misc_feature
<222> LOCATION: (12)..(14)
<223> OTHER INFORMATION: um
<220> FEATURE:
<221> NAME/KEY: misc_feature
<222> LOCATION: (16)..(16)
<223> OTHER INFORMATION: cm
<220> FEATURE:
<221> NAME/KEY: misc_feature
<222> LOCATION: (19)..(19)
<223> OTHER INFORMATION: cm
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 11
gaaaggaacu guuuacaacn n                                                    21

<210> SEQ ID NO 12
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (5)..(5)
<223> OTHER INFORMATION: um
<220> FEATURE:
<221> NAME/KEY: misc_feature
<222> LOCATION: (9)..(9)
<223> OTHER INFORMATION: cm
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 12
guuguaaaca guuccuuucn n                                                    21

<210> SEQ ID NO 13
<211> LENGTH: 21
<212> TYPE: RNA
<213> ORGANISM: Artificial Sequence

```
<220> FEATURE:
<223> OTHER INFORMATION: synthesized siRNA sense sequence
<220> FEATURE:
<221> NAME/KEY: misc_feature
<222> LOCATION: (1)..(1)
<223> OTHER INFORMATION: um
<220> FEATURE:
<221> NAME/KEY: misc_feature
<222> LOCATION: (4)..(4)
<223> OTHER INFORMATION: um
<220> FEATURE:
<221> NAME/KEY: misc_feature
<222> LOCATION: (6)..(6)
<223> OTHER INFORMATION: um
<220> FEATURE:
<221> NAME/KEY: misc_feature
<222> LOCATION: (8)..(8)
<223> OTHER INFORMATION: um
<220> FEATURE:
<221> NAME/KEY: misc_feature
<222> LOCATION: (10)..(10)
<223> OTHER INFORMATION: um
<220> FEATURE:
<221> NAME/KEY: misc_feature
<222> LOCATION: (12)..(13)
<223> OTHER INFORMATION: um
<220> FEATURE:
<221> NAME/KEY: misc_feature
<222> LOCATION: (15)..(15)
<223> OTHER INFORMATION: cm
<220> FEATURE:
<221> NAME/KEY: misc_feature
<222> LOCATION: (16)..(16)
<223> OTHER INFORMATION: um
<220> FEATURE:
<221> NAME/KEY: misc_feature
<222> LOCATION: (19)..(19)
<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 13
ugguauaugu guugcugaun n                                              21

<210> SEQ ID NO 14
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (3)..(3)
<223> OTHER INFORMATION: cm
<220> FEATURE:
<221> NAME/KEY: misc_feature
<222> LOCATION: (6)..(6)
<223> OTHER INFORMATION: cm
<220> FEATURE:
<221> NAME/KEY: misc_feature
<222> LOCATION: (9)..(9)
<223> OTHER INFORMATION: cm
<220> FEATURE:
<221> NAME/KEY: misc_feature
<222> LOCATION: (11)..(11)
<223> OTHER INFORMATION: cm
<220> FEATURE:
<221> NAME/KEY: misc_feature
<222> LOCATION: (13)..(13)
<223> OTHER INFORMATION: um
<220> FEATURE:
```

```
<221> NAME/KEY: misc_feature
<222> LOCATION: (15)..(15)
<223> OTHER INFORMATION: um
<220> FEATURE:
<221> NAME/KEY: misc_feature
<222> LOCATION: (18)..(18)
<223> OTHER INFORMATION: cm
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 14
aucagcaaca cauauaccan n                                           21

<210> SEQ ID NO 15
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (2)..(2)
<223> OTHER INFORMATION: cm
<220> FEATURE:
<221> NAME/KEY: misc_feature
<222> LOCATION: (3)..(3)
<223> OTHER INFORMATION: um
<220> FEATURE:
<221> NAME/KEY: misc_feature
<222> LOCATION: (5)..(5)
<223> OTHER INFORMATION: um
<220> FEATURE:
<221> NAME/KEY: misc_feature
<222> LOCATION: (6)..(6)
<223> OTHER INFORMATION: cm
<220> FEATURE:
<221> NAME/KEY: misc_feature
<222> LOCATION: (7)..(8)
<223> OTHER INFORMATION: um
<220> FEATURE:
<221> NAME/KEY: misc_feature
<222> LOCATION: (11)..(11)
<223> OTHER INFORMATION: cm
<220> FEATURE:
<221> NAME/KEY: misc_feature
<222> LOCATION: (12)..(14)
<223> OTHER INFORMATION: um
<220> FEATURE:
<221> NAME/KEY: misc_feature
<222> LOCATION: (15)..(15)
<223> OTHER INFORMATION: cm
<220> FEATURE:
<221> NAME/KEY: misc_feature
<222> LOCATION: (17)..(17)
<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 15
acugucuuaa cuuucauagn n                                           21

<210> SEQ ID NO 16
<211> LENGTH: 21
```

```
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (2)..(2)
<223> OTHER INFORMATION: um
<220> FEATURE:
<221> NAME/KEY: misc_feature
<222> LOCATION: (11)..(11)
<223> OTHER INFORMATION: um
<220> FEATURE:
<221> NAME/KEY: misc_feature
<222> LOCATION: (16)..(16)
<223> OTHER INFORMATION: cm
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 16
cuaugaaagu uaagacagun n                                         21

<210> SEQ ID NO 17
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (2)..(2)
<223> OTHER INFORMATION: um
<220> FEATURE:
<221> NAME/KEY: misc_feature
<222> LOCATION: (4)..(5)
<223> OTHER INFORMATION: cm
<220> FEATURE:
<221> NAME/KEY: misc_feature
<222> LOCATION: (8)..(8)
<223> OTHER INFORMATION: cm
<220> FEATURE:
<221> NAME/KEY: misc_feature
<222> LOCATION: (9)..(9)
<223> OTHER INFORMATION: um
<220> FEATURE:
<221> NAME/KEY: misc_feature
<222> LOCATION: (11)..(11)
<223> OTHER INFORMATION: cm
<220> FEATURE:
<221> NAME/KEY: misc_feature
<222> LOCATION: (15)..(17)
<223> OTHER INFORMATION: cm
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 17
gugccagcua caagcccagn n                                         21

<210> SEQ ID NO 18
<211> LENGTH: 21
<212> TYPE: RNA
<213> ORGANISM: Artificial Sequence
<220> FEATURE:
```

```
<223> OTHER INFORMATION: synthesized siRNA antisense sequence
<220> FEATURE:
<221> NAME/KEY: misc_feature
<222> LOCATION: (10)..(10)
<223> OTHER INFORMATION: um
<220> FEATURE:
<221> NAME/KEY: misc_feature
<222> LOCATION: (17)..(17)
<223> OTHER INFORMATION: cm
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 18
cugggcuugu agcuggcacn n                                          21

<210> SEQ ID NO 19
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (7)..(7)
<223> OTHER INFORMATION: cm
<220> FEATURE:
<221> NAME/KEY: misc_feature
<222> LOCATION: (8)..(8)
<223> OTHER INFORMATION: um
<220> FEATURE:
<221> NAME/KEY: misc_feature
<222> LOCATION: (10)..(12)
<223> OTHER INFORMATION: um
<220> FEATURE:
<221> NAME/KEY: misc_feature
<222> LOCATION: (14)..(14)
<223> OTHER INFORMATION: cm
<220> FEATURE:
<221> NAME/KEY: misc_feature
<222> LOCATION: (17)..(17)
<223> OTHER INFORMATION: cm
<220> FEATURE:
<221> NAME/KEY: misc_feature
<222> LOCATION: (18)..(18)
<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 19
aaggaacugu uuacaacuan n                                          21

<210> SEQ ID NO 20
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (1)..(1)
<223> OTHER INFORMATION: um
<220> FEATURE:
<221> NAME/KEY: misc_feature
```

```
<222> LOCATION: (7)..(7)
<223> OTHER INFORMATION: um
<220> FEATURE:
<221> NAME/KEY: misc_feature
<222> LOCATION: (11)..(11)
<223> OTHER INFORMATION: cm
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 20
uaguuguaaa caguuccuun n                                              21

<210> SEQ ID NO 21
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (1)..(1)
<223> OTHER INFORMATION: um
<220> FEATURE:
<221> NAME/KEY: misc_feature
<222> LOCATION: (2)..(3)
<223> OTHER INFORMATION: cm
<220> FEATURE:
<221> NAME/KEY: misc_feature
<222> LOCATION: (4)..(4)
<223> OTHER INFORMATION: um
<220> FEATURE:
<221> NAME/KEY: misc_feature
<222> LOCATION: (5)..(5)
<223> OTHER INFORMATION: cm
<220> FEATURE:
<221> NAME/KEY: misc_feature
<222> LOCATION: (6)..(6)
<223> OTHER INFORMATION: um
<220> FEATURE:
<221> NAME/KEY: misc_feature
<222> LOCATION: (12)..(13)
<223> OTHER INFORMATION: um
<220> FEATURE:
<221> NAME/KEY: misc_feature
<222> LOCATION: (16)..(17)
<223> OTHER INFORMATION: cm
<220> FEATURE:
<221> NAME/KEY: misc_feature
<222> LOCATION: (18)..(19)
<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 21
uccucuggaa auuggccuun n                                              21

<210> SEQ ID NO 22
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
```

<221> NAME/KEY: misc_feature
<222> LOCATION: (6)..(6)
<223> OTHER INFORMATION: cm
<220> FEATURE:
<221> NAME/KEY: misc_feature
<222> LOCATION: (13)..(13)
<223> OTHER INFORMATION: cm
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 22
aaggccaauu uccagaggan n     21

<210> SEQ ID NO 23
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (1)..(2)
<223> OTHER INFORMATION: um
<220> FEATURE:
<221> NAME/KEY: misc_feature
<222> LOCATION: (11)..(11)
<223> OTHER INFORMATION: cm
<220> FEATURE:
<221> NAME/KEY: misc_feature
<222> LOCATION: (12)..(12)
<223> OTHER INFORMATION: um
<220> FEATURE:
<221> NAME/KEY: misc_feature
<222> LOCATION: (14)..(16)
<223> OTHER INFORMATION: um
<220> FEATURE:
<221> NAME/KEY: misc_feature
<222> LOCATION: (18)..(18)
<223> OTHER INFORMATION: cm
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 23
uugaaaggaa cuguuuacan n     21

<210> SEQ ID NO 24
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (3)..(3)
<223> OTHER INFORMATION: um
<220> FEATURE:
<221> NAME/KEY: misc_feature
<222> LOCATION: (7)..(7)
<223> OTHER INFORMATION: cm
<220> FEATURE:
<221> NAME/KEY: misc_feature
<222> LOCATION: (17)..(17)
<223> OTHER INFORMATION: cm

```
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 24
uguaaacagu uccuuucaan n                                              21

<210> SEQ ID NO 25
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (8)..(8)
<223> OTHER INFORMATION: cm
<220> FEATURE:
<221> NAME/KEY: misc_feature
<222> LOCATION: (9)..(9)
<223> OTHER INFORMATION: um
<220> FEATURE:
<221> NAME/KEY: misc_feature
<222> LOCATION: (11)..(13)
<223> OTHER INFORMATION: um
<220> FEATURE:
<221> NAME/KEY: misc_feature
<222> LOCATION: (15)..(15)
<223> OTHER INFORMATION: cm
<220> FEATURE:
<221> NAME/KEY: misc_feature
<222> LOCATION: (18)..(18)
<223> OTHER INFORMATION: cm
<220> FEATURE:
<221> NAME/KEY: misc_feature
<222> LOCATION: (19)..(19)
<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 25
aaaggaacug uuuacaacun n                                              21

<210> SEQ ID NO 26
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (6)..(6)
<223> OTHER INFORMATION: um
<220> FEATURE:
<221> NAME/KEY: misc_feature
<222> LOCATION: (10)..(10)
<223> OTHER INFORMATION: cm
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
```

```
<223> OTHER INFORMATION: phosphorothioate bond

<400> SEQUENCE: 26
aguuguaaac aguuccuuun n                                              21

<210> SEQ ID NO 27
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (6)..(6)
<223> OTHER INFORMATION: cm
<220> FEATURE:
<221> NAME/KEY: misc_feature
<222> LOCATION: (7)..(7)
<223> OTHER INFORMATION: um
<220> FEATURE:
<221> NAME/KEY: misc_feature
<222> LOCATION: (9)..(11)
<223> OTHER INFORMATION: um
<220> FEATURE:
<221> NAME/KEY: misc_feature
<222> LOCATION: (13)..(13)
<223> OTHER INFORMATION: cm
<220> FEATURE:
<221> NAME/KEY: misc_feature
<222> LOCATION: (16)..(16)
<223> OTHER INFORMATION: cm
<220> FEATURE:
<221> NAME/KEY: misc_feature
<222> LOCATION: (17)..(17)
<223> OTHER INFORMATION: um
<220> FEATURE:
<221> NAME/KEY: misc_feature
<222> LOCATION: (19)..(19)
<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 27
aggaacuguu uacaacuaun n                                              21

<210> SEQ ID NO 28
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (2)..(2)
<223> OTHER INFORMATION: um
<220> FEATURE:
<221> NAME/KEY: misc_feature
<222> LOCATION: (8)..(8)
<223> OTHER INFORMATION: um
<220> FEATURE:
<221> NAME/KEY: misc_feature
<222> LOCATION: (12)..(12)
<223> OTHER INFORMATION: cm
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
```

```
<222> LOCATION: (20)..(21)
<223> OTHER INFORMATION: phosphorothioate bond

<400> SEQUENCE: 28
auaguuguaa acaguuccun n                                         21

<210> SEQ ID NO 29
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (1)..(1)
<223> OTHER INFORMATION: um
<220> FEATURE:
<221> NAME/KEY: misc_feature
<222> LOCATION: (3)..(3)
<223> OTHER INFORMATION: cm
<220> FEATURE:
<221> NAME/KEY: misc_feature
<222> LOCATION: (5)..(5)
<223> OTHER INFORMATION: cm
<220> FEATURE:
<221> NAME/KEY: misc_feature
<222> LOCATION: (6)..(6)
<223> OTHER INFORMATION: um
<220> FEATURE:
<221> NAME/KEY: misc_feature
<222> LOCATION: (11)..(11)
<223> OTHER INFORMATION: cm
<220> FEATURE:
<221> NAME/KEY: misc_feature
<222> LOCATION: (13)..(15)
<223> OTHER INFORMATION: um
<220> FEATURE:
<221> NAME/KEY: misc_feature
<222> LOCATION: (18)..(18)
<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 29
uacacugaag cauuugaugn n                                         21

<210> SEQ ID NO 30
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (1)..(1)
<223> OTHER INFORMATION: cm
<220> FEATURE:
<221> NAME/KEY: misc_feature
<222> LOCATION: (4)..(4)
<223> OTHER INFORMATION: cm
<220> FEATURE:
<221> NAME/KEY: misc_feature
<222> LOCATION: (13)..(13)
<223> OTHER INFORMATION: cm
<220> FEATURE:
<221> NAME/KEY: misc_feature
<222> LOCATION: (18)..(18)
<223> OTHER INFORMATION: um
<220> FEATURE:
```

```
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 30
caucaaaugc uucaguguan n                                              21

<210> SEQ ID NO 31
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (1)..(1)
<223> OTHER INFORMATION: cm
<220> FEATURE:
<221> NAME/KEY: misc_feature
<222> LOCATION: (3)..(3)
<223> OTHER INFORMATION: cm
<220> FEATURE:
<221> NAME/KEY: misc_feature
<222> LOCATION: (4)..(4)
<223> OTHER INFORMATION: um
<220> FEATURE:
<221> NAME/KEY: misc_feature
<222> LOCATION: (9)..(9)
<223> OTHER INFORMATION: cm
<220> FEATURE:
<221> NAME/KEY: misc_feature
<222> LOCATION: (11)..(13)
<223> OTHER INFORMATION: um
<220> FEATURE:
<221> NAME/KEY: misc_feature
<222> LOCATION: (16)..(16)
<223> OTHER INFORMATION: um
<220> FEATURE:
<221> NAME/KEY: misc_feature
<222> LOCATION: (18)..(18)
<223> OTHER INFORMATION: cm
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 31
cacugaagca uuugaugcan n                                              21

<210> SEQ ID NO 32
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (3)..(3)
<223> OTHER INFORMATION: cm
<220> FEATURE:
<221> NAME/KEY: misc_feature
<222> LOCATION: (6)..(6)
<223> OTHER INFORMATION: cm
<220> FEATURE:
<221> NAME/KEY: misc_feature
<222> LOCATION: (15)..(15)
<223> OTHER INFORMATION: cm
```

```
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 32
ugcaucaaau gcuucagugn n                                              21

<210> SEQ ID NO 33
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (1)..(1)
<223> OTHER INFORMATION: cm
<220> FEATURE:
<221> NAME/KEY: misc_feature
<222> LOCATION: (2)..(2)
<223> OTHER INFORMATION: um
<220> FEATURE:
<221> NAME/KEY: misc_feature
<222> LOCATION: (7)..(7)
<223> OTHER INFORMATION: cm
<220> FEATURE:
<221> NAME/KEY: misc_feature
<222> LOCATION: (9)..(11)
<223> OTHER INFORMATION: um
<220> FEATURE:
<221> NAME/KEY: misc_feature
<222> LOCATION: (14)..(14)
<223> OTHER INFORMATION: um
<220> FEATURE:
<221> NAME/KEY: misc_feature
<222> LOCATION: (16)..(16)
<223> OTHER INFORMATION: cm
<220> FEATURE:
<221> NAME/KEY: misc_feature
<222> LOCATION: (19)..(19)
<223> OTHER INFORMATION: cm
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 33
cugaagcauu ugaugcaacn n                                              21

<210> SEQ ID NO 34
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (5)..(5)
<223> OTHER INFORMATION: cm
<220> FEATURE:
<221> NAME/KEY: misc_feature
<222> LOCATION: (8)..(8)
<223> OTHER INFORMATION: cm
<220> FEATURE:
<221> NAME/KEY: misc_feature
<222> LOCATION: (17)..(17)
```

```
<223> OTHER INFORMATION: cm
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 34
guugcaucaa augcuucagn n                                              21

<210> SEQ ID NO 35
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (1)..(2)
<223> OTHER INFORMATION: um
<220> FEATURE:
<221> NAME/KEY: misc_feature
<222> LOCATION: (3)..(3)
<223> OTHER INFORMATION: cm
<220> FEATURE:
<221> NAME/KEY: misc_feature
<222> LOCATION: (4)..(4)
<223> OTHER INFORMATION: um
<220> FEATURE:
<221> NAME/KEY: misc_feature
<222> LOCATION: (6)..(6)
<223> OTHER INFORMATION: cm
<220> FEATURE:
<221> NAME/KEY: misc_feature
<222> LOCATION: (9)..(9)
<223> OTHER INFORMATION: cm
<220> FEATURE:
<221> NAME/KEY: misc_feature
<222> LOCATION: (10)..(10)
<223> OTHER INFORMATION: um
<220> FEATURE:
<221> NAME/KEY: misc_feature
<222> LOCATION: (14)..(15)
<223> OTHER INFORMATION: um
<220> FEATURE:
<221> NAME/KEY: misc_feature
<222> LOCATION: (16)..(16)
<223> OTHER INFORMATION: cm
<220> FEATURE:
<221> NAME/KEY: misc_feature
<222> LOCATION: (19)..(19)
<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 35
uucugcaacu gaauucgaun n                                              21

<210> SEQ ID NO 36
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
```

```
<222> LOCATION: (9)..(9)
<223> OTHER INFORMATION: cm
<220> FEATURE:
<221> NAME/KEY: misc_feature
<222> LOCATION: (15)..(15)
<223> OTHER INFORMATION: cm
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 36
aucgaauuca guugcagaan n                                              21

<210> SEQ ID NO 37
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (1)..(1)
<223> OTHER INFORMATION: um
<220> FEATURE:
<221> NAME/KEY: misc_feature
<222> LOCATION: (10)..(10)
<223> OTHER INFORMATION: cm
<220> FEATURE:
<221> NAME/KEY: misc_feature
<222> LOCATION: (11)..(11)
<223> OTHER INFORMATION: um
<220> FEATURE:
<221> NAME/KEY: misc_feature
<222> LOCATION: (13)..(15)
<223> OTHER INFORMATION: um
<220> FEATURE:
<221> NAME/KEY: misc_feature
<222> LOCATION: (17)..(17)
<223> OTHER INFORMATION: cm
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 37
ugaaaggaac uguuuacaan n                                              21

<210> SEQ ID NO 38
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (4)..(4)
<223> OTHER INFORMATION: cm
<220> FEATURE:
<221> NAME/KEY: misc_feature
<222> LOCATION: (8)..(8)
<223> OTHER INFORMATION: cm
<220> FEATURE:
<221> NAME/KEY: misc_feature
<222> LOCATION: (18)..(18)
<223> OTHER INFORMATION: cm
<220> FEATURE:
```

<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 38
uuguaaacag uuccuuucan n     21

<210> SEQ ID NO 39
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (2)..(2)
<223> OTHER INFORMATION: cm
<220> FEATURE:
<221> NAME/KEY: misc_feature
<222> LOCATION: (3)..(3)
<223> OTHER INFORMATION: um
<220> FEATURE:
<221> NAME/KEY: misc_feature
<222> LOCATION: (8)..(8)
<223> OTHER INFORMATION: cm
<220> FEATURE:
<221> NAME/KEY: misc_feature
<222> LOCATION: (10)..(12)
<223> OTHER INFORMATION: um
<220> FEATURE:
<221> NAME/KEY: misc_feature
<222> LOCATION: (15)..(15)
<223> OTHER INFORMATION: um
<220> FEATURE:
<221> NAME/KEY: misc_feature
<222> LOCATION: (17)..(17)
<223> OTHER INFORMATION: cm
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 39
acugaagcau uugaugcaan n     21

<210> SEQ ID NO 40
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (4)..(4)
<223> OTHER INFORMATION: cm
<220> FEATURE:
<221> NAME/KEY: misc_feature
<222> LOCATION: (7)..(7)
<223> OTHER INFORMATION: cm
<220> FEATURE:
<221> NAME/KEY: misc_feature
<222> LOCATION: (16)..(16)
<223> OTHER INFORMATION: cm
<220> FEATURE:
<221> NAME/KEY: misc_feature
<222> LOCATION: (20)..(21)
<223> OTHER INFORMATION: n=deoxythymidine

```
<220> FEATURE:
<221> NAME/KEY: misc_feature
<222> LOCATION: (20)..(21)
<223> OTHER INFORMATION: phosphorothioate bond

<400> SEQUENCE: 40
uugcaucaaa ugcuucagun n                                               21

<210> SEQ ID NO 41
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (1)..(1)
<223> OTHER INFORMATION: cm
<220> FEATURE:
<221> NAME/KEY: misc_feature
<222> LOCATION: (3)..(3)
<223> OTHER INFORMATION: um
<220> FEATURE:
<221> NAME/KEY: misc_feature
<222> LOCATION: (5)..(5)
<223> OTHER INFORMATION: cm
<220> FEATURE:
<221> NAME/KEY: misc_feature
<222> LOCATION: (9)..(9)
<223> OTHER INFORMATION: cm
<220> FEATURE:
<221> NAME/KEY: misc_feature
<222> LOCATION: (13)..(14)
<223> OTHER INFORMATION: cm
<220> FEATURE:
<221> NAME/KEY: misc_feature
<222> LOCATION: (15)..(15)
<223> OTHER INFORMATION: um
<220> FEATURE:
<221> NAME/KEY: misc_feature
<222> LOCATION: (17)..(19)
<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 41
cauacagaca aaccuguuun n                                               21

<210> SEQ ID NO 42
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (4)..(4)
<223> OTHER INFORMATION: cm
<220> FEATURE:
<221> NAME/KEY: misc_feature
<222> LOCATION: (16)..(16)
<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
```

```
<223> OTHER INFORMATION: phosphorothioate bond

<400> SEQUENCE: 42
aaacagguuu gucuguaugn n                                         21

<210> SEQ ID NO 43
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (4)..(4)
<223> OTHER INFORMATION: cm
<220> FEATURE:
<221> NAME/KEY: misc_feature
<222> LOCATION: (7)..(7)
<223> OTHER INFORMATION: cm
<220> FEATURE:
<221> NAME/KEY: misc_feature
<222> LOCATION: (11)..(11)
<223> OTHER INFORMATION: um
<220> FEATURE:
<221> NAME/KEY: misc_feature
<222> LOCATION: (13)..(14)
<223> OTHER INFORMATION: cm
<220> FEATURE:
<221> NAME/KEY: misc_feature
<222> LOCATION: (15)..(17)
<223> OTHER INFORMATION: um
<220> FEATURE:
<221> NAME/KEY: misc_feature
<222> LOCATION: (19)..(19)
<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 43
aaacaacaag uaccuuuaun n                                         21

<210> SEQ ID NO 44
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (2)..(2)
<223> OTHER INFORMATION: um
<220> FEATURE:
<221> NAME/KEY: misc_feature
<222> LOCATION: (8)..(8)
<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 44
auaaagguac uuguuguuun n                                         21
```

```
-continued

<210> SEQ ID NO 45
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (2)..(2)
<223> OTHER INFORMATION: um
<220> FEATURE:
<221> NAME/KEY: misc_feature
<222> LOCATION: (4)..(4)
<223> OTHER INFORMATION: cm
<220> FEATURE:
<221> NAME/KEY: misc_feature
<222> LOCATION: (8)..(8)
<223> OTHER INFORMATION: cm
<220> FEATURE:
<221> NAME/KEY: misc_feature
<222> LOCATION: (12)..(13)
<223> OTHER INFORMATION: cm
<220> FEATURE:
<221> NAME/KEY: misc_feature
<222> LOCATION: (14)..(14)
<223> OTHER INFORMATION: um
<220> FEATURE:
<221> NAME/KEY: misc_feature
<222> LOCATION: (16)..(18)
<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 45
auacagacaa accuguuuan n                                             21

<210> SEQ ID NO 46
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (1)..(1)
<223> OTHER INFORMATION: um
<220> FEATURE:
<221> NAME/KEY: misc_feature
<222> LOCATION: (5)..(5)
<223> OTHER INFORMATION: cm
<220> FEATURE:
<221> NAME/KEY: misc_feature
<222> LOCATION: (17)..(17)
<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 46
uaaacagguu ugucuguaun n                                             21

<210> SEQ ID NO 47
<211> LENGTH: 21
<212> TYPE: RNA
```

```
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (3)..(3)
<223> OTHER INFORMATION: um
<220> FEATURE:
<221> NAME/KEY: misc_feature
<222> LOCATION: (5)..(5)
<223> OTHER INFORMATION: um
<220> FEATURE:
<221> NAME/KEY: misc_feature
<222> LOCATION: (7)..(7)
<223> OTHER INFORMATION: um
<220> FEATURE:
<221> NAME/KEY: misc_feature
<222> LOCATION: (9)..(9)
<223> OTHER INFORMATION: um
<220> FEATURE:
<221> NAME/KEY: misc_feature
<222> LOCATION: (11)..(12)
<223> OTHER INFORMATION: um
<220> FEATURE:
<221> NAME/KEY: misc_feature
<222> LOCATION: (14)..(14)
<223> OTHER INFORMATION: cm
<220> FEATURE:
<221> NAME/KEY: misc_feature
<222> LOCATION: (15)..(15)
<223> OTHER INFORMATION: um
<220> FEATURE:
<221> NAME/KEY: misc_feature
<222> LOCATION: (18)..(18)
<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 47
gguauaugug uugcugauan n                                              21

<210> SEQ ID NO 48
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (1)..(1)
<223> OTHER INFORMATION: um
<220> FEATURE:
<221> NAME/KEY: misc_feature
<222> LOCATION: (4)..(4)
<223> OTHER INFORMATION: cm
<220> FEATURE:
<221> NAME/KEY: misc_feature
<222> LOCATION: (7)..(7)
<223> OTHER INFORMATION: cm
<220> FEATURE:
<221> NAME/KEY: misc_feature
<222> LOCATION: (10)..(10)
<223> OTHER INFORMATION: cm
<220> FEATURE:
<221> NAME/KEY: misc_feature
<222> LOCATION: (12)..(12)
<223> OTHER INFORMATION: cm
<220> FEATURE:
<221> NAME/KEY: misc_feature
<222> LOCATION: (14)..(14)
<223> OTHER INFORMATION: um
```

```
<220> FEATURE:
<221> NAME/KEY: misc_feature
<222> LOCATION: (16)..(16)
<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 48
uaucagcaac acauauaccn n                                              21

<210> SEQ ID NO 49
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (1)..(1)
<223> OTHER INFORMATION: um
<220> FEATURE:
<221> NAME/KEY: misc_feature
<222> LOCATION: (2)..(2)
<223> OTHER INFORMATION: cm
<220> FEATURE:
<221> NAME/KEY: misc_feature
<222> LOCATION: (9)..(9)
<223> OTHER INFORMATION: um
<220> FEATURE:
<221> NAME/KEY: misc_feature
<222> LOCATION: (10)..(10)
<223> OTHER INFORMATION: cm
<220> FEATURE:
<221> NAME/KEY: misc_feature
<222> LOCATION: (11)..(11)
<223> OTHER INFORMATION: um
<220> FEATURE:
<221> NAME/KEY: misc_feature
<222> LOCATION: (13)..(13)
<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 49
ucagaaaguc ugugaaggan n                                              21

<210> SEQ ID NO 50
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (6)..(6)
<223> OTHER INFORMATION: cm
<220> FEATURE:
<221> NAME/KEY: misc_feature
<222> LOCATION: (8)..(8)
<223> OTHER INFORMATION: cm
<220> FEATURE:
<221> NAME/KEY: misc_feature
<222> LOCATION: (20)..(21)
```

-continued

<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 50
uccuucacag acuuucugan n                                              21

<210> SEQ ID NO 51
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (1)..(1)
<223> OTHER INFORMATION: um
<220> FEATURE:
<221> NAME/KEY: misc_feature
<222> LOCATION: (2)..(2)
<223> OTHER INFORMATION: cm
<220> FEATURE:
<221> NAME/KEY: misc_feature
<222> LOCATION: (3)..(3)
<223> OTHER INFORMATION: um
<220> FEATURE:
<221> NAME/KEY: misc_feature
<222> LOCATION: (4)..(5)
<223> OTHER INFORMATION: cm
<220> FEATURE:
<221> NAME/KEY: misc_feature
<222> LOCATION: (9)..(10)
<223> OTHER INFORMATION: cm
<220> FEATURE:
<221> NAME/KEY: misc_feature
<222> LOCATION: (14)..(14)
<223> OTHER INFORMATION: cm
<220> FEATURE:
<221> NAME/KEY: misc_feature
<222> LOCATION: (15)..(15)
<223> OTHER INFORMATION: um
<220> FEATURE:
<221> NAME/KEY: misc_feature
<222> LOCATION: (17)..(17)
<223> OTHER INFORMATION: um
<220> FEATURE:
<221> NAME/KEY: misc_feature
<222> LOCATION: (19)..(19)
<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 51
ucuccaggcc aaacugugun n                                              21

<210> SEQ ID NO 52
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (2)..(2)
<223> OTHER INFORMATION: cm
<220> FEATURE:
<221> NAME/KEY: misc_feature -continued

```
<222> LOCATION: (4)..(4)
<223> OTHER INFORMATION: cm
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 52
acacaguuug gccuggagan n                                              21

<210> SEQ ID NO 53
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (2)..(2)
<223> OTHER INFORMATION: cm
<220> FEATURE:
<221> NAME/KEY: misc_feature
<222> LOCATION: (5)..(5)
<223> OTHER INFORMATION: cm
<220> FEATURE:
<221> NAME/KEY: misc_feature
<222> LOCATION: (9)..(9)
<223> OTHER INFORMATION: um
<220> FEATURE:
<221> NAME/KEY: misc_feature
<222> LOCATION: (11)..(12)
<223> OTHER INFORMATION: cm
<220> FEATURE:
<221> NAME/KEY: misc_feature
<222> LOCATION: (13)..(15)
<223> OTHER INFORMATION: um
<220> FEATURE:
<221> NAME/KEY: misc_feature
<222> LOCATION: (17)..(17)
<223> OTHER INFORMATION: um
<220> FEATURE:
<221> NAME/KEY: misc_feature
<222> LOCATION: (19)..(19)
<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 53
acaacaagua ccuuuauaun n                                              21

<210> SEQ ID NO 54
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (2)..(2)
<223> OTHER INFORMATION: um
<220> FEATURE:
<221> NAME/KEY: misc_feature
<222> LOCATION: (4)..(4)
<223> OTHER INFORMATION: um
<220> FEATURE:
```

```
<221> NAME/KEY: misc_feature
<222> LOCATION: (10)..(10)
<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 54
auauaaaggu acuuguugun n                                      21

<210> SEQ ID NO 55
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (1)..(1)
<223> OTHER INFORMATION: cm
<220> FEATURE:
<221> NAME/KEY: misc_feature
<222> LOCATION: (4)..(4)
<223> OTHER INFORMATION: cm
<220> FEATURE:
<221> NAME/KEY: misc_feature
<222> LOCATION: (8)..(8)
<223> OTHER INFORMATION: um
<220> FEATURE:
<221> NAME/KEY: misc_feature
<222> LOCATION: (10)..(11)
<223> OTHER INFORMATION: cm
<220> FEATURE:
<221> NAME/KEY: misc_feature
<222> LOCATION: (12)..(14)
<223> OTHER INFORMATION: um
<220> FEATURE:
<221> NAME/KEY: misc_feature
<222> LOCATION: (16)..(16)
<223> OTHER INFORMATION: um
<220> FEATURE:
<221> NAME/KEY: misc_feature
<222> LOCATION: (18)..(19)
<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 55
caacaaguac cuuuauauun n                                      21

<210> SEQ ID NO 56
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (3)..(3)
<223> OTHER INFORMATION: um
<220> FEATURE:
<221> NAME/KEY: misc_feature
<222> LOCATION: (5)..(5)
<223> OTHER INFORMATION: um
```

```
<220> FEATURE:
<221> NAME/KEY: misc_feature
<222> LOCATION: (11)..(11)
<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 56
aauauaaagg uacuuguugn n                                              21

<210> SEQ ID NO 57
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (2)..(3)
<223> OTHER INFORMATION: um
<220> FEATURE:
<221> NAME/KEY: misc_feature
<222> LOCATION: (4)..(4)
<223> OTHER INFORMATION: cm
<220> FEATURE:
<221> NAME/KEY: misc_feature
<222> LOCATION: (5)..(5)
<223> OTHER INFORMATION: um
<220> FEATURE:
<221> NAME/KEY: misc_feature
<222> LOCATION: (6)..(7)
<223> OTHER INFORMATION: cm
<220> FEATURE:
<221> NAME/KEY: misc_feature
<222> LOCATION: (11)..(12)
<223> OTHER INFORMATION: cm
<220> FEATURE:
<221> NAME/KEY: misc_feature
<222> LOCATION: (16)..(16)
<223> OTHER INFORMATION: cm
<220> FEATURE:
<221> NAME/KEY: misc_feature
<222> LOCATION: (17)..(17)
<223> OTHER INFORMATION: um
<220> FEATURE:
<221> NAME/KEY: misc_feature
<222> LOCATION: (19)..(19)
<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 57
auucuccagg ccaaacugun n                                              21

<210> SEQ ID NO 58
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (2)..(2)
```

```
<223> OTHER INFORMATION: cm
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 58
acaguuuggc cuggagaaun n                                              21

<210> SEQ ID NO 59
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (2)..(2)
<223> OTHER INFORMATION: um
<220> FEATURE:
<221> NAME/KEY: misc_feature
<222> LOCATION: (5)..(5)
<223> OTHER INFORMATION: cm
<220> FEATURE:
<221> NAME/KEY: misc_feature
<222> LOCATION: (8)..(9)
<223> OTHER INFORMATION: cm
<220> FEATURE:
<221> NAME/KEY: misc_feature
<222> LOCATION: (12)..(12)
<223> OTHER INFORMATION: cm
<220> FEATURE:
<221> NAME/KEY: misc_feature
<222> LOCATION: (13)..(13)
<223> OTHER INFORMATION: um
<220> FEATURE:
<221> NAME/KEY: misc_feature
<222> LOCATION: (14)..(15)
<223> OTHER INFORMATION: cm
<220> FEATURE:
<221> NAME/KEY: misc_feature
<222> LOCATION: (19)..(19)
<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 59
guggcaacca gcuccaggun n                                              21

<210> SEQ ID NO 60
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (17)..(17)
<223> OTHER INFORMATION: cm
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
```

<222> LOCATION: (20)..(21)
<223> OTHER INFORMATION: phosphorothioate bond

<400> SEQUENCE: 60
accuggagcu gguugccacn n                                        21

<210> SEQ ID NO 61
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (7)..(7)
<223> OTHER INFORMATION: cm
<220> FEATURE:
<221> NAME/KEY: misc_feature
<222> LOCATION: (9)..(9)
<223> OTHER INFORMATION: um
<220> FEATURE:
<221> NAME/KEY: misc_feature
<222> LOCATION: (10)..(10)
<223> OTHER INFORMATION: cm
<220> FEATURE:
<221> NAME/KEY: misc_feature
<222> LOCATION: (11)..(11)
<223> OTHER INFORMATION: um
<220> FEATURE:
<221> NAME/KEY: misc_feature
<222> LOCATION: (14)..(14)
<223> OTHER INFORMATION: cm
<220> FEATURE:
<221> NAME/KEY: misc_feature
<222> LOCATION: (15)..(16)
<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 61
aagagacauc ugacuuggan n                                        21

<210> SEQ ID NO 62
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (3)..(3)
<223> OTHER INFORMATION: cm
<220> FEATURE:
<221> NAME/KEY: misc_feature
<222> LOCATION: (8)..(8)
<223> OTHER INFORMATION: cm
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 62
uccaagucag augucucuun n                                        21

```
<210> SEQ ID NO 63
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (2)..(3)
<223> OTHER INFORMATION: um
<220> FEATURE:
<221> NAME/KEY: misc_feature
<222> LOCATION: (4)..(4)
<223> OTHER INFORMATION: cm
<220> FEATURE:
<221> NAME/KEY: misc_feature
<222> LOCATION: (5)..(5)
<223> OTHER INFORMATION: um
<220> FEATURE:
<221> NAME/KEY: misc_feature
<222> LOCATION: (7)..(7)
<223> OTHER INFORMATION: cm
<220> FEATURE:
<221> NAME/KEY: misc_feature
<222> LOCATION: (10)..(10)
<223> OTHER INFORMATION: cm
<220> FEATURE:
<221> NAME/KEY: misc_feature
<222> LOCATION: (11)..(11)
<223> OTHER INFORMATION: um
<220> FEATURE:
<221> NAME/KEY: misc_feature
<222> LOCATION: (15)..(16)
<223> OTHER INFORMATION: um
<220> FEATURE:
<221> NAME/KEY: misc_feature
<222> LOCATION: (17)..(17)
<223> OTHER INFORMATION: cm
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 63
auucugcaac ugaauucgan n                                              21

<210> SEQ ID NO 64
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (8)..(8)
<223> OTHER INFORMATION: cm
<220> FEATURE:
<221> NAME/KEY: misc_feature
<222> LOCATION: (14)..(14)
<223> OTHER INFORMATION: cm
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 64
ucgaauucag uugcagaaun n                                              21
```

<210> SEQ ID NO 65
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (1)..(2)
<223> OTHER INFORMATION: um
<220> FEATURE:
<221> NAME/KEY: misc_feature
<222> LOCATION: (3)..(4)
<223> OTHER INFORMATION: cm
<220> FEATURE:
<221> NAME/KEY: misc_feature
<222> LOCATION: (5)..(5)
<223> OTHER INFORMATION: um
<220> FEATURE:
<221> NAME/KEY: misc_feature
<222> LOCATION: (6)..(6)
<223> OTHER INFORMATION: cm
<220> FEATURE:
<221> NAME/KEY: misc_feature
<222> LOCATION: (7)..(7)
<223> OTHER INFORMATION: um
<220> FEATURE:
<221> NAME/KEY: misc_feature
<222> LOCATION: (13)..(14)
<223> OTHER INFORMATION: um
<220> FEATURE:
<221> NAME/KEY: misc_feature
<222> LOCATION: (17)..(18)
<223> OTHER INFORMATION: cm
<220> FEATURE:
<221> NAME/KEY: misc_feature
<222> LOCATION: (19)..(19)
<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 65
uuccucugga aauuggccun n                                              21

<210> SEQ ID NO 66
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (5)..(5)
<223> OTHER INFORMATION: cm
<220> FEATURE:
<221> NAME/KEY: misc_feature
<222> LOCATION: (12)..(12)
<223> OTHER INFORMATION: cm
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 66
aggccaauuu ccagaggaan n                                        21

<210> SEQ ID NO 67
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (3)..(3)
<223> OTHER INFORMATION: cm
<220> FEATURE:
<221> NAME/KEY: misc_feature
<222> LOCATION: (6)..(6)
<223> OTHER INFORMATION: cm
<220> FEATURE:
<221> NAME/KEY: misc_feature
<222> LOCATION: (10)..(10)
<223> OTHER INFORMATION: um
<220> FEATURE:
<221> NAME/KEY: misc_feature
<222> LOCATION: (12)..(13)
<223> OTHER INFORMATION: cm
<220> FEATURE:
<221> NAME/KEY: misc_feature
<222> LOCATION: (14)..(16)
<223> OTHER INFORMATION: um
<220> FEATURE:
<221> NAME/KEY: misc_feature
<222> LOCATION: (18)..(18)
<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 67
aacaacaagu accuuuauan n                                        21

<210> SEQ ID NO 68
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (1)..(1)
<223> OTHER INFORMATION: um
<220> FEATURE:
<221> NAME/KEY: misc_feature
<222> LOCATION: (3)..(3)
<223> OTHER INFORMATION: um
<220> FEATURE:
<221> NAME/KEY: misc_feature
<222> LOCATION: (9)..(9)
<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond -continued

<400> SEQUENCE: 68
uauaaaggua cuuguuguun n                                              21

<210> SEQ ID NO 69
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (3)..(3)
<223> OTHER INFORMATION: um
<220> FEATURE:
<221> NAME/KEY: misc_feature
<222> LOCATION: (5)..(5)
<223> OTHER INFORMATION: um
<220> FEATURE:
<221> NAME/KEY: misc_feature
<222> LOCATION: (7)..(7)
<223> OTHER INFORMATION: um
<220> FEATURE:
<221> NAME/KEY: misc_feature
<222> LOCATION: (8)..(9)
<223> OTHER INFORMATION: cm
<220> FEATURE:
<221> NAME/KEY: misc_feature
<222> LOCATION: (10)..(10)
<223> OTHER INFORMATION: um
<220> FEATURE:
<221> NAME/KEY: misc_feature
<222> LOCATION: (11)..(11)
<223> OTHER INFORMATION: cm
<220> FEATURE:
<221> NAME/KEY: misc_feature
<222> LOCATION: (12)..(12)
<223> OTHER INFORMATION: um
<220> FEATURE:
<221> NAME/KEY: misc_feature
<222> LOCATION: (13)..(13)
<223> OTHER INFORMATION: cm
<220> FEATURE:
<221> NAME/KEY: misc_feature
<222> LOCATION: (14)..(14)
<223> OTHER INFORMATION: um
<220> FEATURE:
<221> NAME/KEY: misc_feature
<222> LOCATION: (15)..(17)
<223> OTHER INFORMATION: cm
<220> FEATURE:
<221> NAME/KEY: misc_feature
<222> LOCATION: (18)..(18)
<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 69
aauauguccu cucucccuan n                                              21

<210> SEQ ID NO 70
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (1)..(1)

```
<223> OTHER INFORMATION: um
<220> FEATURE:
<221> NAME/KEY: misc_feature
<222> LOCATION: (14)..(14)
<223> OTHER INFORMATION: cm
<220> FEATURE:
<221> NAME/KEY: misc_feature
<222> LOCATION: (16)..(16)
<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 70
uagggagaga ggacauauun n                                         21

<210> SEQ ID NO 71
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (2)..(2)
<223> OTHER INFORMATION: cm
<220> FEATURE:
<221> NAME/KEY: misc_feature
<222> LOCATION: (3)..(3)
<223> OTHER INFORMATION: um
<220> FEATURE:
<221> NAME/KEY: misc_feature
<222> LOCATION: (4)..(4)
<223> OTHER INFORMATION: cm
<220> FEATURE:
<221> NAME/KEY: misc_feature
<222> LOCATION: (6)..(6)
<223> OTHER INFORMATION: cm
<220> FEATURE:
<221> NAME/KEY: misc_feature
<222> LOCATION: (7)..(7)
<223> OTHER INFORMATION: um
<220> FEATURE:
<221> NAME/KEY: misc_feature
<222> LOCATION: (9)..(9)
<223> OTHER INFORMATION: um
<220> FEATURE:
<221> NAME/KEY: misc_feature
<222> LOCATION: (12)..(13)
<223> OTHER INFORMATION: um
<220> FEATURE:
<221> NAME/KEY: misc_feature
<222> LOCATION: (15)..(15)
<223> OTHER INFORMATION: cm
<220> FEATURE:
<221> NAME/KEY: misc_feature
<222> LOCATION: (16)..(17)
<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 71
acucacuaua auuacuugan n                                         21
```

```
<210> SEQ ID NO 72
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (2)..(2)
<223> OTHER INFORMATION: cm
<220> FEATURE:
<221> NAME/KEY: misc_feature
<222> LOCATION: (6)..(6)
<223> OTHER INFORMATION: um
<220> FEATURE:
<221> NAME/KEY: misc_feature
<222> LOCATION: (10)..(10)
<223> OTHER INFORMATION: um
<220> FEATURE:
<221> NAME/KEY: misc_feature
<222> LOCATION: (12)..(12)
<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 72
ucaaguaauu auagugagun n                                           21

<210> SEQ ID NO 73
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (2)..(2)
<223> OTHER INFORMATION: um
<220> FEATURE:
<221> NAME/KEY: misc_feature
<222> LOCATION: (5)..(5)
<223> OTHER INFORMATION: cm
<220> FEATURE:
<221> NAME/KEY: misc_feature
<222> LOCATION: (6)..(6)
<223> OTHER INFORMATION: um
<220> FEATURE:
<221> NAME/KEY: misc_feature
<222> LOCATION: (7)..(7)
<223> OTHER INFORMATION: cm
<220> FEATURE:
<221> NAME/KEY: misc_feature
<222> LOCATION: (9)..(9)
<223> OTHER INFORMATION: cm
<220> FEATURE:
<221> NAME/KEY: misc_feature
<222> LOCATION: (10)..(10)
<223> OTHER INFORMATION: um
<220> FEATURE:
<221> NAME/KEY: misc_feature
<222> LOCATION: (12)..(12)
<223> OTHER INFORMATION: um
<220> FEATURE:
<221> NAME/KEY: misc_feature
<222> LOCATION: (15)..(16)
<223> OTHER INFORMATION: um
<220> FEATURE:
<221> NAME/KEY: misc_feature
<222> LOCATION: (18)..(18)
<223> OTHER INFORMATION: cm
<220> FEATURE:
```

```
<221> NAME/KEY: misc_feature
<222> LOCATION: (19)..(19)
<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 73
auaacucacu auaauuacun n                                              21

<210> SEQ ID NO 74
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (3)..(3)
<223> OTHER INFORMATION: um
<220> FEATURE:
<221> NAME/KEY: misc_feature
<222> LOCATION: (7)..(7)
<223> OTHER INFORMATION: um
<220> FEATURE:
<221> NAME/KEY: misc_feature
<222> LOCATION: (9)..(9)
<223> OTHER INFORMATION: um
<220> FEATURE:
<221> NAME/KEY: misc_feature
<222> LOCATION: (17)..(17)
<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 74
aguaauuaua gugaguuaun n                                              21

<210> SEQ ID NO 75
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (4)..(4)
<223> OTHER INFORMATION: um
<220> FEATURE:
<221> NAME/KEY: misc_feature
<222> LOCATION: (6)..(6)
<223> OTHER INFORMATION: um
<220> FEATURE:
<221> NAME/KEY: misc_feature
<222> LOCATION: (8)..(8)
<223> OTHER INFORMATION: um
<220> FEATURE:
<221> NAME/KEY: misc_feature
<222> LOCATION: (9)..(10)
<223> OTHER INFORMATION: cm
<220> FEATURE:
<221> NAME/KEY: misc_feature
<222> LOCATION: (11)..(11)
<223> OTHER INFORMATION: um
```

```
-continued

<220> FEATURE:
<221> NAME/KEY: misc_feature
<222> LOCATION: (12)..(12)
<223> OTHER INFORMATION: cm
<220> FEATURE:
<221> NAME/KEY: misc_feature
<222> LOCATION: (13)..(13)
<223> OTHER INFORMATION: um
<220> FEATURE:
<221> NAME/KEY: misc_feature
<222> LOCATION: (14)..(14)
<223> OTHER INFORMATION: cm
<220> FEATURE:
<221> NAME/KEY: misc_feature
<222> LOCATION: (15)..(15)
<223> OTHER INFORMATION: um
<220> FEATURE:
<221> NAME/KEY: misc_feature
<222> LOCATION: (16)..(18)
<223> OTHER INFORMATION: cm
<220> FEATURE:
<221> NAME/KEY: misc_feature
<222> LOCATION: (19)..(19)
<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 75
aaauaugucc ucucucccun n                                         21

<210> SEQ ID NO 76
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (13)..(13)
<223> OTHER INFORMATION: cm
<220> FEATURE:
<221> NAME/KEY: misc_feature
<222> LOCATION: (15)..(15)
<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 76
agggagagag gacauauuun n                                         21

<210> SEQ ID NO 77
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (5)..(5)
<223> OTHER INFORMATION: um
<220> FEATURE:
<221> NAME/KEY: misc_feature
<222> LOCATION: (7)..(11)
```

```
<223> OTHER INFORMATION: um
<220> FEATURE:
<221> NAME/KEY: misc_feature
<222> LOCATION: (13)..(13)
<223> OTHER INFORMATION: um
<220> FEATURE:
<221> NAME/KEY: misc_feature
<222> LOCATION: (16)..(16)
<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 77
aagauauuuu uauaauaaan n                                             21

<210> SEQ ID NO 78
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (3)..(3)
<223> OTHER INFORMATION: um
<220> FEATURE:
<221> NAME/KEY: misc_feature
<222> LOCATION: (6)..(6)
<223> OTHER INFORMATION: um
<220> FEATURE:
<221> NAME/KEY: misc_feature
<222> LOCATION: (8)..(8)
<223> OTHER INFORMATION: um
<220> FEATURE:
<221> NAME/KEY: misc_feature
<222> LOCATION: (14)..(14)
<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 78
uuuauuauaa aaauaucuun n                                             21

<210> SEQ ID NO 79
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (5)..(5)
<223> OTHER INFORMATION: um
<220> FEATURE:
<221> NAME/KEY: misc_feature
<222> LOCATION: (8)..(8)
<223> OTHER INFORMATION: cm
<220> FEATURE:
<221> NAME/KEY: misc_feature
<222> LOCATION: (9)..(9)
<223> OTHER INFORMATION: um
<220> FEATURE:
<221> NAME/KEY: misc_feature
```

```
<222> LOCATION: (10)..(10)
<223> OTHER INFORMATION: cm
<220> FEATURE:
<221> NAME/KEY: misc_feature
<222> LOCATION: (12)..(12)
<223> OTHER INFORMATION: cm
<220> FEATURE:
<221> NAME/KEY: misc_feature
<222> LOCATION: (13)..(13)
<223> OTHER INFORMATION: um
<220> FEATURE:
<221> NAME/KEY: misc_feature
<222> LOCATION: (15)..(15)
<223> OTHER INFORMATION: um
<220> FEATURE:
<221> NAME/KEY: misc_feature
<222> LOCATION: (18)..(19)
<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 79
aaaauaacuc acuauaauun n                                              21

<210> SEQ ID NO 80
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (4)..(4)
<223> OTHER INFORMATION: um
<220> FEATURE:
<221> NAME/KEY: misc_feature
<222> LOCATION: (6)..(6)
<223> OTHER INFORMATION: um
<220> FEATURE:
<221> NAME/KEY: misc_feature
<222> LOCATION: (14)..(14)
<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 80
aauuauagug aguuauuuun n                                              21

<210> SEQ ID NO 81
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (4)..(4)
<223> OTHER INFORMATION: um
<220> FEATURE:
<221> NAME/KEY: misc_feature
<222> LOCATION: (7)..(7)
<223> OTHER INFORMATION: cm
<220> FEATURE:
```

```
<221> NAME/KEY: misc_feature
<222> LOCATION: (8)..(8)
<223> OTHER INFORMATION: um
<220> FEATURE:
<221> NAME/KEY: misc_feature
<222> LOCATION: (9)..(9)
<223> OTHER INFORMATION: cm
<220> FEATURE:
<221> NAME/KEY: misc_feature
<222> LOCATION: (11)..(11)
<223> OTHER INFORMATION: cm
<220> FEATURE:
<221> NAME/KEY: misc_feature
<222> LOCATION: (12)..(12)
<223> OTHER INFORMATION: um
<220> FEATURE:
<221> NAME/KEY: misc_feature
<222> LOCATION: (14)..(14)
<223> OTHER INFORMATION: um
<220> FEATURE:
<221> NAME/KEY: misc_feature
<222> LOCATION: (17)..(18)
<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 81
aaauaacuca cuauaauuan n                                             21

<210> SEQ ID NO 82
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (1)..(1)
<223> OTHER INFORMATION: um
<220> FEATURE:
<221> NAME/KEY: misc_feature
<222> LOCATION: (5)..(5)
<223> OTHER INFORMATION: um
<220> FEATURE:
<221> NAME/KEY: misc_feature
<222> LOCATION: (7)..(7)
<223> OTHER INFORMATION: um
<220> FEATURE:
<221> NAME/KEY: misc_feature
<222> LOCATION: (15)..(15)
<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 82
uaauuauagu gaguuauuun n                                             21

<210> SEQ ID NO 83
<211> LENGTH: 21
<212> TYPE: RNA
<213> ORGANISM: Artificial Sequence
<220> FEATURE:
<223> OTHER INFORMATION: synthesized siRNA sense sequence
```

```
<220> FEATURE:
<221> NAME/KEY: misc_feature
<222> LOCATION: (2)..(2)
<223> OTHER INFORMATION: um
<220> FEATURE:
<221> NAME/KEY: misc_feature
<222> LOCATION: (4)..(5)
<223> OTHER INFORMATION: um
<220> FEATURE:
<221> NAME/KEY: misc_feature
<222> LOCATION: (10)..(10)
<223> OTHER INFORMATION: um
<220> FEATURE:
<221> NAME/KEY: misc_feature
<222> LOCATION: (12)..(12)
<223> OTHER INFORMATION: um
<220> FEATURE:
<221> NAME/KEY: misc_feature
<222> LOCATION: (13)..(13)
<223> OTHER INFORMATION: cm
<220> FEATURE:
<221> NAME/KEY: misc_feature
<222> LOCATION: (14)..(14)
<223> OTHER INFORMATION: um
<220> FEATURE:
<221> NAME/KEY: misc_feature
<222> LOCATION: (16)..(16)
<223> OTHER INFORMATION: cm
<220> FEATURE:
<221> NAME/KEY: misc_feature
<222> LOCATION: (17)..(17)
<223> OTHER INFORMATION: um
<220> FEATURE:
<221> NAME/KEY: misc_feature
<222> LOCATION: (19)..(19)
<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 83
guguuaaaau gucugcugun n                                              21

<210> SEQ ID NO 84
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (2)..(2)
<223> OTHER INFORMATION: cm
<220> FEATURE:
<221> NAME/KEY: misc_feature
<222> LOCATION: (5)..(5)
<223> OTHER INFORMATION: cm
<220> FEATURE:
<221> NAME/KEY: misc_feature
<222> LOCATION: (9)..(9)
<223> OTHER INFORMATION: cm
<220> FEATURE:
<221> NAME/KEY: misc_feature
<222> LOCATION: (14)..(14)
<223> OTHER INFORMATION: um
<220> FEATURE:
<221> NAME/KEY: misc_feature
<222> LOCATION: (17)..(17)
<223> OTHER INFORMATION: cm
<220> FEATURE:
<221> NAME/KEY: misc_feature
<222> LOCATION: (20)..(21)
```

<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 84
acagcagaca uuuuaacacn n                                      21

<210> SEQ ID NO 85
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (5)..(5)
<223> OTHER INFORMATION: um
<220> FEATURE:
<221> NAME/KEY: misc_feature
<222> LOCATION: (7)..(11)
<223> OTHER INFORMATION: um
<220> FEATURE:
<221> NAME/KEY: misc_feature
<222> LOCATION: (13)..(13)
<223> OTHER INFORMATION: um
<220> FEATURE:
<221> NAME/KEY: misc_feature
<222> LOCATION: (14)..(14)
<223> OTHER INFORMATION: cm
<220> FEATURE:
<221> NAME/KEY: misc_feature
<222> LOCATION: (18)..(18)
<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 85
aaaauguuuu ugucaaguan n                                      21

<210> SEQ ID NO 86
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (1)..(1)
<223> OTHER INFORMATION: um
<220> FEATURE:
<221> NAME/KEY: misc_feature
<222> LOCATION: (8)..(8)
<223> OTHER INFORMATION: cm
<220> FEATURE:
<221> NAME/KEY: misc_feature
<222> LOCATION: (14)..(14)
<223> OTHER INFORMATION: cm
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

```
<400> SEQUENCE: 86
uacuugacaa aaacauuuun n                                                   21

<210> SEQ ID NO 87
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (1)..(1)
<223> OTHER INFORMATION: cm
<220> FEATURE:
<221> NAME/KEY: misc_feature
<222> LOCATION: (2)..(3)
<223> OTHER INFORMATION: um
<220> FEATURE:
<221> NAME/KEY: misc_feature
<222> LOCATION: (5)..(5)
<223> OTHER INFORMATION: cm
<220> FEATURE:
<221> NAME/KEY: misc_feature
<222> LOCATION: (7)..(7)
<223> OTHER INFORMATION: cm
<220> FEATURE:
<221> NAME/KEY: misc_feature
<222> LOCATION: (8)..(8)
<223> OTHER INFORMATION: um
<220> FEATURE:
<221> NAME/KEY: misc_feature
<222> LOCATION: (12)..(12)
<223> OTHER INFORMATION: um
<220> FEATURE:
<221> NAME/KEY: misc_feature
<222> LOCATION: (14)..(14)
<223> OTHER INFORMATION: cm
<220> FEATURE:
<221> NAME/KEY: misc_feature
<222> LOCATION: (15)..(16)
<223> OTHER INFORMATION: um
<220> FEATURE:
<221> NAME/KEY: misc_feature
<222> LOCATION: (17)..(17)
<223> OTHER INFORMATION: cm
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 87
cuuacgcuga guacuucgan n                                                   21

<210> SEQ ID NO 88
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (7)..(7)
<223> OTHER INFORMATION: um
<220> FEATURE:
<221> NAME/KEY: misc_feature
<222> LOCATION: (11)..(11)
<223> OTHER INFORMATION: cm
<220> FEATURE:
<221> NAME/KEY: misc_feature
<222> LOCATION: (16)..(16)
```

<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 88
ucgaaguacu cagcguaagn n                                           21

<210> SEQ ID NO 89
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (4)..(4)
<223> OTHER INFORMATION: cm
<220> FEATURE:
<221> NAME/KEY: misc_feature
<222> LOCATION: (10)..(10)
<223> OTHER INFORMATION: um
<220> FEATURE:
<221> NAME/KEY: misc_feature
<222> LOCATION: (12)..(13)
<223> OTHER INFORMATION: um
<220> FEATURE:
<221> NAME/KEY: misc_feature
<222> LOCATION: (14)..(14)
<223> OTHER INFORMATION: cm
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 89
aggcaaaggu guucaaagan n                                           21

<210> SEQ ID NO 90
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (9)..(9)
<223> OTHER INFORMATION: cm
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 90
ucuuugaaca ccuuugccun n                                           21

<210> SEQ ID NO 91
<211> LENGTH: 19
<212> TYPE: RNA
<213> ORGANISM: Artificial Sequence

```
<220> FEATURE:
<223> OTHER INFORMATION: synthesized siRNA sense sequence
<220> FEATURE:
<221> NAME/KEY: misc_feature
<222> LOCATION: (4)..(4)
<223> OTHER INFORMATION: cm
<220> FEATURE:
<221> NAME/KEY: misc_feature
<222> LOCATION: (10)..(10)
<223> OTHER INFORMATION: um
<220> FEATURE:
<221> NAME/KEY: misc_feature
<222> LOCATION: (12)..(13)
<223> OTHER INFORMATION: um
<220> FEATURE:
<221> NAME/KEY: misc_feature
<222> LOCATION: (14)..(14)
<223> OTHER INFORMATION: cm

<400> SEQUENCE: 91
aggcaaaggu guucaaaga                                                19

<210> SEQ ID NO 92
<211> LENGTH: 19
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (9)..(9)
<223> OTHER INFORMATION: cm

<400> SEQUENCE: 92
ucuuugaaca ccuuugccu                                                19

<210> SEQ ID NO 93
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (1)..(2)
<223> OTHER INFORMATION: phosphorothioate bond
<220> FEATURE:
<221> NAME/KEY: misc_feature
<222> LOCATION: (4)..(4)
<223> OTHER INFORMATION: cm
<220> FEATURE:
<221> NAME/KEY: misc_feature
<222> LOCATION: (10)..(10)
<223> OTHER INFORMATION: um
<220> FEATURE:
<221> NAME/KEY: misc_feature
<222> LOCATION: (10)..(21)
<223> OTHER INFORMATION: um
<220> FEATURE:
<221> NAME/KEY: misc_feature
<222> LOCATION: (12)..(13)
<223> OTHER INFORMATION: um
<220> FEATURE:
<221> NAME/KEY: misc_feature
<222> LOCATION: (14)..(14)
<223> OTHER INFORMATION: cm

<400> SEQUENCE: 93
aggcaaaggu guucaaagau u                                             21

<210> SEQ ID NO 94
<211> LENGTH: 21
<212> TYPE: RNA
```

```
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (1)..(2)
<223> OTHER INFORMATION: phosphorothioate bond
<220> FEATURE:
<221> NAME/KEY: misc_feature
<222> LOCATION: (9)..(9)
<223> OTHER INFORMATION: cm
<220> FEATURE:
<221> NAME/KEY: misc_feature
<222> LOCATION: (20)..(21)
<223> OTHER INFORMATION: um

<400> SEQUENCE: 94
ucuuugaaca ccuuugccuu u                                              21

<210> SEQ ID NO 95
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (1)..(2)
<223> OTHER INFORMATION: phosphorothioate bond
<220> FEATURE:
<221> NAME/KEY: misc_feature
<222> LOCATION: (2)..(3)
<223> OTHER INFORMATION: phosphorothioate bond
<220> FEATURE:
<221> NAME/KEY: misc_feature
<222> LOCATION: (4)..(4)
<223> OTHER INFORMATION: cm
<220> FEATURE:
<221> NAME/KEY: misc_feature
<222> LOCATION: (10)..(10)
<223> OTHER INFORMATION: um
<220> FEATURE:
<221> NAME/KEY: misc_feature
<222> LOCATION: (12)..(13)
<223> OTHER INFORMATION: um
<220> FEATURE:
<221> NAME/KEY: misc_feature
<222> LOCATION: (14)..(14)
<223> OTHER INFORMATION: cm
<220> FEATURE:
<221> NAME/KEY: misc_feature
<222> LOCATION: (20)..(21)
<223> OTHER INFORMATION: um

<400> SEQUENCE: 95
aggcaaaggu guucaaagau u                                              21

<210> SEQ ID NO 96
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (1)..(3)
<223> OTHER INFORMATION: phosphorothioate bond
<220> FEATURE:
<221> NAME/KEY: misc_feature
<222> LOCATION: (9)..(9)
<223> OTHER INFORMATION: cm
<220> FEATURE:
<221> NAME/KEY: misc_feature
<222> LOCATION: (20)..(21)
<223> OTHER INFORMATION: um
```

```
<400> SEQUENCE: 96
ucuuugaaca ccuuugccuu u                                              21

<210> SEQ ID NO 97
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (1)..(2)
<223> OTHER INFORMATION: phosphorothioate bond
<220> FEATURE:
<221> NAME/KEY: misc_feature
<222> LOCATION: (4)..(4)
<223> OTHER INFORMATION: cm
<220> FEATURE:
<221> NAME/KEY: misc_feature
<222> LOCATION: (10)..(10)
<223> OTHER INFORMATION: um
<220> FEATURE:
<221> NAME/KEY: misc_feature
<222> LOCATION: (12)..(13)
<223> OTHER INFORMATION: um
<220> FEATURE:
<221> NAME/KEY: misc_feature
<222> LOCATION: (14)..(14)
<223> OTHER INFORMATION: cm
<220> FEATURE:
<221> NAME/KEY: misc_feature
<222> LOCATION: (19)..(20)
<223> OTHER INFORMATION: phosphorothioate bond
<220> FEATURE:
<221> NAME/KEY: misc_feature
<222> LOCATION: (20)..(21)
<223> OTHER INFORMATION: phosphorothioate bond
<220> FEATURE:
<221> NAME/KEY: misc_feature
<222> LOCATION: (20)..(21)
<223> OTHER INFORMATION: um

<400> SEQUENCE: 97
aggcaaaggu guucaaagau u                                              21

<210> SEQ ID NO 98
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (1)..(2)
<223> OTHER INFORMATION: phosphorothioate bond
<220> FEATURE:
<221> NAME/KEY: misc_feature
<222> LOCATION: (9)..(9)
<223> OTHER INFORMATION: cm
<220> FEATURE:
<221> NAME/KEY: misc_feature
<222> LOCATION: (19)..(21)
<223> OTHER INFORMATION: phosphorothioate bond
<220> FEATURE:
<221> NAME/KEY: misc_feature
<222> LOCATION: (20)..(21)
<223> OTHER INFORMATION: um

<400> SEQUENCE: 98
ucuuugaaca ccuuugccuu u                                              21

<210> SEQ ID NO 99
```

```
<211> LENGTH: 19
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (4)..(4)
<223> OTHER INFORMATION: cm
<220> FEATURE:
<221> NAME/KEY: misc_feature
<222> LOCATION: (10)..(10)
<223> OTHER INFORMATION: um
<220> FEATURE:
<221> NAME/KEY: misc_feature
<222> LOCATION: (12)..(13)
<223> OTHER INFORMATION: um
<220> FEATURE:
<221> NAME/KEY: misc_feature
<222> LOCATION: (14)..(14)
<223> OTHER INFORMATION: cm

<400> SEQUENCE: 99
aggcaaaggu guucaaaga                                                 19

<210> SEQ ID NO 100
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (9)..(9)
<223> OTHER INFORMATION: cm
<220> FEATURE:
<221> NAME/KEY: misc_feature
<222> LOCATION: (20)..(21)
<223> OTHER INFORMATION: um

<400> SEQUENCE: 100
ucuuugaaca ccuuugccuu u                                              21

<210> SEQ ID NO 101
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (2)..(2)
<223> OTHER INFORMATION: um
<220> FEATURE:
<221> NAME/KEY: misc_feature
<222> LOCATION: (6)..(6)
<223> OTHER INFORMATION: cm
<220> FEATURE:
<221> NAME/KEY: misc_feature
<222> LOCATION: (12)..(12)
<223> OTHER INFORMATION: um
<220> FEATURE:
<221> NAME/KEY: misc_feature
<222> LOCATION: (14)..(15)
<223> OTHER INFORMATION: um
<220> FEATURE:
<221> NAME/KEY: misc_feature
<222> LOCATION: (16)..(16)
<223> OTHER INFORMATION: cm

<400> SEQUENCE: 101
auaggcaaag guguucaaag a                                              21
```

```
<210> SEQ ID NO 102
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (9)..(9)
<223> OTHER INFORMATION: cm
<220> FEATURE:
<221> NAME/KEY: misc_feature
<222> LOCATION: (20)..(21)
<223> OTHER INFORMATION: um

<400> SEQUENCE: 102
ucuuugaaca ccuuugccuu u                                              21

<210> SEQ ID NO 103

<400> SEQUENCE: 103

000

<210> SEQ ID NO 104
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (9)..(9)
<223> OTHER INFORMATION: cm
<220> FEATURE:
<221> NAME/KEY: misc_feature
<222> LOCATION: (20)..(21)
<223> OTHER INFORMATION: um

<400> SEQUENCE: 104
ucuuugaaca ccuuugccuu u                                              21

<210> SEQ ID NO 105

<400> SEQUENCE: 105

000

<210> SEQ ID NO 106
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (8)..(8)
<223> OTHER INFORMATION: cm
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 106
cuuugaacac cuuugccuun n                                              21

<210> SEQ ID NO 107
```

```
<211> LENGTH: 19
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (5)..(5)
<223> OTHER INFORMATION: cm
<220> FEATURE:
<221> NAME/KEY: misc_feature
<222> LOCATION: (11)..(11)
<223> OTHER INFORMATION: um
<220> FEATURE:
<221> NAME/KEY: misc_feature
<222> LOCATION: (13)..(14)
<223> OTHER INFORMATION: um
<220> FEATURE:
<221> NAME/KEY: misc_feature
<222> LOCATION: (15)..(15)
<223> OTHER INFORMATION: cm

<400> SEQUENCE: 107
aaggcaaagg uguucaaag                                               19

<210> SEQ ID NO 108
<211> LENGTH: 19
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (8)..(8)
<223> OTHER INFORMATION: cm

<400> SEQUENCE: 108
cuuugaacac cuuugccuu                                               19

<210> SEQ ID NO 109
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (9)..(9)
<223> OTHER INFORMATION: cm
<220> FEATURE:
<221> NAME/KEY: misc_feature
<222> LOCATION: (10)..(10)
<223> OTHER INFORMATION: um
<220> FEATURE:
<221> NAME/KEY: misc_feature
<222> LOCATION: (12)..(14)
<223> OTHER INFORMATION: um
<220> FEATURE:
<221> NAME/KEY: misc_feature
<222> LOCATION: (16)..(16)
<223> OTHER INFORMATION: cm
<220> FEATURE:
<221> NAME/KEY: misc_feature
<222> LOCATION: (19)..(19)
<223> OTHER INFORMATION: cm
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond
```

-continued

```
<400> SEQUENCE: 109
gaaaggaacu guuuacaacn n                                           21

<210> SEQ ID NO 110
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (5)..(5)
<223> OTHER INFORMATION: um
<220> FEATURE:
<221> NAME/KEY: misc_feature
<222> LOCATION: (9)..(9)
<223> OTHER INFORMATION: cm
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 110
guuguaaaca guuccuuucn n                                           21

<210> SEQ ID NO 111
<211> LENGTH: 19
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (9)..(9)
<223> OTHER INFORMATION: cm
<220> FEATURE:
<221> NAME/KEY: misc_feature
<222> LOCATION: (10)..(10)
<223> OTHER INFORMATION: um
<220> FEATURE:
<221> NAME/KEY: misc_feature
<222> LOCATION: (13)..(15)
<223> OTHER INFORMATION: um
<220> FEATURE:
<221> NAME/KEY: misc_feature
<222> LOCATION: (17)..(17)
<223> OTHER INFORMATION: cm
<220> FEATURE:
<221> NAME/KEY: misc_feature
<222> LOCATION: (19)..(19)
<223> OTHER INFORMATION: cm

<400> SEQUENCE: 111
gaaaggaacu guuuacaac                                              19

<210> SEQ ID NO 112
<211> LENGTH: 19
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (5)..(5)
<223> OTHER INFORMATION: um
<220> FEATURE:
<221> NAME/KEY: misc_feature
<222> LOCATION: (9)..(9)
```

<223> OTHER INFORMATION: cm

<400> SEQUENCE: 112
guuguaaaca guuccuuuc                                                                        19

<210> SEQ ID NO 113
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (1)..(1)
<223> OTHER INFORMATION: um
<220> FEATURE:
<221> NAME/KEY: misc_feature
<222> LOCATION: (4)..(4)
<223> OTHER INFORMATION: um
<220> FEATURE:
<221> NAME/KEY: misc_feature
<222> LOCATION: (6)..(6)
<223> OTHER INFORMATION: um
<220> FEATURE:
<221> NAME/KEY: misc_feature
<222> LOCATION: (8)..(8)
<223> OTHER INFORMATION: um
<220> FEATURE:
<221> NAME/KEY: misc_feature
<222> LOCATION: (10)..(10)
<223> OTHER INFORMATION: um
<220> FEATURE:
<221> NAME/KEY: misc_feature
<222> LOCATION: (12)..(13)
<223> OTHER INFORMATION: um
<220> FEATURE:
<221> NAME/KEY: misc_feature
<222> LOCATION: (15)..(15)
<223> OTHER INFORMATION: cm
<220> FEATURE:
<221> NAME/KEY: misc_feature
<222> LOCATION: (16)..(16)
<223> OTHER INFORMATION: um
<220> FEATURE:
<221> NAME/KEY: misc_feature
<222> LOCATION: (19)..(19)
<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 113
ugguauaugu guugcugaun n                                                                     21

<210> SEQ ID NO 114
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (3)..(3)
<223> OTHER INFORMATION: cm
<220> FEATURE:
<221> NAME/KEY: misc_feature
<222> LOCATION: (6)..(6)
<223> OTHER INFORMATION: cm
<220> FEATURE:
<221> NAME/KEY: misc_feature

```
<222> LOCATION: (9)..(9)
<223> OTHER INFORMATION: cm
<220> FEATURE:
<221> NAME/KEY: misc_feature
<222> LOCATION: (11)..(11)
<223> OTHER INFORMATION: cm
<220> FEATURE:
<221> NAME/KEY: misc_feature
<222> LOCATION: (13)..(13)
<223> OTHER INFORMATION: um
<220> FEATURE:
<221> NAME/KEY: misc_feature
<222> LOCATION: (15)..(15)
<223> OTHER INFORMATION: um
<220> FEATURE:
<221> NAME/KEY: misc_feature
<222> LOCATION: (18)..(18)
<223> OTHER INFORMATION: cm
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 114
aucagcaaca cauauaccan n                                          21

<210> SEQ ID NO 115
<211> LENGTH: 19
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (1)..(1)
<223> OTHER INFORMATION: um
<220> FEATURE:
<221> NAME/KEY: misc_feature
<222> LOCATION: (4)..(4)
<223> OTHER INFORMATION: um
<220> FEATURE:
<221> NAME/KEY: misc_feature
<222> LOCATION: (6)..(6)
<223> OTHER INFORMATION: um
<220> FEATURE:
<221> NAME/KEY: misc_feature
<222> LOCATION: (8)..(8)
<223> OTHER INFORMATION: um
<220> FEATURE:
<221> NAME/KEY: misc_feature
<222> LOCATION: (10)..(10)
<223> OTHER INFORMATION: um
<220> FEATURE:
<221> NAME/KEY: misc_feature
<222> LOCATION: (12)..(13)
<223> OTHER INFORMATION: um
<220> FEATURE:
<221> NAME/KEY: misc_feature
<222> LOCATION: (15)..(15)
<223> OTHER INFORMATION: cm
<220> FEATURE:
<221> NAME/KEY: misc_feature
<222> LOCATION: (16)..(16)
<223> OTHER INFORMATION: um
<220> FEATURE:
<221> NAME/KEY: misc_feature
<222> LOCATION: (19)..(19)
<223> OTHER INFORMATION: um

<400> SEQUENCE: 115
ugguauaugu guugcugau                                             19
```

```
<210> SEQ ID NO 116
<211> LENGTH: 19
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (3)..(3)
<223> OTHER INFORMATION: cm
<220> FEATURE:
<221> NAME/KEY: misc_feature
<222> LOCATION: (6)..(6)
<223> OTHER INFORMATION: cm
<220> FEATURE:
<221> NAME/KEY: misc_feature
<222> LOCATION: (9)..(9)
<223> OTHER INFORMATION: cm
<220> FEATURE:
<221> NAME/KEY: misc_feature
<222> LOCATION: (11)..(11)
<223> OTHER INFORMATION: cm
<220> FEATURE:
<221> NAME/KEY: misc_feature
<222> LOCATION: (13)..(13)
<223> OTHER INFORMATION: um
<220> FEATURE:
<221> NAME/KEY: misc_feature
<222> LOCATION: (15)..(15)
<223> OTHER INFORMATION: um
<220> FEATURE:
<221> NAME/KEY: misc_feature
<222> LOCATION: (18)..(18)
<223> OTHER INFORMATION: cm

<400> SEQUENCE: 116
aucagcaaca cauauacca                                                  19

<210> SEQ ID NO 117
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (1)..(1)
<223> OTHER INFORMATION: um
<220> FEATURE:
<221> NAME/KEY: misc_feature
<222> LOCATION: (1)..(2)
<223> OTHER INFORMATION: phosphorothioate bond
<220> FEATURE:
<221> NAME/KEY: misc_feature
<222> LOCATION: (4)..(4)
<223> OTHER INFORMATION: um
<220> FEATURE:
<221> NAME/KEY: misc_feature
<222> LOCATION: (6)..(6)
<223> OTHER INFORMATION: um
<220> FEATURE:
<221> NAME/KEY: misc_feature
<222> LOCATION: (8)..(8)
<223> OTHER INFORMATION: um
<220> FEATURE:
<221> NAME/KEY: misc_feature
<222> LOCATION: (10)..(10)
<223> OTHER INFORMATION: um
<220> FEATURE:
<221> NAME/KEY: misc_feature
<222> LOCATION: (12)..(13)
<223> OTHER INFORMATION: um
<220> FEATURE:
<221> NAME/KEY: misc_feature
<222> LOCATION: (15)..(15)
<223> OTHER INFORMATION: cm
```

```
<220> FEATURE:
<221> NAME/KEY: misc_feature
<222> LOCATION: (16)..(16)
<223> OTHER INFORMATION: um
<220> FEATURE:
<221> NAME/KEY: misc_feature
<222> LOCATION: (19)..(21)
<223> OTHER INFORMATION: um

<400> SEQUENCE: 117
ugguauaugu guugcugauu u                                           21

<210> SEQ ID NO 118
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (1)..(2)
<223> OTHER INFORMATION: phosphorothioate bond
<220> FEATURE:
<221> NAME/KEY: misc_feature
<222> LOCATION: (3)..(3)
<223> OTHER INFORMATION: cm
<220> FEATURE:
<221> NAME/KEY: misc_feature
<222> LOCATION: (6)..(6)
<223> OTHER INFORMATION: cm
<220> FEATURE:
<221> NAME/KEY: misc_feature
<222> LOCATION: (9)..(9)
<223> OTHER INFORMATION: cm
<220> FEATURE:
<221> NAME/KEY: misc_feature
<222> LOCATION: (11)..(11)
<223> OTHER INFORMATION: cm
<220> FEATURE:
<221> NAME/KEY: misc_feature
<222> LOCATION: (13)..(13)
<223> OTHER INFORMATION: um
<220> FEATURE:
<221> NAME/KEY: misc_feature
<222> LOCATION: (15)..(15)
<223> OTHER INFORMATION: um
<220> FEATURE:
<221> NAME/KEY: misc_feature
<222> LOCATION: (18)..(18)
<223> OTHER INFORMATION: cm
<220> FEATURE:
<221> NAME/KEY: misc_feature
<222> LOCATION: (20)..(21)
<223> OTHER INFORMATION: um

<400> SEQUENCE: 118
aucagcaaca cauauaccau u                                           21

<210> SEQ ID NO 119
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (1)..(3)
<223> OTHER INFORMATION: phosphorothioate bond
<220> FEATURE:
<221> NAME/KEY: misc_feature
<222> LOCATION: (1)..(1)
<223> OTHER INFORMATION: um
<220> FEATURE:
<221> NAME/KEY: misc_feature
<222> LOCATION: (4)..(4)
```

```
<223> OTHER INFORMATION: um
<220> FEATURE:
<221> NAME/KEY: misc_feature
<222> LOCATION: (6)..(6)
<223> OTHER INFORMATION: um
<220> FEATURE:
<221> NAME/KEY: misc_feature
<222> LOCATION: (8)..(8)
<223> OTHER INFORMATION: um
<220> FEATURE:
<221> NAME/KEY: misc_feature
<222> LOCATION: (10)..(10)
<223> OTHER INFORMATION: um
<220> FEATURE:
<221> NAME/KEY: misc_feature
<222> LOCATION: (12)..(13)
<223> OTHER INFORMATION: um
<220> FEATURE:
<221> NAME/KEY: misc_feature
<222> LOCATION: (15)..(15)
<223> OTHER INFORMATION: cm
<220> FEATURE:
<221> NAME/KEY: misc_feature
<222> LOCATION: (16)..(16)
<223> OTHER INFORMATION: um
<220> FEATURE:
<221> NAME/KEY: misc_feature
<222> LOCATION: (19)..(21)
<223> OTHER INFORMATION: um

<400> SEQUENCE: 119
ugguauaugu guugcugauu u                                              21

<210> SEQ ID NO 120
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (1)..(3)
<223> OTHER INFORMATION: phosphorothioate bond
<220> FEATURE:
<221> NAME/KEY: misc_feature
<222> LOCATION: (3)..(3)
<223> OTHER INFORMATION: cm
<220> FEATURE:
<221> NAME/KEY: misc_feature
<222> LOCATION: (6)..(6)
<223> OTHER INFORMATION: cm
<220> FEATURE:
<221> NAME/KEY: misc_feature
<222> LOCATION: (9)..(9)
<223> OTHER INFORMATION: cm
<220> FEATURE:
<221> NAME/KEY: misc_feature
<222> LOCATION: (11)..(11)
<223> OTHER INFORMATION: cm
<220> FEATURE:
<221> NAME/KEY: misc_feature
<222> LOCATION: (13)..(13)
<223> OTHER INFORMATION: um
<220> FEATURE:
<221> NAME/KEY: misc_feature
<222> LOCATION: (15)..(15)
<223> OTHER INFORMATION: um
<220> FEATURE:
<221> NAME/KEY: misc_feature
<222> LOCATION: (18)..(18)
<223> OTHER INFORMATION: cm
<220> FEATURE:
<221> NAME/KEY: misc_feature
<222> LOCATION: (20)..(21)
<223> OTHER INFORMATION: um
```

-continued

<400> SEQUENCE: 120
aucagcaaca cauauaccau u                                                    21

<210> SEQ ID NO 121
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (1)..(1)
<223> OTHER INFORMATION: um
<220> FEATURE:
<221> NAME/KEY: misc_feature
<222> LOCATION: (1)..(2)
<223> OTHER INFORMATION: phosphorothioate bond
<220> FEATURE:
<221> NAME/KEY: misc_feature
<222> LOCATION: (4)..(4)
<223> OTHER INFORMATION: um
<220> FEATURE:
<221> NAME/KEY: misc_feature
<222> LOCATION: (6)..(6)
<223> OTHER INFORMATION: um
<220> FEATURE:
<221> NAME/KEY: misc_feature
<222> LOCATION: (8)..(8)
<223> OTHER INFORMATION: um
<220> FEATURE:
<221> NAME/KEY: misc_feature
<222> LOCATION: (10)..(10)
<223> OTHER INFORMATION: um
<220> FEATURE:
<221> NAME/KEY: misc_feature
<222> LOCATION: (12)..(13)
<223> OTHER INFORMATION: um
<220> FEATURE:
<221> NAME/KEY: misc_feature
<222> LOCATION: (15)..(15)
<223> OTHER INFORMATION: cm
<220> FEATURE:
<221> NAME/KEY: misc_feature
<222> LOCATION: (16)..(16)
<223> OTHER INFORMATION: um
<220> FEATURE:
<221> NAME/KEY: misc_feature
<222> LOCATION: (19)..(21)
<223> OTHER INFORMATION: um
<220> FEATURE:
<221> NAME/KEY: misc_feature
<222> LOCATION: (19)..(21)
<223> OTHER INFORMATION: phosphorothioate bond

<400> SEQUENCE: 121
ugguauaugu guugcugauu u                                                    21

<210> SEQ ID NO 122
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (1)..(2)
<223> OTHER INFORMATION: phosphorothioate bond
<220> FEATURE:
<221> NAME/KEY: misc_feature
<222> LOCATION: (3)..(3)
<223> OTHER INFORMATION: cm
<220> FEATURE:
<221> NAME/KEY: misc_feature
<222> LOCATION: (6)..(6)

```
<223> OTHER INFORMATION: cm
<220> FEATURE:
<221> NAME/KEY: misc_feature
<222> LOCATION: (9)..(9)
<223> OTHER INFORMATION: cm
<220> FEATURE:
<221> NAME/KEY: misc_feature
<222> LOCATION: (11)..(11)
<223> OTHER INFORMATION: cm
<220> FEATURE:
<221> NAME/KEY: misc_feature
<222> LOCATION: (13)..(13)
<223> OTHER INFORMATION: um
<220> FEATURE:
<221> NAME/KEY: misc_feature
<222> LOCATION: (15)..(15)
<223> OTHER INFORMATION: um
<220> FEATURE:
<221> NAME/KEY: misc_feature
<222> LOCATION: (18)..(18)
<223> OTHER INFORMATION: cm
<220> FEATURE:
<221> NAME/KEY: misc_feature
<222> LOCATION: (19)..(21)
<223> OTHER INFORMATION: phosphorothioate bond
<220> FEATURE:
<221> NAME/KEY: misc_feature
<222> LOCATION: (20)..(21)
<223> OTHER INFORMATION: um

<400> SEQUENCE: 122
aucagcaaca cauauaccau u                                              21

<210> SEQ ID NO 123
<211> LENGTH: 19
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (1)..(1)
<223> OTHER INFORMATION: um
<220> FEATURE:
<221> NAME/KEY: misc_feature
<222> LOCATION: (4)..(4)
<223> OTHER INFORMATION: um
<220> FEATURE:
<221> NAME/KEY: misc_feature
<222> LOCATION: (6)..(6)
<223> OTHER INFORMATION: um
<220> FEATURE:
<221> NAME/KEY: misc_feature
<222> LOCATION: (8)..(8)
<223> OTHER INFORMATION: um
<220> FEATURE:
<221> NAME/KEY: misc_feature
<222> LOCATION: (10)..(10)
<223> OTHER INFORMATION: um
<220> FEATURE:
<221> NAME/KEY: misc_feature
<222> LOCATION: (12)..(13)
<223> OTHER INFORMATION: um
<220> FEATURE:
<221> NAME/KEY: misc_feature
<222> LOCATION: (15)..(15)
<223> OTHER INFORMATION: cm
<220> FEATURE:
<221> NAME/KEY: misc_feature
<222> LOCATION: (16)..(16)
<223> OTHER INFORMATION: um
<220> FEATURE:
<221> NAME/KEY: misc_feature
<222> LOCATION: (19)..(19)
<223> OTHER INFORMATION: um
```

-continued

<400> SEQUENCE: 123
ugguauaugu guugcugau                                          19

<210> SEQ ID NO 124
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (3)..(3)
<223> OTHER INFORMATION: cm
<220> FEATURE:
<221> NAME/KEY: misc_feature
<222> LOCATION: (6)..(6)
<223> OTHER INFORMATION: cm
<220> FEATURE:
<221> NAME/KEY: misc_feature
<222> LOCATION: (9)..(9)
<223> OTHER INFORMATION: cm
<220> FEATURE:
<221> NAME/KEY: misc_feature
<222> LOCATION: (11)..(11)
<223> OTHER INFORMATION: cm
<220> FEATURE:
<221> NAME/KEY: misc_feature
<222> LOCATION: (13)..(13)
<223> OTHER INFORMATION: um
<220> FEATURE:
<221> NAME/KEY: misc_feature
<222> LOCATION: (15)..(15)
<223> OTHER INFORMATION: um
<220> FEATURE:
<221> NAME/KEY: misc_feature
<222> LOCATION: (18)..(18)
<223> OTHER INFORMATION: cm
<220> FEATURE:
<221> NAME/KEY: misc_feature
<222> LOCATION: (20)..(21)
<223> OTHER INFORMATION: um

<400> SEQUENCE: 124
aucagcaaca cauauaccau u                                       21

<210> SEQ ID NO 125
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (2)..(3)
<223> OTHER INFORMATION: um
<220> FEATURE:
<221> NAME/KEY: misc_feature
<222> LOCATION: (6)..(6)
<223> OTHER INFORMATION: um
<220> FEATURE:
<221> NAME/KEY: misc_feature
<222> LOCATION: (8)..(8)
<223> OTHER INFORMATION: um
<220> FEATURE:
<221> NAME/KEY: misc_feature
<222> LOCATION: (10)..(10)
<223> OTHER INFORMATION: um
<220> FEATURE:
<221> NAME/KEY: misc_feature
<222> LOCATION: (12)..(12)
<223> OTHER INFORMATION: um
<220> FEATURE:
<221> NAME/KEY: misc_feature
<222> LOCATION: (14)..(15)

```
<223> OTHER INFORMATION: um
<220> FEATURE:
<221> NAME/KEY: misc_feature
<222> LOCATION: (17)..(17)
<223> OTHER INFORMATION: cm
<220> FEATURE:
<221> NAME/KEY: misc_feature
<222> LOCATION: (18)..(18)
<223> OTHER INFORMATION: um
<220> FEATURE:
<221> NAME/KEY: misc_feature
<222> LOCATION: (21)..(21)
<223> OTHER INFORMATION: um

<400> SEQUENCE: 125
auugguauau guguugcuga u                                              21

<210> SEQ ID NO 126
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (3)..(3)
<223> OTHER INFORMATION: cm
<220> FEATURE:
<221> NAME/KEY: misc_feature
<222> LOCATION: (6)..(6)
<223> OTHER INFORMATION: cm
<220> FEATURE:
<221> NAME/KEY: misc_feature
<222> LOCATION: (9)..(9)
<223> OTHER INFORMATION: cm
<220> FEATURE:
<221> NAME/KEY: misc_feature
<222> LOCATION: (11)..(11)
<223> OTHER INFORMATION: cm
<220> FEATURE:
<221> NAME/KEY: misc_feature
<222> LOCATION: (13)..(13)
<223> OTHER INFORMATION: um
<220> FEATURE:
<221> NAME/KEY: misc_feature
<222> LOCATION: (15)..(15)
<223> OTHER INFORMATION: um
<220> FEATURE:
<221> NAME/KEY: misc_feature
<222> LOCATION: (18)..(18)
<223> OTHER INFORMATION: cm
<220> FEATURE:
<221> NAME/KEY: misc_feature
<222> LOCATION: (20)..(21)
<223> OTHER INFORMATION: um

<400> SEQUENCE: 126
aucagcaaca cauauaccau u                                              21

<210> SEQ ID NO 127
<211> LENGTH: 22
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (1)..(1)
<223> OTHER INFORMATION: um
<220> FEATURE:
<221> NAME/KEY: misc_feature
<222> LOCATION: (3)..(4)
<223> OTHER INFORMATION: um
<220> FEATURE:
<221> NAME/KEY: misc_feature
```

```
<222> LOCATION: (7)..(7)
<223> OTHER INFORMATION: um
<220> FEATURE:
<221> NAME/KEY: misc_feature
<222> LOCATION: (9)..(9)
<223> OTHER INFORMATION: um
<220> FEATURE:
<221> NAME/KEY: misc_feature
<222> LOCATION: (11)..(11)
<223> OTHER INFORMATION: um
<220> FEATURE:
<221> NAME/KEY: misc_feature
<222> LOCATION: (13)..(13)
<223> OTHER INFORMATION: um
<220> FEATURE:
<221> NAME/KEY: misc_feature
<222> LOCATION: (15)..(16)
<223> OTHER INFORMATION: um
<220> FEATURE:
<221> NAME/KEY: misc_feature
<222> LOCATION: (18)..(18)
<223> OTHER INFORMATION: cm
<220> FEATURE:
<221> NAME/KEY: misc_feature
<222> LOCATION: (19)..(19)
<223> OTHER INFORMATION: um
<220> FEATURE:
<221> NAME/KEY: misc_feature
<222> LOCATION: (22)..(22)
<223> OTHER INFORMATION: um

<400> SEQUENCE: 127
uauugguaua uguguugcug au                                              22

<210> SEQ ID NO 128
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (3)..(3)
<223> OTHER INFORMATION: cm
<220> FEATURE:
<221> NAME/KEY: misc_feature
<222> LOCATION: (6)..(6)
<223> OTHER INFORMATION: cm
<220> FEATURE:
<221> NAME/KEY: misc_feature
<222> LOCATION: (9)..(9)
<223> OTHER INFORMATION: cm
<220> FEATURE:
<221> NAME/KEY: misc_feature
<222> LOCATION: (11)..(11)
<223> OTHER INFORMATION: cm
<220> FEATURE:
<221> NAME/KEY: misc_feature
<222> LOCATION: (13)..(13)
<223> OTHER INFORMATION: um
<220> FEATURE:
<221> NAME/KEY: misc_feature
<222> LOCATION: (15)..(15)
<223> OTHER INFORMATION: um
<220> FEATURE:
<221> NAME/KEY: misc_feature
<222> LOCATION: (18)..(18)
<223> OTHER INFORMATION: cm
<220> FEATURE:
<221> NAME/KEY: misc_feature
<222> LOCATION: (20)..(21)
<223> OTHER INFORMATION: um

<400> SEQUENCE: 128
aucagcaaca cauauaccau u                                               21
```

```
<210> SEQ ID NO 129
<211> LENGTH: 23
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (1)..(1)
<223> OTHER INFORMATION: um
<220> FEATURE:
<221> NAME/KEY: misc_feature
<222> LOCATION: (3)..(4)
<223> OTHER INFORMATION: um
<220> FEATURE:
<221> NAME/KEY: misc_feature
<222> LOCATION: (7)..(7)
<223> OTHER INFORMATION: um
<220> FEATURE:
<221> NAME/KEY: misc_feature
<222> LOCATION: (9)..(9)
<223> OTHER INFORMATION: um
<220> FEATURE:
<221> NAME/KEY: misc_feature
<222> LOCATION: (11)..(11)
<223> OTHER INFORMATION: um
<220> FEATURE:
<221> NAME/KEY: misc_feature
<222> LOCATION: (13)..(13)
<223> OTHER INFORMATION: um
<220> FEATURE:
<221> NAME/KEY: misc_feature
<222> LOCATION: (15)..(16)
<223> OTHER INFORMATION: um
<220> FEATURE:
<221> NAME/KEY: misc_feature
<222> LOCATION: (18)..(18)
<223> OTHER INFORMATION: cm
<220> FEATURE:
<221> NAME/KEY: misc_feature
<222> LOCATION: (19)..(19)
<223> OTHER INFORMATION: um
<220> FEATURE:
<221> NAME/KEY: misc_feature
<222> LOCATION: (22)..(22)
<223> OTHER INFORMATION: um
<220> FEATURE:
<221> NAME/KEY: misc_feature
<222> LOCATION: (23)..(23)
<223> OTHER INFORMATION: n=Inverted deoxythymidine

<400> SEQUENCE: 129
uauugguaua uguguugcug aun                                            23

<210> SEQ ID NO 130
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (3)..(3)
<223> OTHER INFORMATION: cm
<220> FEATURE:
<221> NAME/KEY: misc_feature
<222> LOCATION: (6)..(6)
<223> OTHER INFORMATION: cm
<220> FEATURE:
<221> NAME/KEY: misc_feature
<222> LOCATION: (9)..(9)
<223> OTHER INFORMATION: cm
<220> FEATURE:
<221> NAME/KEY: misc_feature
<222> LOCATION: (11)..(11)
<223> OTHER INFORMATION: cm
```

```
<220> FEATURE:
<221> NAME/KEY: misc_feature
<222> LOCATION: (13)..(13)
<223> OTHER INFORMATION: um
<220> FEATURE:
<221> NAME/KEY: misc_feature
<222> LOCATION: (15)..(15)
<223> OTHER INFORMATION: um
<220> FEATURE:
<221> NAME/KEY: misc_feature
<222> LOCATION: (18)..(18)
<223> OTHER INFORMATION: cm
<220> FEATURE:
<221> NAME/KEY: misc_feature
<222> LOCATION: (20)..(21)
<223> OTHER INFORMATION: um

<400> SEQUENCE: 130
aucagcaaca cauauaccau u                                              21

<210> SEQ ID NO 131
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (1)..(1)
<223> OTHER INFORMATION: um
<220> FEATURE:
<221> NAME/KEY: misc_feature
<222> LOCATION: (4)..(4)
<223> OTHER INFORMATION: um
<220> FEATURE:
<221> NAME/KEY: misc_feature
<222> LOCATION: (6)..(6)
<223> OTHER INFORMATION: um
<220> FEATURE:
<221> NAME/KEY: misc_feature
<222> LOCATION: (8)..(8)
<223> OTHER INFORMATION: um
<220> FEATURE:
<221> NAME/KEY: misc_feature
<222> LOCATION: (10)..(10)
<223> OTHER INFORMATION: um
<220> FEATURE:
<221> NAME/KEY: misc_feature
<222> LOCATION: (12)..(13)
<223> OTHER INFORMATION: um
<220> FEATURE:
<221> NAME/KEY: misc_feature
<222> LOCATION: (16)..(16)
<223> OTHER INFORMATION: um
<220> FEATURE:
<221> NAME/KEY: misc_feature
<222> LOCATION: (19)..(21)
<223> OTHER INFORMATION: um

<400> SEQUENCE: 131
ugguauaugu guugcugauu u                                              21

<210> SEQ ID NO 132
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (3)..(3)
<223> OTHER INFORMATION: cm
<220> FEATURE:
<221> NAME/KEY: misc_feature
<222> LOCATION: (6)..(6)
```

<223> OTHER INFORMATION: cm
<220> FEATURE:
<221> NAME/KEY: misc_feature
<222> LOCATION: (9)..(9)
<223> OTHER INFORMATION: cm
<220> FEATURE:
<221> NAME/KEY: misc_feature
<222> LOCATION: (11)..(11)
<223> OTHER INFORMATION: cm
<220> FEATURE:
<221> NAME/KEY: misc_feature
<222> LOCATION: (13)..(13)
<223> OTHER INFORMATION: um
<220> FEATURE:
<221> NAME/KEY: misc_feature
<222> LOCATION: (15)..(15)
<223> OTHER INFORMATION: um
<220> FEATURE:
<221> NAME/KEY: misc_feature
<222> LOCATION: (18)..(18)
<223> OTHER INFORMATION: cm
<220> FEATURE:
<221> NAME/KEY: misc_feature
<222> LOCATION: (20)..(21)
<223> OTHER INFORMATION: um

<400> SEQUENCE: 132
aucagcaaca cauauaccau u                                              21

<210> SEQ ID NO 133
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (1)..(1)
<223> OTHER INFORMATION: um
<220> FEATURE:
<221> NAME/KEY: misc_feature
<222> LOCATION: (4)..(4)
<223> OTHER INFORMATION: um
<220> FEATURE:
<221> NAME/KEY: misc_feature
<222> LOCATION: (6)..(6)
<223> OTHER INFORMATION: um
<220> FEATURE:
<221> NAME/KEY: misc_feature
<222> LOCATION: (8)..(8)
<223> OTHER INFORMATION: um
<220> FEATURE:
<221> NAME/KEY: misc_feature
<222> LOCATION: (10)..(10)
<223> OTHER INFORMATION: um
<220> FEATURE:
<221> NAME/KEY: misc_feature
<222> LOCATION: (12)..(13)
<223> OTHER INFORMATION: um
<220> FEATURE:
<221> NAME/KEY: misc_feature
<222> LOCATION: (15)..(15)
<223> OTHER INFORMATION: cm
<220> FEATURE:
<221> NAME/KEY: misc_feature
<222> LOCATION: (19)..(21)
<223> OTHER INFORMATION: um

<400> SEQUENCE: 133
ugguauaugu guugcugauu u                                              21

<210> SEQ ID NO 134
<211> LENGTH: 21
<212> TYPE: RNA
<213> ORGANISM: Artificial Sequence

```
<220> FEATURE:
<223> OTHER INFORMATION: synthesized siRNA antisense sequence
<220> FEATURE:
<221> NAME/KEY: misc_feature
<222> LOCATION: (3)..(3)
<223> OTHER INFORMATION: cm
<220> FEATURE:
<221> NAME/KEY: misc_feature
<222> LOCATION: (6)..(6)
<223> OTHER INFORMATION: cm
<220> FEATURE:
<221> NAME/KEY: misc_feature
<222> LOCATION: (9)..(9)
<223> OTHER INFORMATION: cm
<220> FEATURE:
<221> NAME/KEY: misc_feature
<222> LOCATION: (11)..(11)
<223> OTHER INFORMATION: cm
<220> FEATURE:
<221> NAME/KEY: misc_feature
<222> LOCATION: (13)..(13)
<223> OTHER INFORMATION: um
<220> FEATURE:
<221> NAME/KEY: misc_feature
<222> LOCATION: (15)..(15)
<223> OTHER INFORMATION: um
<220> FEATURE:
<221> NAME/KEY: misc_feature
<222> LOCATION: (18)..(18)
<223> OTHER INFORMATION: cm
<220> FEATURE:
<221> NAME/KEY: misc_feature
<222> LOCATION: (20)..(21)
<223> OTHER INFORMATION: um

<400> SEQUENCE: 134
aucagcaaca cauauaccau u                                         21

<210> SEQ ID NO 135
<211> LENGTH: 20
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (2)..(3)
<223> OTHER INFORMATION: um
<220> FEATURE:
<221> NAME/KEY: misc_feature
<222> LOCATION: (6)..(6)
<223> OTHER INFORMATION: um
<220> FEATURE:
<221> NAME/KEY: misc_feature
<222> LOCATION: (8)..(8)
<223> OTHER INFORMATION: um
<220> FEATURE:
<221> NAME/KEY: misc_feature
<222> LOCATION: (10)..(10)
<223> OTHER INFORMATION: um
<220> FEATURE:
<221> NAME/KEY: misc_feature
<222> LOCATION: (12)..(12)
<223> OTHER INFORMATION: um
<220> FEATURE:
<221> NAME/KEY: misc_feature
<222> LOCATION: (14)..(15)
<223> OTHER INFORMATION: um
<220> FEATURE:
<221> NAME/KEY: misc_feature
<222> LOCATION: (17)..(17)
<223> OTHER INFORMATION: cm
<220> FEATURE:
<221> NAME/KEY: misc_feature
<222> LOCATION: (18)..(18)
<223> OTHER INFORMATION: um
```

<400> SEQUENCE: 135
auugguauau guguugcuga                                          20

<210> SEQ ID NO 136
<211> LENGTH: 20
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (2)..(2)
<223> OTHER INFORMATION: cm
<220> FEATURE:
<221> NAME/KEY: misc_feature
<222> LOCATION: (5)..(5)
<223> OTHER INFORMATION: cm
<220> FEATURE:
<221> NAME/KEY: misc_feature
<222> LOCATION: (8)..(8)
<223> OTHER INFORMATION: cm
<220> FEATURE:
<221> NAME/KEY: misc_feature
<222> LOCATION: (10)..(10)
<223> OTHER INFORMATION: cm
<220> FEATURE:
<221> NAME/KEY: misc_feature
<222> LOCATION: (12)..(12)
<223> OTHER INFORMATION: um
<220> FEATURE:
<221> NAME/KEY: misc_feature
<222> LOCATION: (14)..(14)
<223> OTHER INFORMATION: um
<220> FEATURE:
<221> NAME/KEY: misc_feature
<222> LOCATION: (17)..(17)
<223> OTHER INFORMATION: cm
<220> FEATURE:
<221> NAME/KEY: misc_feature
<222> LOCATION: (19)..(20)
<223> OTHER INFORMATION: um

<400> SEQUENCE: 136
ucagcaacac auauaccauu                                          20

<210> SEQ ID NO 137
<211> LENGTH: 20
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (2)..(2)
<223> OTHER INFORMATION: um
<220> FEATURE:
<221> NAME/KEY: misc_feature
<222> LOCATION: (5)..(5)
<223> OTHER INFORMATION: um
<220> FEATURE:
<221> NAME/KEY: misc_feature
<222> LOCATION: (7)..(7)
<223> OTHER INFORMATION: um
<220> FEATURE:
<221> NAME/KEY: misc_feature
<222> LOCATION: (9)..(9)
<223> OTHER INFORMATION: um
<220> FEATURE:
<221> NAME/KEY: misc_feature
<222> LOCATION: (11)..(11)
<223> OTHER INFORMATION: um
<220> FEATURE:
<221> NAME/KEY: misc_feature
<222> LOCATION: (13)..(14)
<223> OTHER INFORMATION: um

```
<220> FEATURE:
<221> NAME/KEY: misc_feature
<222> LOCATION: (16)..(16)
<223> OTHER INFORMATION: cm
<220> FEATURE:
<221> NAME/KEY: misc_feature
<222> LOCATION: (17)..(17)
<223> OTHER INFORMATION: um
<220> FEATURE:
<221> NAME/KEY: misc_feature
<222> LOCATION: (20)..(20)
<223> OTHER INFORMATION: um

<400> SEQUENCE: 137
augguauaug uguugcugau                                          20

<210> SEQ ID NO 138
<211> LENGTH: 20
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (3)..(3)
<223> OTHER INFORMATION: cm
<220> FEATURE:
<221> NAME/KEY: misc_feature
<222> LOCATION: (6)..(6)
<223> OTHER INFORMATION: cm
<220> FEATURE:
<221> NAME/KEY: misc_feature
<222> LOCATION: (9)..(9)
<223> OTHER INFORMATION: cm
<220> FEATURE:
<221> NAME/KEY: misc_feature
<222> LOCATION: (11)..(11)
<223> OTHER INFORMATION: cm
<220> FEATURE:
<221> NAME/KEY: misc_feature
<222> LOCATION: (13)..(13)
<223> OTHER INFORMATION: um
<220> FEATURE:
<221> NAME/KEY: misc_feature
<222> LOCATION: (15)..(15)
<223> OTHER INFORMATION: um
<220> FEATURE:
<221> NAME/KEY: misc_feature
<222> LOCATION: (18)..(18)
<223> OTHER INFORMATION: cm
<220> FEATURE:
<221> NAME/KEY: misc_feature
<222> LOCATION: (19)..(20)
<223> OTHER INFORMATION: um

<400> SEQUENCE: 138
aucagcaaca cauauaccuu                                          20

<210> SEQ ID NO 139
<211> LENGTH: 19
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (1)..(1)
<223> OTHER INFORMATION: um
<220> FEATURE:
<221> NAME/KEY: misc_feature
<222> LOCATION: (4)..(4)
<223> OTHER INFORMATION: um
<220> FEATURE:
<221> NAME/KEY: misc_feature
<222> LOCATION: (6)..(6)
```

```
<223> OTHER INFORMATION: um
<220> FEATURE:
<221> NAME/KEY: misc_feature
<222> LOCATION: (8)..(8)
<223> OTHER INFORMATION: um
<220> FEATURE:
<221> NAME/KEY: misc_feature
<222> LOCATION: (10)..(10)
<223> OTHER INFORMATION: um
<220> FEATURE:
<221> NAME/KEY: misc_feature
<222> LOCATION: (12)..(13)
<223> OTHER INFORMATION: um
<220> FEATURE:
<221> NAME/KEY: misc_feature
<222> LOCATION: (15)..(15)
<223> OTHER INFORMATION: cm
<220> FEATURE:
<221> NAME/KEY: misc_feature
<222> LOCATION: (16)..(16)
<223> OTHER INFORMATION: um
<220> FEATURE:
<221> NAME/KEY: misc_feature
<222> LOCATION: (19)..(19)
<223> OTHER INFORMATION: um

<400> SEQUENCE: 139
ugguauaugu guugcugau                                                    19

<210> SEQ ID NO 140
<211> LENGTH: 23
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (3)..(3)
<223> OTHER INFORMATION: cm
<220> FEATURE:
<221> NAME/KEY: misc_feature
<222> LOCATION: (6)..(6)
<223> OTHER INFORMATION: cm
<220> FEATURE:
<221> NAME/KEY: misc_feature
<222> LOCATION: (9)..(9)
<223> OTHER INFORMATION: cm
<220> FEATURE:
<221> NAME/KEY: misc_feature
<222> LOCATION: (11)..(11)
<223> OTHER INFORMATION: cm
<220> FEATURE:
<221> NAME/KEY: misc_feature
<222> LOCATION: (13)..(13)
<223> OTHER INFORMATION: um
<220> FEATURE:
<221> NAME/KEY: misc_feature
<222> LOCATION: (15)..(15)
<223> OTHER INFORMATION: um
<220> FEATURE:
<221> NAME/KEY: misc_feature
<222> LOCATION: (18)..(18)
<223> OTHER INFORMATION: cm
<220> FEATURE:
<221> NAME/KEY: misc_feature
<222> LOCATION: (20)..(23)
<223> OTHER INFORMATION: um

<400> SEQUENCE: 140
aucagcaaca cauauaccau uuu                                               23

<210> SEQ ID NO 141
<211> LENGTH: 19
<212> TYPE: RNA
<213> ORGANISM: Artificial Sequence
```

```
<220> FEATURE:
<223> OTHER INFORMATION: synthesized siRNA sense sequence
<220> FEATURE:
<221> NAME/KEY: misc_feature
<222> LOCATION: (1)..(1)
<223> OTHER INFORMATION: um
<220> FEATURE:
<221> NAME/KEY: misc_feature
<222> LOCATION: (4)..(4)
<223> OTHER INFORMATION: um
<220> FEATURE:
<221> NAME/KEY: misc_feature
<222> LOCATION: (6)..(6)
<223> OTHER INFORMATION: um
<220> FEATURE:
<221> NAME/KEY: misc_feature
<222> LOCATION: (8)..(8)
<223> OTHER INFORMATION: um
<220> FEATURE:
<221> NAME/KEY: misc_feature
<222> LOCATION: (10)..(10)
<223> OTHER INFORMATION: um
<220> FEATURE:
<221> NAME/KEY: misc_feature
<222> LOCATION: (12)..(13)
<223> OTHER INFORMATION: um
<220> FEATURE:
<221> NAME/KEY: misc_feature
<222> LOCATION: (16)..(16)
<223> OTHER INFORMATION: um
<220> FEATURE:
<221> NAME/KEY: misc_feature
<222> LOCATION: (19)..(19)
<223> OTHER INFORMATION: um

<400> SEQUENCE: 141
ugguauaugu guugcugau                                                19

<210> SEQ ID NO 142
<211> LENGTH: 23
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (3)..(3)
<223> OTHER INFORMATION: cm
<220> FEATURE:
<221> NAME/KEY: misc_feature
<222> LOCATION: (6)..(6)
<223> OTHER INFORMATION: cm
<220> FEATURE:
<221> NAME/KEY: misc_feature
<222> LOCATION: (9)..(9)
<223> OTHER INFORMATION: cm
<220> FEATURE:
<221> NAME/KEY: misc_feature
<222> LOCATION: (11)..(11)
<223> OTHER INFORMATION: cm
<220> FEATURE:
<221> NAME/KEY: misc_feature
<222> LOCATION: (13)..(13)
<223> OTHER INFORMATION: um
<220> FEATURE:
<221> NAME/KEY: misc_feature
<222> LOCATION: (15)..(15)
<223> OTHER INFORMATION: um
<220> FEATURE:
<221> NAME/KEY: misc_feature
<222> LOCATION: (18)..(18)
<223> OTHER INFORMATION: cm
<220> FEATURE:
<221> NAME/KEY: misc_feature
<222> LOCATION: (20)..(23)
<223> OTHER INFORMATION: um
```

```
<400> SEQUENCE: 142
aucagcaaca cauauaccau uuu                                        23

<210> SEQ ID NO 143
<211> LENGTH: 19
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (1)..(1)
<223> OTHER INFORMATION: um
<220> FEATURE:
<221> NAME/KEY: misc_feature
<222> LOCATION: (4)..(4)
<223> OTHER INFORMATION: um
<220> FEATURE:
<221> NAME/KEY: misc_feature
<222> LOCATION: (6)..(6)
<223> OTHER INFORMATION: um
<220> FEATURE:
<221> NAME/KEY: misc_feature
<222> LOCATION: (8)..(8)
<223> OTHER INFORMATION: um
<220> FEATURE:
<221> NAME/KEY: misc_feature
<222> LOCATION: (10)..(10)
<223> OTHER INFORMATION: um
<220> FEATURE:
<221> NAME/KEY: misc_feature
<222> LOCATION: (12)..(13)
<223> OTHER INFORMATION: um
<220> FEATURE:
<221> NAME/KEY: misc_feature
<222> LOCATION: (16)..(16)
<223> OTHER INFORMATION: um
<220> FEATURE:
<221> NAME/KEY: misc_feature
<222> LOCATION: (19)..(19)
<223> OTHER INFORMATION: um

<400> SEQUENCE: 143
ugguauaugu guugcugau                                             19

<210> SEQ ID NO 144
<211> LENGTH: 23
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (3)..(3)
<223> OTHER INFORMATION: cm
<220> FEATURE:
<221> NAME/KEY: misc_feature
<222> LOCATION: (6)..(6)
<223> OTHER INFORMATION: cm
<220> FEATURE:
<221> NAME/KEY: misc_feature
<222> LOCATION: (9)..(9)
<223> OTHER INFORMATION: cm
<220> FEATURE:
<221> NAME/KEY: misc_feature
<222> LOCATION: (11)..(11)
<223> OTHER INFORMATION: cm
<220> FEATURE:
<221> NAME/KEY: misc_feature
<222> LOCATION: (13)..(13)
<223> OTHER INFORMATION: um
<220> FEATURE:
<221> NAME/KEY: misc_feature
<222> LOCATION: (15)..(15)
<223> OTHER INFORMATION: um
```

```
<220> FEATURE:
<221> NAME/KEY: misc_feature
<222> LOCATION: (18)..(18)
<223> OTHER INFORMATION: cm
<220> FEATURE:
<221> NAME/KEY: misc_feature
<222> LOCATION: (20)..(21)
<223> OTHER INFORMATION: um
<220> FEATURE:
<221> NAME/KEY: misc_feature
<222> LOCATION: (22)..(23)
<223> OTHER INFORMATION: 2'-o-methyladenosine

<400> SEQUENCE: 144
aucagcaaca cauauaccau uaa                                              23

<210> SEQ ID NO 145
<211> LENGTH: 19
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (1)..(1)
<223> OTHER INFORMATION: um
<220> FEATURE:
<221> NAME/KEY: misc_feature
<222> LOCATION: (4)..(4)
<223> OTHER INFORMATION: um
<220> FEATURE:
<221> NAME/KEY: misc_feature
<222> LOCATION: (6)..(6)
<223> OTHER INFORMATION: um
<220> FEATURE:
<221> NAME/KEY: misc_feature
<222> LOCATION: (8)..(8)
<223> OTHER INFORMATION: um
<220> FEATURE:
<221> NAME/KEY: misc_feature
<222> LOCATION: (10)..(10)
<223> OTHER INFORMATION: um
<220> FEATURE:
<221> NAME/KEY: misc_feature
<222> LOCATION: (12)..(13)
<223> OTHER INFORMATION: um
<220> FEATURE:
<221> NAME/KEY: misc_feature
<222> LOCATION: (16)..(16)
<223> OTHER INFORMATION: um
<220> FEATURE:
<221> NAME/KEY: misc_feature
<222> LOCATION: (19)..(19)
<223> OTHER INFORMATION: um

<400> SEQUENCE: 145
ugguauaugu guugcugau                                                   19

<210> SEQ ID NO 146
<211> LENGTH: 23
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (3)..(3)
<223> OTHER INFORMATION: cm
<220> FEATURE:
<221> NAME/KEY: misc_feature
<222> LOCATION: (6)..(6)
<223> OTHER INFORMATION: cm
<220> FEATURE:
<221> NAME/KEY: misc_feature
<222> LOCATION: (9)..(9)
```

```
<223> OTHER INFORMATION: cm
<220> FEATURE:
<221> NAME/KEY: misc_feature
<222> LOCATION: (11)..(11)
<223> OTHER INFORMATION: cm
<220> FEATURE:
<221> NAME/KEY: misc_feature
<222> LOCATION: (13)..(13)
<223> OTHER INFORMATION: um
<220> FEATURE:
<221> NAME/KEY: misc_feature
<222> LOCATION: (15)..(15)
<223> OTHER INFORMATION: um
<220> FEATURE:
<221> NAME/KEY: misc_feature
<222> LOCATION: (18)..(18)
<223> OTHER INFORMATION: cm
<220> FEATURE:
<221> NAME/KEY: misc_feature
<222> LOCATION: (20)..(21)
<223> OTHER INFORMATION: um
<220> FEATURE:
<221> NAME/KEY: misc_feature
<222> LOCATION: (21)..(23)
<223> OTHER INFORMATION: phosphorothioate bond
<220> FEATURE:
<221> NAME/KEY: misc_feature
<222> LOCATION: (22)..(23)
<223> OTHER INFORMATION: 2'-o-methyladenosine

<400> SEQUENCE: 146
aucagcaaca cauauaccau uaa                                         23

<210> SEQ ID NO 147
<211> LENGTH: 19
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (1)..(1)
<223> OTHER INFORMATION: um
<220> FEATURE:
<221> NAME/KEY: misc_feature
<222> LOCATION: (4)..(4)
<223> OTHER INFORMATION: um
<220> FEATURE:
<221> NAME/KEY: misc_feature
<222> LOCATION: (6)..(6)
<223> OTHER INFORMATION: um
<220> FEATURE:
<221> NAME/KEY: misc_feature
<222> LOCATION: (8)..(8)
<223> OTHER INFORMATION: um
<220> FEATURE:
<221> NAME/KEY: misc_feature
<222> LOCATION: (10)..(10)
<223> OTHER INFORMATION: um
<220> FEATURE:
<221> NAME/KEY: misc_feature
<222> LOCATION: (12)..(13)
<223> OTHER INFORMATION: um
<220> FEATURE:
<221> NAME/KEY: misc_feature
<222> LOCATION: (16)..(16)
<223> OTHER INFORMATION: um
<220> FEATURE:
<221> NAME/KEY: misc_feature
<222> LOCATION: (19)..(19)
<223> OTHER INFORMATION: um

<400> SEQUENCE: 147
ugguauaugu guugcugau                                              19
```

```
<210> SEQ ID NO 148
<211> LENGTH: 23
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (3)..(3)
<223> OTHER INFORMATION: cm
<220> FEATURE:
<221> NAME/KEY: misc_feature
<222> LOCATION: (6)..(6)
<223> OTHER INFORMATION: cm
<220> FEATURE:
<221> NAME/KEY: misc_feature
<222> LOCATION: (9)..(9)
<223> OTHER INFORMATION: cm
<220> FEATURE:
<221> NAME/KEY: misc_feature
<222> LOCATION: (11)..(11)
<223> OTHER INFORMATION: cm
<220> FEATURE:
<221> NAME/KEY: misc_feature
<222> LOCATION: (13)..(13)
<223> OTHER INFORMATION: um
<220> FEATURE:
<221> NAME/KEY: misc_feature
<222> LOCATION: (15)..(15)
<223> OTHER INFORMATION: um
<220> FEATURE:
<221> NAME/KEY: misc_feature
<222> LOCATION: (18)..(18)
<223> OTHER INFORMATION: cm
<220> FEATURE:
<221> NAME/KEY: misc_feature
<222> LOCATION: (19)..(21)
<223> OTHER INFORMATION: phosphorothioate bond
<220> FEATURE:
<221> NAME/KEY: misc_feature
<222> LOCATION: (20)..(21)
<223> OTHER INFORMATION: um
<220> FEATURE:
<221> NAME/KEY: misc_feature
<222> LOCATION: (22)..(23)
<223> OTHER INFORMATION: 2'-o-methyladenosine

<400> SEQUENCE: 148
aucagcaaca cauauaccau uaa                                              23

<210> SEQ ID NO 149
<211> LENGTH: 19
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (1)..(1)
<223> OTHER INFORMATION: um
<220> FEATURE:
<221> NAME/KEY: misc_feature
<222> LOCATION: (4)..(4)
<223> OTHER INFORMATION: um
<220> FEATURE:
<221> NAME/KEY: misc_feature
<222> LOCATION: (6)..(6)
<223> OTHER INFORMATION: um
<220> FEATURE:
<221> NAME/KEY: misc_feature
<222> LOCATION: (8)..(8)
<223> OTHER INFORMATION: um
<220> FEATURE:
<221> NAME/KEY: misc_feature
<222> LOCATION: (10)..(10)
<223> OTHER INFORMATION: um
<220> FEATURE:
```

```
<221> NAME/KEY: misc_feature
<222> LOCATION: (12)..(13)
<223> OTHER INFORMATION: um
<220> FEATURE:
<221> NAME/KEY: misc_feature
<222> LOCATION: (16)..(16)
<223> OTHER INFORMATION: um
<220> FEATURE:
<221> NAME/KEY: misc_feature
<222> LOCATION: (19)..(19)
<223> OTHER INFORMATION: um

<400> SEQUENCE: 149
ugguauaugu guugcugau                                                      19

<210> SEQ ID NO 150
<211> LENGTH: 23
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (1)..(1)
<223> OTHER INFORMATION: 2'-o-methyladenosine
<220> FEATURE:
<221> NAME/KEY: misc_feature
<222> LOCATION: (1)..(2)
<223> OTHER INFORMATION: phosphorothioate bond
<220> FEATURE:
<221> NAME/KEY: misc_feature
<222> LOCATION: (3)..(3)
<223> OTHER INFORMATION: cm
<220> FEATURE:
<221> NAME/KEY: misc_feature
<222> LOCATION: (6)..(6)
<223> OTHER INFORMATION: cm
<220> FEATURE:
<221> NAME/KEY: misc_feature
<222> LOCATION: (9)..(9)
<223> OTHER INFORMATION: cm
<220> FEATURE:
<221> NAME/KEY: misc_feature
<222> LOCATION: (11)..(11)
<223> OTHER INFORMATION: cm
<220> FEATURE:
<221> NAME/KEY: misc_feature
<222> LOCATION: (13)..(13)
<223> OTHER INFORMATION: um
<220> FEATURE:
<221> NAME/KEY: misc_feature
<222> LOCATION: (15)..(15)
<223> OTHER INFORMATION: um
<220> FEATURE:
<221> NAME/KEY: misc_feature
<222> LOCATION: (18)..(18)
<223> OTHER INFORMATION: cm
<220> FEATURE:
<221> NAME/KEY: misc_feature
<222> LOCATION: (19)..(21)
<223> OTHER INFORMATION: phosphorothioate bond
<220> FEATURE:
<221> NAME/KEY: misc_feature
<222> LOCATION: (20)..(21)
<223> OTHER INFORMATION: um
<220> FEATURE:
<221> NAME/KEY: misc_feature
<222> LOCATION: (22)..(23)
<223> OTHER INFORMATION: 2'-o-methyladenosine

<400> SEQUENCE: 150
aucagcaaca cauauaccau uaa                                                 23

<210> SEQ ID NO 151
<211> LENGTH: 19
```

```
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (1)..(1)
<223> OTHER INFORMATION: um
<220> FEATURE:
<221> NAME/KEY: misc_feature
<222> LOCATION: (4)..(4)
<223> OTHER INFORMATION: um
<220> FEATURE:
<221> NAME/KEY: misc_feature
<222> LOCATION: (6)..(6)
<223> OTHER INFORMATION: um
<220> FEATURE:
<221> NAME/KEY: misc_feature
<222> LOCATION: (8)..(8)
<223> OTHER INFORMATION: um
<220> FEATURE:
<221> NAME/KEY: misc_feature
<222> LOCATION: (10)..(10)
<223> OTHER INFORMATION: um
<220> FEATURE:
<221> NAME/KEY: misc_feature
<222> LOCATION: (12)..(13)
<223> OTHER INFORMATION: um
<220> FEATURE:
<221> NAME/KEY: misc_feature
<222> LOCATION: (16)..(16)
<223> OTHER INFORMATION: um
<220> FEATURE:
<221> NAME/KEY: misc_feature
<222> LOCATION: (19)..(19)
<223> OTHER INFORMATION: um

<400> SEQUENCE: 151
ugguauaugu guugcugau                                              19

<210> SEQ ID NO 152
<211> LENGTH: 23
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (1)..(1)
<223> OTHER INFORMATION: 2'-o-methyladenosine
<220> FEATURE:
<221> NAME/KEY: misc_feature
<222> LOCATION: (3)..(3)
<223> OTHER INFORMATION: cm
<220> FEATURE:
<221> NAME/KEY: misc_feature
<222> LOCATION: (6)..(6)
<223> OTHER INFORMATION: cm
<220> FEATURE:
<221> NAME/KEY: misc_feature
<222> LOCATION: (9)..(9)
<223> OTHER INFORMATION: cm
<220> FEATURE:
<221> NAME/KEY: misc_feature
<222> LOCATION: (11)..(11)
<223> OTHER INFORMATION: cm
<220> FEATURE:
<221> NAME/KEY: misc_feature
<222> LOCATION: (13)..(13)
<223> OTHER INFORMATION: um
<220> FEATURE:
<221> NAME/KEY: misc_feature
<222> LOCATION: (15)..(15)
<223> OTHER INFORMATION: um
<220> FEATURE:
<221> NAME/KEY: misc_feature
<222> LOCATION: (18)..(18)
```

```
<223> OTHER INFORMATION: cm
<220> FEATURE:
<221> NAME/KEY: misc_feature
<222> LOCATION: (20)..(23)
<223> OTHER INFORMATION: um

<400> SEQUENCE: 152
aucagcaaca cauauaccau uuu                                              23

<210> SEQ ID NO 153
<211> LENGTH: 19
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (1)..(1)
<223> OTHER INFORMATION: um
<220> FEATURE:
<221> NAME/KEY: misc_feature
<222> LOCATION: (1)..(2)
<223> OTHER INFORMATION: phosphorothioate bond
<220> FEATURE:
<221> NAME/KEY: misc_feature
<222> LOCATION: (4)..(4)
<223> OTHER INFORMATION: um
<220> FEATURE:
<221> NAME/KEY: misc_feature
<222> LOCATION: (6)..(6)
<223> OTHER INFORMATION: um
<220> FEATURE:
<221> NAME/KEY: misc_feature
<222> LOCATION: (8)..(8)
<223> OTHER INFORMATION: um
<220> FEATURE:
<221> NAME/KEY: misc_feature
<222> LOCATION: (10)..(10)
<223> OTHER INFORMATION: um
<220> FEATURE:
<221> NAME/KEY: misc_feature
<222> LOCATION: (12)..(13)
<223> OTHER INFORMATION: um
<220> FEATURE:
<221> NAME/KEY: misc_feature
<222> LOCATION: (16)..(16)
<223> OTHER INFORMATION: um
<220> FEATURE:
<221> NAME/KEY: misc_feature
<222> LOCATION: (19)..(19)
<223> OTHER INFORMATION: um

<400> SEQUENCE: 153
ugguauaugu guugcugau                                                   19

<210> SEQ ID NO 154
<211> LENGTH: 23
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (3)..(3)
<223> OTHER INFORMATION: cm
<220> FEATURE:
<221> NAME/KEY: misc_feature
<222> LOCATION: (6)..(6)
<223> OTHER INFORMATION: cm
<220> FEATURE:
<221> NAME/KEY: misc_feature
<222> LOCATION: (9)..(9)
<223> OTHER INFORMATION: cm
<220> FEATURE:
<221> NAME/KEY: misc_feature
```

```
<222> LOCATION: (11)..(11)
<223> OTHER INFORMATION: cm
<220> FEATURE:
<221> NAME/KEY: misc_feature
<222> LOCATION: (13)..(13)
<223> OTHER INFORMATION: um
<220> FEATURE:
<221> NAME/KEY: misc_feature
<222> LOCATION: (15)..(15)
<223> OTHER INFORMATION: um
<220> FEATURE:
<221> NAME/KEY: misc_feature
<222> LOCATION: (18)..(18)
<223> OTHER INFORMATION: cm
<220> FEATURE:
<221> NAME/KEY: misc_feature
<222> LOCATION: (19)..(21)
<223> OTHER INFORMATION: phosphorothioate bond
<220> FEATURE:
<221> NAME/KEY: misc_feature
<222> LOCATION: (20)..(21)
<223> OTHER INFORMATION: um
<220> FEATURE:
<221> NAME/KEY: misc_feature
<222> LOCATION: (22)..(23)
<223> OTHER INFORMATION: 2'-o-methyladenosine

<400> SEQUENCE: 154
aucagcaaca cauauaccau uaa                                        23

<210> SEQ ID NO 155
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (2)..(2)
<223> OTHER INFORMATION: um
<220> FEATURE:
<221> NAME/KEY: misc_feature
<222> LOCATION: (5)..(5)
<223> OTHER INFORMATION: cm
<220> FEATURE:
<221> NAME/KEY: misc_feature
<222> LOCATION: (6)..(6)
<223> OTHER INFORMATION: um
<220> FEATURE:
<221> NAME/KEY: misc_feature
<222> LOCATION: (7)..(7)
<223> OTHER INFORMATION: cm
<220> FEATURE:
<221> NAME/KEY: misc_feature
<222> LOCATION: (9)..(9)
<223> OTHER INFORMATION: cm
<220> FEATURE:
<221> NAME/KEY: misc_feature
<222> LOCATION: (10)..(10)
<223> OTHER INFORMATION: um
<220> FEATURE:
<221> NAME/KEY: misc_feature
<222> LOCATION: (12)..(12)
<223> OTHER INFORMATION: um
<220> FEATURE:
<221> NAME/KEY: misc_feature
<222> LOCATION: (15)..(16)
<223> OTHER INFORMATION: um
<220> FEATURE:
<221> NAME/KEY: misc_feature
<222> LOCATION: (18)..(18)
<223> OTHER INFORMATION: cm
<220> FEATURE:
<221> NAME/KEY: misc_feature
<222> LOCATION: (19)..(19)
<223> OTHER INFORMATION: um
<220> FEATURE:
```

```
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 155
auaacucacu auaauuacun n                                              21

<210> SEQ ID NO 156
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (3)..(3)
<223> OTHER INFORMATION: um
<220> FEATURE:
<221> NAME/KEY: misc_feature
<222> LOCATION: (7)..(7)
<223> OTHER INFORMATION: um
<220> FEATURE:
<221> NAME/KEY: misc_feature
<222> LOCATION: (9)..(9)
<223> OTHER INFORMATION: um
<220> FEATURE:
<221> NAME/KEY: misc_feature
<222> LOCATION: (17)..(17)
<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 156
aguaauuaua gugaguuaun n                                              21

<210> SEQ ID NO 157
<211> LENGTH: 19
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (2)..(2)
<223> OTHER INFORMATION: um
<220> FEATURE:
<221> NAME/KEY: misc_feature
<222> LOCATION: (5)..(5)
<223> OTHER INFORMATION: cm
<220> FEATURE:
<221> NAME/KEY: misc_feature
<222> LOCATION: (6)..(6)
<223> OTHER INFORMATION: um
<220> FEATURE:
<221> NAME/KEY: misc_feature
<222> LOCATION: (7)..(7)
<223> OTHER INFORMATION: cm
<220> FEATURE:
<221> NAME/KEY: misc_feature
<222> LOCATION: (9)..(9)
<223> OTHER INFORMATION: cm
<220> FEATURE:
<221> NAME/KEY: misc_feature
<222> LOCATION: (10)..(10)
<223> OTHER INFORMATION: um
```

```
<220> FEATURE:
<221> NAME/KEY: misc_feature
<222> LOCATION: (12)..(12)
<223> OTHER INFORMATION: um
<220> FEATURE:
<221> NAME/KEY: misc_feature
<222> LOCATION: (15)..(16)
<223> OTHER INFORMATION: um
<220> FEATURE:
<221> NAME/KEY: misc_feature
<222> LOCATION: (18)..(18)
<223> OTHER INFORMATION: cm
<220> FEATURE:
<221> NAME/KEY: misc_feature
<222> LOCATION: (19)..(19)
<223> OTHER INFORMATION: um

<400> SEQUENCE: 157
auaacucacu auaauuacu                                                  19

<210> SEQ ID NO 158
<211> LENGTH: 19
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (3)..(3)
<223> OTHER INFORMATION: um
<220> FEATURE:
<221> NAME/KEY: misc_feature
<222> LOCATION: (7)..(7)
<223> OTHER INFORMATION: um
<220> FEATURE:
<221> NAME/KEY: misc_feature
<222> LOCATION: (9)..(9)
<223> OTHER INFORMATION: um
<220> FEATURE:
<221> NAME/KEY: misc_feature
<222> LOCATION: (17)..(17)
<223> OTHER INFORMATION: um

<400> SEQUENCE: 158
aguaauuaua gugaguuau                                                  19

<210> SEQ ID NO 159
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (1)..(1)
<223> OTHER INFORMATION: um
<220> FEATURE:
<221> NAME/KEY: misc_feature
<222> LOCATION: (4)..(4)
<223> OTHER INFORMATION: um
<220> FEATURE:
<221> NAME/KEY: misc_feature
<222> LOCATION: (6)..(6)
<223> OTHER INFORMATION: um
<220> FEATURE:
<221> NAME/KEY: misc_feature
<222> LOCATION: (8)..(8)
<223> OTHER INFORMATION: um
<220> FEATURE:
<221> NAME/KEY: misc_feature
<222> LOCATION: (10)..(10)
<223> OTHER INFORMATION: um
<220> FEATURE:
<221> NAME/KEY: misc_feature
<222> LOCATION: (12)..(13)
```

```
<223> OTHER INFORMATION: um
<220> FEATURE:
<221> NAME/KEY: misc_feature
<222> LOCATION: (15)..(15)
<223> OTHER INFORMATION: cm
<220> FEATURE:
<221> NAME/KEY: misc_feature
<222> LOCATION: (16)..(16)
<223> OTHER INFORMATION: um
<220> FEATURE:
<221> NAME/KEY: misc_feature
<222> LOCATION: (19)..(21)
<223> OTHER INFORMATION: um

<400> SEQUENCE: 159
ugguauaugu guugcugauu u                                              21

<210> SEQ ID NO 160
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (3)..(3)
<223> OTHER INFORMATION: cm
<220> FEATURE:
<221> NAME/KEY: misc_feature
<222> LOCATION: (6)..(6)
<223> OTHER INFORMATION: cm
<220> FEATURE:
<221> NAME/KEY: misc_feature
<222> LOCATION: (9)..(9)
<223> OTHER INFORMATION: cm
<220> FEATURE:
<221> NAME/KEY: misc_feature
<222> LOCATION: (11)..(11)
<223> OTHER INFORMATION: cm
<220> FEATURE:
<221> NAME/KEY: misc_feature
<222> LOCATION: (13)..(13)
<223> OTHER INFORMATION: um
<220> FEATURE:
<221> NAME/KEY: misc_feature
<222> LOCATION: (15)..(15)
<223> OTHER INFORMATION: um
<220> FEATURE:
<221> NAME/KEY: misc_feature
<222> LOCATION: (18)..(18)
<223> OTHER INFORMATION: cm
<220> FEATURE:
<221> NAME/KEY: misc_feature
<222> LOCATION: (20)..(21)
<223> OTHER INFORMATION: um

<400> SEQUENCE: 160
aucagcaaca cauauaccau u                                              21

<210> SEQ ID NO 161
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (4)..(4)
<223> OTHER INFORMATION: cm
<220> FEATURE:
<221> NAME/KEY: misc_feature
<222> LOCATION: (10)..(10)
<223> OTHER INFORMATION: um
<220> FEATURE:
<221> NAME/KEY: misc_feature
```

```
<222> LOCATION: (12)..(13)
<223> OTHER INFORMATION: um
<220> FEATURE:
<221> NAME/KEY: misc_feature
<222> LOCATION: (14)..(14)
<223> OTHER INFORMATION: cm
<220> FEATURE:
<221> NAME/KEY: misc_feature
<222> LOCATION: (20)..(21)
<223> OTHER INFORMATION: um

<400> SEQUENCE: 161
aggcaaaggu guucaaagau u                                              21

<210> SEQ ID NO 162
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (9)..(9)
<223> OTHER INFORMATION: cm
<220> FEATURE:
<221> NAME/KEY: misc_feature
<222> LOCATION: (20)..(21)
<223> OTHER INFORMATION: um

<400> SEQUENCE: 162
ucuuugaaca ccuuugccuu u                                              21

<210> SEQ ID NO 163
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (9)..(9)
<223> OTHER INFORMATION: cm
<220> FEATURE:
<221> NAME/KEY: misc_feature
<222> LOCATION: (10)..(10)
<223> OTHER INFORMATION: um
<220> FEATURE:
<221> NAME/KEY: misc_feature
<222> LOCATION: (12)..(14)
<223> OTHER INFORMATION: um
<220> FEATURE:
<221> NAME/KEY: misc_feature
<222> LOCATION: (16)..(16)
<223> OTHER INFORMATION: cm
<220> FEATURE:
<221> NAME/KEY: misc_feature
<222> LOCATION: (19)..(19)
<223> OTHER INFORMATION: cm
<220> FEATURE:
<221> NAME/KEY: misc_feature
<222> LOCATION: (20)..(21)
<223> OTHER INFORMATION: um

<400> SEQUENCE: 163
gaaaggaacu guuuacaacu u                                              21

<210> SEQ ID NO 164
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
```

```
<221> NAME/KEY: misc_feature
<222> LOCATION: (5)..(5)
<223> OTHER INFORMATION: um
<220> FEATURE:
<221> NAME/KEY: misc_feature
<222> LOCATION: (9)..(9)
<223> OTHER INFORMATION: cm
<220> FEATURE:
<221> NAME/KEY: misc_feature
<222> LOCATION: (20)..(21)
<223> OTHER INFORMATION: um

<400> SEQUENCE: 164
guuguaaaca guuccuuucu u                                              21

<210> SEQ ID NO 165
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (2)..(2)
<223> OTHER INFORMATION: cm
<220> FEATURE:
<221> NAME/KEY: misc_feature
<222> LOCATION: (3)..(3)
<223> OTHER INFORMATION: um
<220> FEATURE:
<221> NAME/KEY: misc_feature
<222> LOCATION: (6)..(6)
<223> OTHER INFORMATION: um
<220> FEATURE:
<221> NAME/KEY: misc_feature
<222> LOCATION: (8)..(8)
<223> OTHER INFORMATION: um
<220> FEATURE:
<221> NAME/KEY: misc_feature
<222> LOCATION: (10)..(10)
<223> OTHER INFORMATION: um
<220> FEATURE:
<221> NAME/KEY: misc_feature
<222> LOCATION: (12)..(12)
<223> OTHER INFORMATION: um
<220> FEATURE:
<221> NAME/KEY: misc_feature
<222> LOCATION: (14)..(15)
<223> OTHER INFORMATION: um
<220> FEATURE:
<221> NAME/KEY: misc_feature
<222> LOCATION: (17)..(17)
<223> OTHER INFORMATION: cm
<220> FEATURE:
<221> NAME/KEY: misc_feature
<222> LOCATION: (18)..(18)
<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 165
acugguauau guguugcugn n                                              21

<210> SEQ ID NO 166
<211> LENGTH: 21
<212> TYPE: RNA
<213> ORGANISM: Artificial Sequence
<220> FEATURE:
<223> OTHER INFORMATION: synthesized siRNA antisense sequence
```

```
<220> FEATURE:
<221> NAME/KEY: misc_feature
<222> LOCATION: (1)..(1)
<223> OTHER INFORMATION: cm
<220> FEATURE:
<221> NAME/KEY: misc_feature
<222> LOCATION: (4)..(4)
<223> OTHER INFORMATION: cm
<220> FEATURE:
<221> NAME/KEY: misc_feature
<222> LOCATION: (7)..(7)
<223> OTHER INFORMATION: cm
<220> FEATURE:
<221> NAME/KEY: misc_feature
<222> LOCATION: (9)..(9)
<223> OTHER INFORMATION: cm
<220> FEATURE:
<221> NAME/KEY: misc_feature
<222> LOCATION: (11)..(11)
<223> OTHER INFORMATION: um
<220> FEATURE:
<221> NAME/KEY: misc_feature
<222> LOCATION: (13)..(13)
<223> OTHER INFORMATION: um
<220> FEATURE:
<221> NAME/KEY: misc_feature
<222> LOCATION: (16)..(16)
<223> OTHER INFORMATION: cm
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 166
cagcaacaca uauaccagun n                                                    21

<210> SEQ ID NO 167
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (1)..(1)
<223> OTHER INFORMATION: cm
<220> FEATURE:
<221> NAME/KEY: misc_feature
<222> LOCATION: (2)..(2)
<223> OTHER INFORMATION: um
<220> FEATURE:
<221> NAME/KEY: misc_feature
<222> LOCATION: (5)..(5)
<223> OTHER INFORMATION: um
<220> FEATURE:
<221> NAME/KEY: misc_feature
<222> LOCATION: (7)..(7)
<223> OTHER INFORMATION: um
<220> FEATURE:
<221> NAME/KEY: misc_feature
<222> LOCATION: (9)..(9)
<223> OTHER INFORMATION: um
<220> FEATURE:
<221> NAME/KEY: misc_feature
<222> LOCATION: (11)..(11)
<223> OTHER INFORMATION: um
<220> FEATURE:
<221> NAME/KEY: misc_feature
<222> LOCATION: (13)..(14)
<223> OTHER INFORMATION: um
<220> FEATURE:
<221> NAME/KEY: misc_feature
<222> LOCATION: (16)..(16)
```

```
<223> OTHER INFORMATION: cm
<220> FEATURE:
<221> NAME/KEY: misc_feature
<222> LOCATION: (17)..(17)
<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 167
cugguauaug uguugcugan n                                        21

<210> SEQ ID NO 168
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (2)..(2)
<223> OTHER INFORMATION: cm
<220> FEATURE:
<221> NAME/KEY: misc_feature
<222> LOCATION: (5)..(5)
<223> OTHER INFORMATION: cm
<220> FEATURE:
<221> NAME/KEY: misc_feature
<222> LOCATION: (8)..(8)
<223> OTHER INFORMATION: cm
<220> FEATURE:
<221> NAME/KEY: misc_feature
<222> LOCATION: (10)..(10)
<223> OTHER INFORMATION: cm
<220> FEATURE:
<221> NAME/KEY: misc_feature
<222> LOCATION: (12)..(12)
<223> OTHER INFORMATION: um
<220> FEATURE:
<221> NAME/KEY: misc_feature
<222> LOCATION: (14)..(14)
<223> OTHER INFORMATION: um
<220> FEATURE:
<221> NAME/KEY: misc_feature
<222> LOCATION: (17)..(17)
<223> OTHER INFORMATION: cm
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 168
ucagcaacac auauaccagn n                                        21

<210> SEQ ID NO 169
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (3)..(3)
<223> OTHER INFORMATION: um
<220> FEATURE:
<221> NAME/KEY: misc_feature
```

```
<222> LOCATION: (5)..(5)
<223> OTHER INFORMATION: um
<220> FEATURE:
<221> NAME/KEY: misc_feature
<222> LOCATION: (7)..(7)
<223> OTHER INFORMATION: um
<220> FEATURE:
<221> NAME/KEY: misc_feature
<222> LOCATION: (9)..(9)
<223> OTHER INFORMATION: um
<220> FEATURE:
<221> NAME/KEY: misc_feature
<222> LOCATION: (11)..(12)
<223> OTHER INFORMATION: um
<220> FEATURE:
<221> NAME/KEY: misc_feature
<222> LOCATION: (14)..(14)
<223> OTHER INFORMATION: cm
<220> FEATURE:
<221> NAME/KEY: misc_feature
<222> LOCATION: (15)..(15)
<223> OTHER INFORMATION: um
<220> FEATURE:
<221> NAME/KEY: misc_feature
<222> LOCATION: (18)..(18)
<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 169
gguauaugug uugcugauan n                                              21

<210> SEQ ID NO 170
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (1)..(1)
<223> OTHER INFORMATION: um
<220> FEATURE:
<221> NAME/KEY: misc_feature
<222> LOCATION: (4)..(4)
<223> OTHER INFORMATION: cm
<220> FEATURE:
<221> NAME/KEY: misc_feature
<222> LOCATION: (7)..(7)
<223> OTHER INFORMATION: cm
<220> FEATURE:
<221> NAME/KEY: misc_feature
<222> LOCATION: (10)..(10)
<223> OTHER INFORMATION: cm
<220> FEATURE:
<221> NAME/KEY: misc_feature
<222> LOCATION: (12)..(12)
<223> OTHER INFORMATION: cm
<220> FEATURE:
<221> NAME/KEY: misc_feature
<222> LOCATION: (14)..(14)
<223> OTHER INFORMATION: um
<220> FEATURE:
<221> NAME/KEY: misc_feature
<222> LOCATION: (16)..(16)
<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
```

```
<221> NAME/KEY: misc_feature
<222> LOCATION: (20)..(21)
<223> OTHER INFORMATION: phosphorothioate bond

<400> SEQUENCE: 170
uaucagcaac acauauaccn n                                              21

<210> SEQ ID NO 171
<211> LENGTH: 21
<212> TYPE: RNA
<213> ORGANISM: Artificial Sequence
<220> FEATURE:
<223> OTHER INFORMATION: synthesized siRNA sense sequence
<220> FEATURE:
<221> NAME/KEY: misc_feature
<222> LOCATION: (2)..(2)
<223> OTHER INFORMATION: um
<220> FEATURE:
<221> NAME/KEY: misc_feature
<222> LOCATION: (4)..(4)
<223> OTHER INFORMATION: um
<220> FEATURE:
<221> NAME/KEY: misc_feature
<222> LOCATION: (6)..(6)
<223> OTHER INFORMATION: um
<220> FEATURE:
<221> NAME/KEY: misc_feature
<222> LOCATION: (8)..(8)
<223> OTHER INFORMATION: um
<220> FEATURE:
<221> NAME/KEY: misc_feature
<222> LOCATION: (10)..(11)
<223> OTHER INFORMATION: um
<220> FEATURE:
<221> NAME/KEY: misc_feature
<222> LOCATION: (13)..(13)
<223> OTHER INFORMATION: cm
<220> FEATURE:
<221> NAME/KEY: misc_feature
<222> LOCATION: (14)..(14)
<223> OTHER INFORMATION: um
<220> FEATURE:
<221> NAME/KEY: misc_feature
<222> LOCATION: (17)..(17)
<223> OTHER INFORMATION: um
<220> FEATURE:
<221> NAME/KEY: misc_feature
<222> LOCATION: (19)..(19)
<223> OTHER INFORMATION: cm
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 171
guauaugugu ugcugauacn n                                              21

<210> SEQ ID NO 172
<211> LENGTH: 21
<212> TYPE: RNA
<213> ORGANISM: Artificial Sequence
<220> FEATURE:
<223> OTHER INFORMATION: synthesized siRNA antisense sequence
<220> FEATURE:
<221> NAME/KEY: misc_feature
<222> LOCATION: (2)..(2)
<223> OTHER INFORMATION: um
<220> FEATURE:
<221> NAME/KEY: misc_feature
<222> LOCATION: (5)..(5)
<223> OTHER INFORMATION: cm
```

```
<220> FEATURE:
<221> NAME/KEY: misc_feature
<222> LOCATION: (8)..(8)
<223> OTHER INFORMATION: cm
<220> FEATURE:
<221> NAME/KEY: misc_feature
<222> LOCATION: (11)..(11)
<223> OTHER INFORMATION: cm
<220> FEATURE:
<221> NAME/KEY: misc_feature
<222> LOCATION: (13)..(13)
<223> OTHER INFORMATION: cm
<220> FEATURE:
<221> NAME/KEY: misc_feature
<222> LOCATION: (15)..(15)
<223> OTHER INFORMATION: um
<220> FEATURE:
<221> NAME/KEY: misc_feature
<222> LOCATION: (17)..(17)
<223> OTHER INFORMATION: um
<220> FEATURE:
<221> NAME/KEY: misc_feature
<222> LOCATION: (20)..(21)
<223> OTHER INFORMATION: n=deoxythymidine
<220> FEATURE:
<221> NAME/KEY: misc_feature
<222> LOCATION: (20)..(21)
<223> OTHER INFORMATION: phosphorothioate bond

<400> SEQUENCE: 172
guaucagcaa cacauauacn n                                               21
```

PHARMACEUTICAL COMPOSITION CONTAINING DOUBLE-STRANDED RIBONUCLEIC ACID INHIBITING EXPRESSION OF COMPLEMENT C5

CROSS-REFERENCE TO RELATED APPLICATIONS

This application is a National Stage application under 35 U.S.C. § 371 of International Application No. PCT/JP2020/048441, having an International Filing Date of Dec. 24, 2020, which claims priority to Japanese Application Serial No. 2019-236918, filed on Dec. 26, 2019. The disclosures of the above-referenced prior applications are considered part of the disclosure of this application, and are incorporated in their entirety into this application.

TECHNICAL FIELD

The present invention relates to a pharmaceutical composition comprising a double-stranded ribonucleic acid (dsRNA) capable of suppressing expression of complement C5. More specifically, the present invention relates to a pharmaceutical composition comprising a lipid complex comprising a double-stranded ribonucleic acid capable of suppressing expression of complement C5, a method for producing the pharmaceutical composition, and a method for stabilizing the pharmaceutical composition.

BACKGROUND ART

A protein group called complement includes proteins indicated as C1 to C9, and these proteins are successively activated through three different pathways (classical pathway, lectin pathway, alternative pathway) to elicit immune response. The fifth complement component, C5, is cleaved to C5a and C5b by C5 convertase. C5a is called anaphylatoxin, and induces inflammatory response for various cells via C5aR (CD88) and C5L2 (GPR77). C5b sequentially reacts with C6 to C9 to be converted into a membrane attack complex (MAC) as a final product, which causes bacteriolysis to pathogens or cell lysis. The complement system may elicit strong cytotoxicity to host cells if the complement system fails to be suitably controlled or is excessively activated.

From previous studies, the complement C5 is known to be associated with various diseases including paroxysmal nocturnal hemoglobinuria (PNH), atypical hemolytic uremic syndrome (aHUS), myasthenia gravis (MG), neuromyelitis optica (NMO), antibody-mediated rejection in kidney transplantation, Guillain-Barre syndrome, antineutrophil cytoplasmic antibody-associated vasculitis (ANCA-associated vasculitis), amyotrophic lateral sclerosis (ALS), Parkinson's disease (PD), autoimmune encephalitis, IgG4-related diseases, asthma, antiphospholipid antibody syndrome, ischemia-reperfusion injury, typical hemolytic uremic syndrome (tHUS), multifocal motor neuropathy (MMN), multiple sclerosis (MS), thrombotic thrombocytopenic purpura (TTP), spontaneous abortion, habitual abortion, traumatic brain injury, cold agglutinin disease, dermatomyositis, hemolytic uremic syndrome associated with Shigatoxin-producing *Escherichia coli* (*E. coli*), graft dysfunction, myocardial infarction, sepsis, atherosclerosis, septic shock, spinal cord injury, psoriasis, autoimmune hemolytic anemia (AIHA), antiphospholipid syndrome (APS), myocarditis, immune complex vasculitis, Takayasu's disease, and Kawasaki's disease (arteritis). Thus, inhibition or suppression of expression of complement C5 is expected to lead to successful treatment of these diseases. In particular, inhibition of complement C5 is suggested to be effective for treating or preventing paroxysmal nocturnal hemoglobinuria (Non Patent Literature 1), atypical hemolytic uremic syndrome (Non Patent Literature 2), myasthenia gravis (Non Patent Literature 3), neuromyelitis optica (Non Patent Literature 4), and antibody-mediated kidney transplant rejections (Non Patent Literature 5).

The anti-C5 monoclonal antibody eculizumab (Soliris (registered trademark)) exhibits high affinity for complement C5, and suppresses excessive activation of the complement through inhibition of cleavage of C5 into C5a/C5b and accompanying formation of a membrane attack complex. Thereby, eculizumab exhibits inhibitory effect on hemolysis, and thus is known as a therapeutic agent for paroxysmal nocturnal hemoglobinuria and atypical hemolytic uremic syndrome. In addition, eculizumab is known as a therapeutic agent for generalized myasthenia gravis (gMG). However, eculizumab is very expensive, and hence development of alternative means applicable to treatment and prevention of complement C5-mediated diseases is desired.

Examples of methods for suppressing expression of complement C5 include methods utilizing RNA interference (hereinafter, also referred to as "RNAi"). For example, a double-stranded ribonucleic acid (dsRNA) agent is known, which induces cleavage of an RNA transcript of the C5 gene via an RNA-induced silencing complex (RISC) (Patent Literature 1).

CITATION LIST

Patent Literature

[Patent Literature 1] WO 2014/160129

Non-Patent Literature

[Non-Patent Literature 1] Non Patent Literature 1: Peter Hillmen et al., The New England Journal of Medicine 2004 Feb. 5; 350(6): 552-559.

[Non-Patent Literature 2] Legendre C M et al., The New England Journal of Medicine 2013 Jun. 6; 368(23): 2169-2181.

[Non-Patent Literature 3] Howard J F Jr et al., Muscle Nerve 2013 July; 48(1): 76-84.

[Non-Patent Literature 4] Pittock S J et al., The Lancet Neurology 2013 June; 12(6): 554-562.

[Non-Patent Literature 5] Stegall M D et al., American Journal of Transplantation 2011 November; 11(11): 2405-2413.

SUMMARY OF INVENTION

Technical Problem

An object of the present invention is to provide a novel pharmaceutical composition comprising a lipid complex comprising a double-stranded ribonucleic acid for suppressing expression of complement C5, a method for producing the pharmaceutical composition, and a method for stabilizing the pharmaceutical composition.

Solution to Problem

The present invention provides, for example, the following <1> to <81>.

<1> A pharmaceutical composition comprising:
a lipid complex,
wherein the lipid complex comprises a double-stranded ribonucleic acid comprising a combination of a sense strand and an antisense strand,
the combination of the sense strand and the antisense strand is selected from the group consisting of a sense strand consisting of a nucleotide sequence set forth in SEQ ID NO: 159 and an antisense strand consisting of a nucleotide sequence set forth in SEQ ID NO: 160, a sense strand consisting of a nucleotide sequence set forth in SEQ ID NO: 141 and an antisense strand consisting of a nucleotide sequence set forth in SEQ ID NO: 142, a sense strand consisting of a nucleotide sequence set forth in SEQ ID NO: 143 and an antisense strand consisting of a nucleotide sequence set forth in SEQ ID NO: 144, a sense strand consisting of a nucleotide sequence set forth in SEQ ID NO: 145 and an antisense strand consisting of a nucleotide sequence set forth in SEQ ID NO: 146, a sense strand consisting of a nucleotide sequence set forth in SEQ ID NO: 147 and an antisense strand consisting of a nucleotide sequence set forth in SEQ ID NO: 148, and a sense strand consisting of a nucleotide sequence set forth in SEQ ID NO: 153 and an antisense strand consisting of a nucleotide sequence set forth in SEQ ID NO: 154, and
a pH of a solution of the lipid complex is 5.0 or less or 7.5 or more.

<2> A pharmaceutical composition comprising:
a lipid complex,
wherein the lipid complex comprises a double-stranded ribonucleic acid comprising a sense strand consisting of a nucleotide sequence set forth in SEQ ID NO: 145 and an antisense strand consisting of a nucleotide sequence set forth in SEQ ID NO: 146, and
a pH of a solution of the lipid complex is 5.0 or less or 7.5 or more.

<3> The pharmaceutical composition according to <1> or <2>, wherein the pH of the solution of the lipid complex is 2.0 or more and 5.0 or less, or 7.5 or more and 11.0 or less.

<4> The pharmaceutical composition according to <1> or <2>, wherein the pH of the solution of the lipid complex is 5.0 or less.

<5> The pharmaceutical composition according to <1> or <2>, wherein the pH of the solution of the lipid complex is 2.0 or more and 5.0 or less.

<6> The pharmaceutical composition according to <1> or <2>, wherein the pH of the solution of the lipid complex is 7.5 or more.

<7> The pharmaceutical composition according to <1> or <2>, wherein the pH of the solution of the lipid complex is 7.5 or more and 11.0 or less.

<8> The pharmaceutical composition according to <1> or <2>, wherein the pH of the solution of the lipid complex is 7.5 or more and 10.0 or less.

<9> The pharmaceutical composition according to <1> or <2>, wherein the pH of the solution of the lipid complex is 7.5 or more and 9.5 or less.

<10> The pharmaceutical composition according to <1> or <2>, wherein the pH of the solution of the lipid complex is 7.5 or more and 9.0 or less.

<11> The pharmaceutical composition according to <1> or <2>, wherein the pH of the solution of the lipid complex is 7.5 or more and 8.5 or less.

<12> The pharmaceutical composition according to any one of <1> to <11>, wherein the average particle size of the lipid complex is 100 nm or less.

<13> The pharmaceutical composition according to any one of <1> to <12>, wherein the average particle size of the lipid complex is 65 nm or more and 100 nm or less.

<14> The pharmaceutical composition according to any one of <1> to <12>, wherein the average particle size of the lipid complex is 80 nm or more and 100 nm or less.

<15> The pharmaceutical composition according to any one of <1> to <12>, wherein the average particle size of the lipid complex is 85 nm or more and 100 nm or less.

<16> The pharmaceutical composition according to any one of <1> to <15>, wherein the change in the average particle size of the lipid complex after storage for 2 weeks is 10% or less from the average particle size of the lipid complex before the storage.

<17> The pharmaceutical composition according to any one of <1> to <15>, wherein the change in the average particle size of the lipid complex after storage for 2 weeks is 8% or less from the average particle size of the lipid complex before the storage.

<18> The pharmaceutical composition according to any one of <1> to <15>, wherein the change in the average particle size of the lipid complex after storage for 2 weeks is 5% or less from the average particle size of the lipid complex before the storage.

<19> The pharmaceutical composition according to any one of <1> to <15>, wherein the change in the average particle size of the lipid complex after storage for 1 month is 10% or less from the average particle size of the lipid complex before the storage.

<20> The pharmaceutical composition according to any one of <1> to <15>, wherein the change in the average particle size of the lipid complex after storage for 1 month is 8% or less from the average particle size of the lipid complex before the storage.

<21> The pharmaceutical composition according to any one of <1> to <15>, wherein the change in the average particle size of the lipid complex after storage for 1 month is 5% or less from the average particle size of the lipid complex before the storage.

<22> The pharmaceutical composition according to any one of <1> to <15>, wherein the change in the average particle size of the lipid complex after storage for 3 months is 10% or less from the average particle size of the lipid complex before the storage.

<23> The pharmaceutical composition according to any one of <1> to <15>, wherein the change in the average particle size of the lipid complex after storage for 3 months is 8% or less from the average particle size of the lipid complex before the storage.

<24> The pharmaceutical composition according to any one of <1> to <15>, wherein the change in the average particle size of the lipid complex after storage for 3 months is 5% or less from the average particle size of the lipid complex before the storage.

<25> The pharmaceutical composition according to any one of <16> to <24>, wherein the change in the average particle size is increase in the average particle size.

<26> The pharmaceutical composition according to any one of <16> to <25>, wherein a condition for the storage of the pharmaceutical composition is 2 to 8° C.

<27> The pharmaceutical composition according to any one of <16> to <25>, wherein a condition for the storage of the pharmaceutical composition is 25° C.

<28> The pharmaceutical composition according to any one of <1> to <27>, wherein the lipid complex comprises:
a cationic lipid; and at least one lipid selected from the group consisting of neutral lipid, polyethylene glycol-modified lipid, and sterol.

<29> The pharmaceutical composition according to any one of <1> to <28>, wherein the lipid complex comprises a cationic lipid, neutral lipid, polyethylene glycol-modified lipid, and sterol.

<30> The pharmaceutical composition according to <28> or <29>, wherein the cationic lipid is selected from the group consisting of 1-oxo-1-(undecan-5-yloxy)nonadecan-10-yl-1-methylpiperidine-4-carboxylate, 1-((2-butyloctyl)oxy)-1-oxononadecan-10-yl-1-methylpiperidine-4-carboxylate, 1-oxo-1-(undecan-5-yloxy)heptadecan-8-yl-1-methylpiperidine 4-carboxylate, 21-oxo-21-(undecan-5-yloxy)henicosan-10-yl-1-methylpiperidine 4-carboxylate, 21-(octan-3-yl oxy)-21-oxohenicosan-10-yl-1-methylpiperidine-4-carboxylate, 1-((2-butyloctyl)oxy)-1-oxoicosan-10-yl-1-methylpiperidine-4-carboxylate, (Z)-1-((2-butylnon-3-en-1-yl)oxy)-1-oxoicosan-10-yl-1-methylpiperidine-4-carboxylate, 1-oxo-1-((3-pentyloctyl)oxy)icosan-10-yl-1-methylpiperidine-4-carboxylate, 1-((3,4-dipropylheptyl)oxy)-1-oxoicosan-10-yl-1-methylpiperidine-4-carboxylate, 1-((6-(butyldisulfanyl)-3-(3-(butyldisulfanyl)propyl)hexyl)oxy)-1-oxoicosan-10-yl-1-methylpiperidine-4-carboxylate, 2-butyloctyl-104(4-(dimethylamino)butanoyl)oxy)icosanoate, 2-{9-[(2-butyloctyl)oxy]-9-oxononyl}dodecyl1-methylpiperidine-4-carboxylate, 2-{9-oxo-9-[(3-pentyl octyl)oxy]nonyl}dodecyl 1-methylpiperidine-4-carboxylate, 2-nonyl-11-oxo-11-[(3-pentyloctyl)oxy]undecyl 1-methylpiperidine-4-carboxylate, bis(3-pentyloctyl) 9-{[(1-methylpiperidine-4-carbonyl)oxy]methyl}heptadecanedioate, di[(Z)-2-nonen-1-yl]9-{[(1-methylpiperidine-4-carbonyl)oxy]methyl}heptadecanedioate, 1-(2-octylcyclopropyl)heptadecan-8-yl-1-methylpiperidine-4-carboxylate, (3S)-2-{9-oxo-9-[(3-pentyloctypoxy]nonyl}dodecyl 1-methylpyrrolidine-3-carboxylate, and (3R)-2-{9-oxo-9-[(3-pentyloctypoxy]nonyl}dodecyl 1-methylpyrrolidine-3-carboxylate.

<31> The pharmaceutical composition according to any one of <28> to <30>, wherein the cationic lipid is selected from the group consisting of 1-((2-butyloctyl)oxy)-1-oxoicosan-10-yl-1-methylpiperdine-4-carboxylate, 1-((2-butyloctyl)oxy)-1-oxononadecan-10-yl-1-methylpiperidine-4-carboxylate, 2-{9-oxo-9-[(3-pentyloctyl)oxy]nonyl}dodecyl 1-methylpiperidine-4-carboxylate, 1-(2-octylcyclopropyl)heptadecan-8-yl-1-methylpiperidine-4-carboxylate, (3S)-2-{9-oxo-9-[(3-pentyloctypoxy]nonyl}dodecyl 1-methylpyrrolidine-3-carboxylate, and (3R)-2-{9-oxo-9-[(3-pentyloctypoxy]nonyl}dodecyl 1-methylpyrrolidine-3-carboxylate.

<32> The pharmaceutical composition according to any one of <28> to <31>, wherein the cationic lipid is 2-{9-oxo-9-[(3-pentyloctypoxy]nonyl}dodecyl 1-methylpiperidine-4-carboxylate.

<33> The pharmaceutical composition according to any one of <28> to <32>, wherein the neutral lipid is phospholipid or ceramide.

<34> The pharmaceutical composition according to <33>, wherein the phospholipid is selected from the group consisting of DOPE, POPE, HSPC, SOPC, POPC, EPC, DMPC, DPPC, DSPC, DAPC, DBPC, DLPC, DOPC, DOPQ DPP DSP DOPS, DOPE-MAL, and sphingomyelin.

<35> The pharmaceutical composition according to <33> or <34>, wherein the phospholipid is selected from the group consisting of DOPE, HSPC, DPPC, DSPC, and DAPC.

<36> The pharmaceutical composition according to any one of <33> to <35>, wherein the phospholipid is DSPC.

<37> The pharmaceutical composition according to any one of <28> to <36>, wherein the polyethylene glycol-modified lipid is selected from the group consisting of PEG2000-DMQ PEG2000-DPQ PEG2000-DSQ PEG5000-DMQ PEG5000-DPQ PEG5000-DSQ PEG-cDMA, PEG-C-DOMG, PEG-DADS PEG-DAA, PEG-phospholipid, PEG-cholesterol, and PEG-ceramide (Cer).

<38> The pharmaceutical composition according to any one of <28> to <37>, wherein the polyethylene glycol-modified lipid is selected from the group consisting of PEG2000-DMQ PEG2000-DPQ PEG2000-DSQ PEG-cDMA, and PEG-C-DOMG.

<39> The pharmaceutical composition according to any one of <28> to <38>, wherein the polyethylene glycol-modified lipid is PEG2000-DMG.

<40> The pharmaceutical composition according to any one of <28> to <39>, wherein the sterol is selected from the group consisting of cholesterol, dihydrocholesterol, lanosterol, β-sitosterol, campesterol, stigmasterol, brassicasterol, ergosterol, fucosterol, and 3β-[N—(N',N'-dimethyl amino ethyl) carbamoyl]cholesterol (DC-Chol).

<41> The pharmaceutical composition according to any one of <28> to <40>, wherein the sterol is selected from the group consisting of cholesterol, dihydrocholesterol, lanosterol, and β-sitosterol.

<42> The pharmaceutical composition according to any one of <28> to <41>, wherein the sterol is cholesterol.

<43> The pharmaceutical composition according to any one of <1> to <42>, wherein the lipid complex comprises 2-{9-oxo-9-[(3-pentyloctyl)oxy]nonyl}dodecyl 1-methylpiperidine-4-carboxylate, DSPC, PEG2000-DMQ and cholesterol.

<44> The pharmaceutical composition according to any one of <1> to <43>, wherein the mole ratio of cationic lipid/neutral lipid/polyethylene glycol-modified lipid/sterol in the lipid complex is 30 to 90/0.1 to 20/0.01 to 10/0.1 to 70.

<45> The pharmaceutical composition according to any one of <1> to <43>, wherein the mole ratio of cationic lipid/neutral lipid/polyethylene glycol-modified lipid/sterol in the lipid complex is 40 to 70/3 to 15/0.1 to 3/15 to 60.

<46> The pharmaceutical composition according to any one of <1> to <43>, wherein the mole ratio of cationic lipid/neutral lipid/polyethylene glycol-modified lipid/sterol in the lipid complex is 60/10.5/1.5/28.

<47> The pharmaceutical composition according to any one of <1> to <46>, wherein the lipid complex is a lipid nanoparticle (LNP).

<48> The pharmaceutical composition according to any one of <1> to <47>, wherein the lipid complex encapsulates a double-stranded ribonucleic acid comprising a combination of a sense strand and an antisense strand.

<49> The pharmaceutical composition according to any one of <1> to <48>, further comprising a pharmaceutically acceptable carrier.

<50> The pharmaceutical composition according to any one of <1> to <49>, for treating paroxysmal nocturnal hemoglobinuria.

<51> The pharmaceutical composition according to any one of <1> to <49>, for treating atypical hemolytic uremic syndrome.

<52> A method for treating paroxysmal nocturnal hemoglobinuria, comprising:
administering the pharmaceutical composition according to any one of <1> to <49> to a patient in need thereof.

<53> A method for treating atypical hemolytic uremic syndrome, comprising:
administering the pharmaceutical composition according to any one of <1> to <49> to a patient in need thereof.

<54> The pharmaceutical composition according to any one of <1> to <49>, for use in treating paroxysmal nocturnal hemoglobinuria.

<55> The pharmaceutical composition according to any one of <1> to <49>, for use in treating atypical hemolytic uremic syndrome.

<56> A method for producing the pharmaceutical composition according to any one of <1> to <55>, comprising:
adjusting the pH of the solution of the lipid complex to 5.0 or less or 7.5 or more.

<57> The method according to <56> for producing the pharmaceutical composition according to any one of <1> to <55>, comprising:
adjusting the pH of the solution of the lipid complex to 2.0 or more and 5.0 or less, or 7.5 or more and 11.0 or less.

<58> The method according to <56> for producing the pharmaceutical composition according to any one of <1> to <55>, comprising:
adjusting the pH of the solution of the lipid complex to 5.0 or less.

<59> The method according to <56> for producing the pharmaceutical composition according to any one of <1> to <55>, comprising:
adjusting the pH of the solution of the lipid complex to 2.0 or more and 5.0 or less.

<60> The method according to <56> for producing the pharmaceutical composition according to any one of <1> to <55>, comprising:
adjusting the pH of the solution of the lipid complex to 7.5 or more.

<61> The method according to <56> for producing the pharmaceutical composition according to any one of <1> to <55>, comprising:
adjusting the pH of the solution of the lipid complex to 7.5 or more and 11.0 or less.

<62> The method according to <56> for producing the pharmaceutical composition according to any one of <1> to <55>, comprising:
adjusting the pH of the solution of the lipid complex to 7.5 or more and 10.0 or less.

<63> The method according to <56> for producing the pharmaceutical composition according to any one of <1> to <55>, comprising:
adjusting the pH of the solution of the lipid complex to 7.5 or more and 9.5 or less.

<64> The method according to <56> for producing the pharmaceutical composition according to any one of <1> to <55>, comprising:
adjusting the pH of the solution of the lipid complex to 7.5 or more and 9.0 or less.

<65> The method according to <56> for producing the pharmaceutical composition according to any one of <1> to <55>, comprising:
adjusting the pH of the solution of the lipid complex to 7.5 or more and 8.5 or less.

<66> The method according to any one of <56> to <65> for producing the pharmaceutical composition according to any one of <1> to <55>, comprising:
mixing an organic solvent comprising (I) a cationic lipid and (II) at least one lipid selected from the group consisting of neutral lipid, polyethylene glycol-modified lipid, and sterol, and an aqueous solution comprising a double-stranded ribonucleic acid comprising a combination of a sense strand and an antisense strand to obtain a mixed solution.

<67> The method according to <66> for producing the pharmaceutical composition according to any one of <1> to <55>, further comprising:
removing the organic solvent from the mixed solution.

<68> A method for stabilizing the pharmaceutical composition according to any one of <1> to <55>, comprising:
adjusting the pH of the solution of the lipid complex to 5.0 or less or 7.5 or more.

<69> The method according to <68> for stabilizing the pharmaceutical composition according to any one of <1> to <55>, comprising:
adjusting the pH of the solution of the lipid complex to 2.0 or more and 5.0 or less, or 7.5 or more and 11.0 or less.

<70> The method according to <68> for stabilizing the pharmaceutical composition according to any one of <1> to <55>, comprising:
adjusting the pH of the solution of the lipid complex to 5.0 or less.

<71> The method according to <68> for stabilizing the pharmaceutical composition according to any one of <1> to <55>, comprising:
adjusting the pH of the solution of the lipid complex to 2.0 or more and 5.0 or less.

<72> The method according to <68> for stabilizing the pharmaceutical composition according to any one of <1> to <55>, comprising:
adjusting the pH of the solution of the lipid complex to 7.5 or more.

<73> The method according to <68> for stabilizing the pharmaceutical composition according to any one of <1> to <55>, comprising:
adjusting the pH of the solution of the lipid complex to 7.5 or more and 11.0 or less.

<74> The method according to <68> for stabilizing the pharmaceutical composition according to any one of <1> to <55>, comprising:
adjusting the pH of the solution of the lipid complex to 7.5 or more and 10.0 or less.

<75> The method according to <68> for stabilizing the pharmaceutical composition according to any one of <1> to <55>, comprising:
adjusting the pH of the solution of the lipid complex to 7.5 or more and 9.5 or less.

<76> The method according to <68> for stabilizing the pharmaceutical composition according to any one of <1> to <55>, comprising:
adjusting the pH of the solution of the lipid complex to 7.5 or more and 9.0 or less.

<77> The method according to <68> for stabilizing the pharmaceutical composition according to any one of <1> to <55>, comprising:
adjusting the pH of the solution of the lipid complex to 7.5 or more and 8.5 or less.

<78> The method according to any one of <68> to <77> for stabilizing the pharmaceutical composition according to any one of <1> to <55>, comprising:
mixing an organic solvent comprising (I) a cationic lipid and (II) at least one lipid selected from the group consisting of neutral lipid, polyethylene glycol-modified lipid, and sterol, and an aqueous solution comprising a double-stranded ribonucleic acid comprising a combination of a sense strand and an antisense strand to obtain a mixed solution.

<79> The method according to <78> for stabilizing the pharmaceutical composition according to any one of <1> to <55>, further comprising:

removing the organic solvent from the mixed solution.

<80> The method according to any one of <68> to <79> for stabilizing the pharmaceutical composition according to any one of <1> to <55>, wherein the method for stabilizing the pharmaceutical composition is a method of suppressing the change in the average particle size of the lipid complex in the pharmaceutical composition.

<81> The method according to <80> for stabilizing the pharmaceutical composition according to any one of <1> to <55>, wherein the method of suppressing the change in the average particle size is a method of suppressing increase in the average particle size.

Advantageous Effects of Invention

In accordance with the present invention, a novel pharmaceutical composition comprising a double-stranded ribonucleic acid capable of suppressing expression of complement C5, a method for producing the pharmaceutical composition, and a method for stabilizing the pharmaceutical composition can be provided.

The pharmaceutical composition of the present invention can suppress expression of complement C5 to suppress hemolysis, and hence can be applicable as a therapeutic agent for paroxysmal nocturnal hemoglobinuria (PNH) and atypical hemolytic uremic syndrome (aHUS).

DESCRIPTION OF EMBODIMENTS

Figure 1:
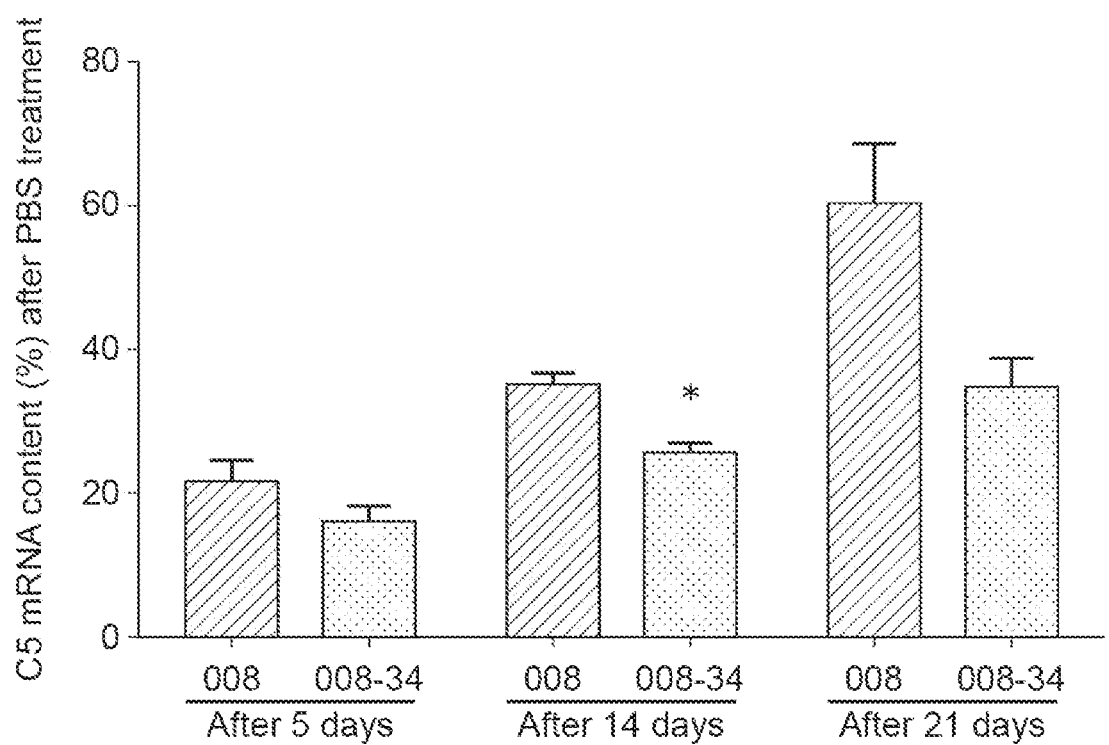
FIG. 1 shows graphs representing results of liver C5 mRNA residual rates after administration of siRNA-008 and liver C5 mRNA residual rates after administration of siRNA-008-34 in Example 5.

Examples of genes encoding complement C5 targeted by the double-stranded ribonucleic acid of an embodiment include, but are not limited to, C5 derived from humans, mice, and monkeys. Information on C5 gene sequences is available from public databases including registered sequence information such as GenBank provided by The National Center for Biotechnology Information (NCBI), or can be obtained by designing a primer based on information of a nucleotide sequence for C5 from a closely related animal species followed by cloning therewith from an RNA extracted from a desired animal species. Examples of the sequence of an mRNA transcript corresponding to the target gene human C5 include the sequence of a human C5 mRNA transcript registered as GenBank Accession No. NM_001735.2 (GI: 38016946). The term "C5 gene" herein is not limited to a gene having a particular sequence. For example, naturally-occurring C5 genes with single nucleotide polymorphism can be also included in the term.

In the double-stranded ribonucleic acid comprising a sense strand and an antisense strand in an embodiment, the combination of the sense strand and the antisense strand is selected from the group consisting of a sense strand consisting of a nucleotide sequence set forth in SEQ ID NO: 13 and an antisense strand consisting of a nucleotide sequence set forth in SEQ ID NO: 14, a sense strand consisting of a nucleotide sequence set forth in SEQ ID NO: 159 and an antisense strand consisting of a nucleotide sequence set forth in SEQ ID NO: 160, a sense strand consisting of a nucleotide sequence set forth in SEQ ID NO: 115 and an antisense strand consisting of a nucleotide sequence set forth in SEQ ID NO: 116, a sense strand consisting of a nucleotide sequence set forth in SEQ ID NO: 117 and an antisense strand consisting of a nucleotide sequence set forth in SEQ ID NO: 118, a sense strand consisting of a nucleotide sequence set forth in SEQ ID NO: 119 and an antisense strand consisting of a nucleotide sequence set forth in SEQ ID NO: 120, a sense strand consisting of a nucleotide sequence set forth in SEQ ID NO: 121 and an antisense strand consisting of a nucleotide sequence set forth in SEQ ID NO: 122, a sense strand consisting of a nucleotide sequence set forth in SEQ ID NO: 123 and an antisense strand consisting of a nucleotide sequence set forth in SEQ ID NO: 124, a sense strand consisting of a nucleotide sequence set forth in SEQ ID NO: 125 and an antisense strand consisting of a nucleotide sequence set forth in SEQ ID NO: 126, a sense strand consisting of a nucleotide sequence set forth in SEQ ID NO: 127 and an antisense strand consisting of a nucleotide sequence set forth in SEQ ID NO: 128, a sense strand consisting of a nucleotide sequence set forth in SEQ ID NO: 129 and an antisense strand consisting of a nucleotide sequence set forth in SEQ ID NO: 130, a sense strand consisting of a nucleotide sequence set forth in SEQ ID NO: 131 and an antisense strand consisting of a nucleotide sequence set forth in SEQ ID NO: 132, a sense strand consisting of a nucleotide sequence set forth in SEQ ID NO: 133 and an antisense strand consisting of a nucleotide sequence set forth in SEQ ID NO: 134, a sense strand consisting of a nucleotide sequence set forth in SEQ ID NO: 137 and an antisense strand consisting of a nucleotide sequence set forth in SEQ ID NO: 138, a sense strand consisting of a nucleotide sequence set forth in SEQ ID NO: 139 and an antisense strand consisting of a nucleotide sequence set forth in SEQ ID NO: 140, a sense strand consisting of a nucleotide sequence set forth in SEQ ID NO: 141 and an antisense strand consisting of a nucleotide sequence set forth in SEQ ID NO: 142, a sense strand consisting of a nucleotide sequence set forth in SEQ ID NO: 143 and an antisense strand consisting of a nucleotide sequence set forth in SEQ ID NO: 144, a sense strand consisting of a nucleotide sequence set forth in SEQ ID NO: 145 and an antisense strand consisting of a nucleotide sequence set forth in SEQ ID NO: 146, a sense strand consisting of a nucleotide sequence set forth in SEQ ID NO: 147 and an antisense strand consisting of a nucleotide sequence set forth in SEQ ID NO: 148, a sense strand consisting of a nucleotide sequence set forth in SEQ ID NO: 149 and an antisense strand consisting of a nucleotide sequence set forth in SEQ ID NO: 150, a sense strand consisting of a nucleotide sequence set forth in SEQ ID NO: 151 and an antisense strand consisting of a nucleotide sequence set forth in SEQ ID NO: 152, and a sense strand consisting of a nucleotide sequence set forth in SEQ ID NO: 153 and an antisense strand consisting of a nucleotide sequence set forth in SEQ ID NO: 154. The combinations respectively correspond to the sequences of siRNA-008, siRNA-008-01, siRNA-008-02, siRNA-008-08, siRNA-008-09, siRNA-008-10, siRNA-008-11, siRNA-008-12, siRNA-008-13, siRNA-008-14, siRNA-008-22, siRNA-008-23, siRNA-008-30, siRNA-008-31, siRNA-008-32, siRNA-008-33, siRNA-008-34, siRNA-008-35, siRNA-008-36, siRNA-008-37, and siRNA-008-38 in the present specification.

In the double-stranded ribonucleic acid in the embodiment, a sense strand and an antisense strand as any one of the combinations (1) to (21) are pairing.

(1) a sense strand consisting of a nucleotide sequence set forth in SEQ ID NO: 13, and an antisense strand consisting of a nucleotide sequence set forth in SEQ ID NO: 14
(2) a sense strand consisting of a nucleotide sequence set forth in SEQ ID NO: 159, and an antisense strand consisting of a nucleotide sequence set forth in SEQ ID NO: 160
(3) a sense strand consisting of a nucleotide sequence set forth in SEQ ID NO: 115, and an antisense strand consisting of a nucleotide sequence set forth in SEQ ID NO: 116
(4) a sense strand consisting of a nucleotide sequence set forth in SEQ ID NO: 117, and an antisense strand consisting of a nucleotide sequence set forth in SEQ ID NO: 118
(5) a sense strand consisting of a nucleotide sequence set forth in SEQ ID NO: 119, and an antisense strand consisting of a nucleotide sequence set forth in SEQ ID NO: 120
(6) a sense strand consisting of a nucleotide sequence set forth in SEQ ID NO: 121, and an antisense strand consisting of a nucleotide sequence set forth in SEQ ID NO: 122
(7) a sense strand consisting of a nucleotide sequence set forth in SEQ ID NO: 123, and an antisense strand consisting of a nucleotide sequence set forth in SEQ ID NO: 124
(8) a sense strand consisting of a nucleotide sequence set forth in SEQ ID NO: 125, and an antisense strand consisting of a nucleotide sequence set forth in SEQ ID NO: 126
(9) a sense strand consisting of a nucleotide sequence set forth in SEQ ID NO: 127, and an antisense strand consisting of a nucleotide sequence set forth in SEQ ID NO: 128
(10) a sense strand consisting of a nucleotide sequence set forth in SEQ ID NO: 129, and an antisense strand consisting of a nucleotide sequence set forth in SEQ ID NO: 130
(11) a sense strand consisting of a nucleotide sequence set forth in SEQ ID NO: 131, and an antisense strand consisting of a nucleotide sequence set forth in SEQ ID NO: 132
(12) a sense strand consisting of a nucleotide sequence set forth in SEQ ID NO: 133, and an antisense strand consisting of a nucleotide sequence set forth in SEQ ID NO: 134
(13) a sense strand consisting of a nucleotide sequence set forth in SEQ ID NO: 137, and an antisense strand consisting of a nucleotide sequence set forth in SEQ ID NO: 138
(14) a sense strand consisting of a nucleotide sequence set forth in SEQ ID NO: 139, and an antisense strand consisting of a nucleotide sequence set forth in SEQ ID NO: 140
(15) a sense strand consisting of a nucleotide sequence set forth in SEQ ID NO: 141, and an antisense strand consisting of a nucleotide sequence set forth in SEQ ID NO: 142
(16) a sense strand consisting of a nucleotide sequence set forth in SEQ ID NO: 143, and an antisense strand consisting of a nucleotide sequence set forth in SEQ ID NO: 144
(17) a sense strand consisting of a nucleotide sequence set forth in SEQ ID NO: 145, and an antisense strand consisting of a nucleotide sequence set forth in SEQ ID NO: 146
(18) a sense strand consisting of a nucleotide sequence set forth in SEQ ID NO: 147, and an antisense strand consisting of a nucleotide sequence set forth in SEQ ID NO: 148
(19) a sense strand consisting of a nucleotide sequence set forth in SEQ ID NO: 149, and an antisense strand consisting of a nucleotide sequence set forth in SEQ ID NO: 150
(20) a sense strand consisting of a nucleotide sequence set forth in SEQ ID NO: 151, and an antisense strand consisting of a nucleotide sequence set forth in SEQ ID NO: 152
(21) a sense strand consisting of a nucleotide sequence set forth in SEQ ID NO: 153, and an antisense strand consisting of a nucleotide sequence set forth in SEQ ID NO: 154

Each of the combinations (1) to (21) of a sense strand and an antisense strand includes a region complementary to each other. For example, a double-stranded ribonucleic acid including the combination (1) of the sense strand set forth in SEQ ID NO: 13 and the antisense strand set forth in SEQ ID NO: 14 includes the following complementary strands (dT^dT at the 3'-terminal is not shown, see Table 1 for more details).

```
                                             (SEQ ID NO: 13)
           5'-uGGuAuAuGuGuuGcuGAu-3'

(SEQ ID NO: 14)
           3'-AcCAuAuAcAcAAcGAcUA-5'
```

In the double-stranded ribonucleic acid comprising a sense strand and an antisense strand in an embodiment, the combination of the sense strand and the antisense strand is selected from the group consisting of a sense strand consisting of a nucleotide sequence set forth in SEQ ID NO: 159 and an antisense strand consisting of a nucleotide sequence set forth in SEQ ID NO: 160, a sense strand consisting of a nucleotide sequence set forth in SEQ ID NO: 139 and an antisense strand consisting of a nucleotide sequence set forth in SEQ ID NO: 140, a sense strand consisting of a nucleotide sequence set forth in SEQ ID NO: 141 and an antisense strand consisting of a nucleotide sequence set forth in SEQ ID NO: 142, a sense strand consisting of a nucleotide sequence set forth in SEQ ID NO: 143 and an antisense strand consisting of a nucleotide sequence set forth in SEQ ID NO: 144, a sense strand consisting of a nucleotide sequence set forth in SEQ ID NO: 145 and an antisense strand consisting of a nucleotide sequence set forth in SEQ ID NO: 146, a sense strand consisting of a nucleotide sequence set forth in SEQ ID NO: 147 and an antisense strand consisting of a nucleotide sequence set forth in SEQ ID NO: 148, and a sense strand consisting of a nucleotide sequence set forth in SEQ ID NO: 153 and an antisense strand consisting of a nucleotide sequence set forth in SEQ ID NO: 154. The combinations respectively correspond to the sequences of siRNA-008-01, siRNA-008-31, siRNA-008-32, siRNA-008-33, siRNA-008-34, siRNA-008-35, and siRNA-008-38 in the present specification.

In the double-stranded ribonucleic acid comprising a sense strand and an antisense strand in an embodiment, the combination of the sense strand and the antisense strand is selected from the group consisting of a sense strand consisting of a nucleotide sequence set forth in SEQ ID NO: 159 and an antisense strand consisting of a nucleotide sequence set forth in SEQ ID NO: 160, a sense strand consisting of a nucleotide sequence set forth in SEQ ID NO: 141 and an antisense strand consisting of a nucleotide sequence set forth in SEQ ID NO: 142, a sense strand consisting of a nucleotide sequence set forth in SEQ ID NO: 143 and an antisense strand consisting of a nucleotide sequence set forth in SEQ ID NO: 144, a sense strand consisting of a nucleotide sequence set forth in SEQ ID NO: 145 and an antisense strand consisting of a nucleotide sequence set forth in SEQ ID NO: 146, a sense strand consisting of a nucleotide sequence set forth in SEQ ID NO: 147 and an antisense strand consisting of a nucleotide sequence set forth in SEQ ID NO: 148, and a sense strand consisting of a nucleotide sequence set forth in SEQ ID NO: 153 and an antisense strand consisting of a nucleotide sequence set forth in SEQ ID NO: 154. The combinations respectively correspond to the sequences of siRNA-008-01, siRNA-008-32, siRNA-008-33, siRNA-008-34, siRNA-008-35, and siRNA-008-38 in the present specification.

In the double-stranded ribonucleic acid comprising a sense strand and an antisense strand in an embodiment, the combination of the sense strand and the antisense strand is selected from the group consisting of a sense strand consisting of a nucleotide sequence set forth in SEQ ID NO: 141 and an antisense strand consisting of a nucleotide sequence set forth in SEQ ID NO: 142, a sense strand consisting of a nucleotide sequence set forth in SEQ ID NO: 143 and an antisense strand consisting of a nucleotide sequence set forth in SEQ ID NO: 144, a sense strand consisting of a nucleotide sequence set forth in SEQ ID NO: 145 and an antisense strand consisting of a nucleotide sequence set forth in SEQ ID NO: 146, a sense strand consisting of a nucleotide sequence set forth in SEQ ID NO: 147 and an antisense strand consisting of a nucleotide sequence set forth in SEQ ID NO: 148, and a sense strand consisting of a nucleotide sequence set forth in SEQ ID NO: 153 and an antisense strand consisting of a nucleotide sequence set forth in SEQ ID NO: 154. The combinations respectively correspond to the sequences of siRNA-008-32, siRNA-008-33, siRNA-008-34, siRNA-008-35, and siRNA-008-38 in the present specification.

In an embodiment, the double-stranded ribonucleic acid comprising a sense strand and an antisense strand comprises a sense strand consisting of a nucleotide sequence set forth in SEQ ID NO: 159, and an antisense strand consisting of a nucleotide sequence set forth in SEQ ID NO: 160. The combination corresponds to the sequence of siRNA-008-01 in the present specification.

In an embodiment, the double-stranded ribonucleic acid comprising a sense strand and an antisense strand comprises a sense strand consisting of a nucleotide sequence set forth in SEQ ID NO: 141, and an antisense strand consisting of a nucleotide sequence set forth in SEQ ID NO: 142. The combination corresponds to the sequence of siRNA-008-32 in the present specification.

In an embodiment, the double-stranded ribonucleic acid comprising a sense strand and an antisense strand comprises a sense strand consisting of a nucleotide sequence set forth in SEQ ID NO: 143, and an antisense strand consisting of a nucleotide sequence set forth in SEQ ID NO: 144. The combination corresponds to the sequence of siRNA-008-33 in the present specification.

In an embodiment, the double-stranded ribonucleic acid comprising a sense strand and an antisense strand comprises a sense strand consisting of a nucleotide sequence set forth in SEQ ID NO: 145, and an antisense strand consisting of a nucleotide sequence set forth in SEQ ID NO: 146. The combination corresponds to the sequence of siRNA-008-34 in the present specification.

In an embodiment, the double-stranded ribonucleic acid comprising a sense strand and an antisense strand comprises a sense strand consisting of a nucleotide sequence set forth in SEQ ID NO: 147, and an antisense strand consisting of a nucleotide sequence set forth in SEQ ID NO: 148. The combination corresponds to the sequence of siRNA-008-35 in the present specification.

In an embodiment, the double-stranded ribonucleic acid comprising a sense strand and an antisense strand comprises a sense strand consisting of a nucleotide sequence set forth in SEQ ID NO: 153, and an antisense strand consisting of a nucleotide sequence set forth in SEQ ID NO: 154. The combination corresponds to the sequence of siRNA-008-38 in the present specification.

The antisense strand in an embodiment is substantially complementary to at least a part of an mRNA transcript of a C5 gene. Here, the phrase "substantially complementary" includes not only cases that the antisense strand is completely complement to a part of an mRNA transcript of a C5 gene but also cases that there are one to several acceptable mismatches between the antisense strand and a part of an mRNA transcript of C5 gene.

The sense strand in an embodiment is substantially complementary to at least a part of the nucleotide sequence of the antisense strand. The phrase "substantially complementary" includes not only cases that the sense strand is completely complement to a part of the nucleotide sequence of the antisense strand but also cases that there are one to several acceptable mismatches between the sense strand and a part of the nucleotide sequence of the antisense strand. The phrase "completely complementary" may apply to cases when the oligonucleotide of the longer of the sense strand and the antisense strand includes a nucleotide sequence completely complementary to the oligonucleotide of the shorter.

The double-stranded ribonucleic acid in an embodiment also includes a modified nucleotide, as described later (see also Table 1). Hence, the term "nucleotide" used herein is intended not only to refer to guanosine-3'-phosphate, cytidine-3'-phosphate, adenosine-3'-phosphate, and uridine-3'-phosphate, but also to encompass various modified nucleotides.

The term "double-stranded ribonucleic acid" or "dsRNA" herein refers to a ribonucleic acid (RNA) molecule having double-stranded structure including two antiparallel, substantially complementary oligonucleotides, or a complex thereof. Examples of double-stranded ribonucleic acids herein include, but are not limited to, siRNAs (small interfering RNAs). The double-stranded ribonucleic acid of an embodiment comprises a sense strand and an antisense strand. Through RNAi using the double-stranded ribonucleic acid of an embodiment, an mRNA for a C5 gene is cleaved as the target mRNA molecule in an RISC complex, and as a result expression of C5 is suppressed. For example, expression of C5 in cells in a subject is suppressed.

The double-stranded ribonucleic acid of an embodiment can be synthesized, for example, by using a method with chemical synthesis known in the art (e.g., described in Nucleic Acid Research, 35(10), 3287-96 (2007)) and enzymatic transcription.

The double-stranded ribonucleic acid of an embodiment includes various modifications. Modification can be performed by using a method known in the art. Examples of the modification include sugar modification.

Examples of the sugar modification include modification for the ribose moiety constituting ribonucleoside, specifically, substitution or addition at the hydroxy group at the 2'-position, more specifically, 2'-O-methyl-modified nucleotide in which the hydroxy group has been substituted with a methoxy group. Nucleotides represented as lowercase a, u, g, and c in Table 1 are 2'-O-methyl-modified nucleotides, and the sense strand and antisense strand of the double-stranded ribonucleic acid of an embodiment each include 2'-O-methyl-modified nucleotide.

The double-stranded ribonucleic acid can be modified by inserting an additional nucleotide or nucleotide derivative, which is called overhang, into the 3'-side or 5'-side of a region where the sense strand and the antisense strand are forming a double strand. The double-stranded ribonucleic acid of an embodiment includes the sense strand and/or the antisense strand including deoxy-thymidine (dT) at the 3'-terminal as SEQ ID NO: 13 and SEQ ID NO: 14, and the sense strand and the antisense strand including inverted deoxy-thymidine (idT) as SEQ ID NO: 129. The double-stranded ribonucleic acid of an embodiment also includes the sense strand and/or the antisense strand including U, A, and so forth, added as an overhang sequence, for example, that including UUUU added at the 3'-terminal of the antisense strand as SEQ ID NOs: 140 and 142.

Alternatively, the double-stranded ribonucleic acid can be backbone-modified through modification or substitution of the phosphodiester bond. Examples of the modification or substitution of the phosphodiester bond include a phosphorothioate bond. The double-stranded ribonucleic acid of an embodiment also includes that including neighboring nucleotides connected with a phosphorothioate bond as SEQ ID NO: 13, SEQ ID NO: 14, and SEQ ID NO: 121.

(Lipid Complex)

The pharmaceutical composition of the present embodiment comprises a lipid complex comprising a double-stranded ribonucleic acid. In an embodiment, the lipid complex comprises (I) the above double-stranded ribonucleic acid, (II) a cationic lipid, and (III) at least one lipid selected from the group consisting of neutral lipid, polyethylene glycol-modified lipid (PEG lipid), and sterol. Examples of the lipid complex herein include, but are not limited to, LNPs (lipid nanoparticles). In a particular embodiment, the pharmaceutical composition comprises a lipid complex encapsulating a double-stranded ribonucleic acid. The pharmaceutical composition of another embodiment comprises a lipid nanoparticle comprising a double-stranded ribonucleic acid.

Examples of the form of a lipid complex formed of a lipid containing a cationic lipid and the double-stranded ribonucleic acid include a complex of the double-stranded ribonucleic acid and a membrane consisting of a lipid monolayer (single molecule) (reverse micelle); a complex of the double-stranded ribonucleic acid and a liposome; and a complex of the double-stranded ribonucleic acid and a micelle. In a lipid complex of an embodiment of the present invention, the double-stranded ribonucleic acid is encapsulated in a fine particle comprising a lipid containing a cationic lipid.

In an embodiment, the lipid complex contains the double-stranded ribonucleic acid in a content of, for example, 0.01 to 50% by weight, 0.1 to 30% by weight, or 1 to 10% by weight to the total weight of the lipid complex.

Cationic lipid is an amphiphilic molecule having a lipophilic region including one or more hydrocarbon groups and a hydrophilic region including a polar group to be protonated at specific pH. Examples of the cationic lipid of an embodiment include, but are not particularly limited to, cationic lipids described in International Publication Nos. WO 2015/105131, WO 2016/104580, and WO 2017/222016, and alternatively a cationic lipid with improved biodegradability described in International Publication No. WO 2016/104580 or WO 2017/222016 can be used. Examples of the cationic lipid of an embodiment include 1-oxo-1-(undecan-5-yloxy)nonadecan-10-yl-1-methylpiperidine-4-carboxylate, 1-((2-butyloctyl)oxy)-1-oxononadecan-10-yl-1-methylpiperidine-4-carboxylate, 1-oxo-1-(undecan-5-yloxy)heptadecan-8-yl-1-methylpiperidine 4-carboxylate, 21-oxo-21-(undecan-5-yloxy)heneicosan-10-yl-1-methylpiperidine4-carboxylate, 21-(octan-3-yloxy)-21-oxoheneicosan-10-yl-1-methylpiperidine-4-carboxylate, 1-((2-butyloctyl)oxy)-1-oxoicosan-10-yl-1-methylpiperidine-4-carboxylate, (Z)-1-((2-butylnon-3-en-1-yl)oxy)-1-oxoicosan-10-yl-1-methylpiperidine-4-carboxylate, 1-oxo-1-((3-pentyloctyl)oxy)icosan-10-yl-1-methylpiperidine-4-carboxylate, 1-((3,4-dipropylheptyl)oxy)-1-oxoicosan-10-yl-1-methylpiperidine-4-carboxylate, 14(6-(butyldisulfanyl)-3-(3-(butyldisulfanyl)propyl)hexyl)oxy)-1-oxoicosan-10-yl-1-methylpiperidine-4-carboxylate, 2-butyloctyl-10-((4-(dimethylamino)butanoyl)oxy)icosanoate, 2-{9-[(2-butyloctyl)oxy]-9-oxononyl}dodecyl 1-methylpiperidine-4-carboxylate, 2-{9-oxo-9-[(3-pentyloctyl)oxy]nonyl}dodecyl 1-methylpiperidine-4-carboxylate, 2-nonyl-11-oxo-11-[(3-pentyloctyl)oxy]undecyl 1-methylpiperidine-4-carboxylate, bis(3-pentyloctyl) 9-{[1(1-methylpiperidine-4-carbonyl)oxy]methyl} heptadecanedioate, di[(Z)-2-nonen-1-yl]9-{1[(1-methylpiperidine-4-carbonyl)oxy]methyl}heptadecanedioate, 1-(2-octylcyclopropyl)heptadecan-8-yl-1-methylpiperidine-4-carboxylate, (3S)-2-{9-oxo-9-[(3-pentyloctypoxy]nonyl}dodecyl 1-methylpyrrolidine-3-carboxylate, and (3R)-2-{9-oxo-9-[(3-pentyloctypoxy]nonyl}dodecyl 1-methylpyrrolidine-3-carboxylate. In an embodiment, the cationic lipid is 1-((2-butyloctyl)oxy)-1-oxoicosan-10-yl-1-methylpiperidine-4-carboxylate, 1-((2-butyloctyl)oxy)-1-oxononadecan-10-yl-1-methylpiperidine-4-carboxylate, 2-{9-oxo-9-[(3-pentyloctyl)oxy]nonyl}dodecyl 1-methylpiperidine-4-carboxylate, 1-(2-octylcyclopropyl)heptadecan-8-yl-1-methylpiperidine-4-carboxylate, (3S)-2-{9-oxo-9-[(3-pentyloctypoxy]nonyl}dodecyl 1-methylpyrrolidine-3-carboxylate, or (3R)-2-{9-oxo-9-[(3-pentyloctypoxy]nonyl}dodecyl 1-methylpyrrolidine-3-carboxylate. In a particular embodiment, the cationic lipid is 2-{9-oxo-9-[(3-pentyl octyl)oxy]nonyl}dodecyl 1-methylpiperidine-4-carboxylate.

The lipid complex in an embodiment contains the above-described cationic lipid in a content of, for example, 10 to 100 mol %, 20 to 90 mol %, 30 to 90 mol %, or 40 to 70 mol % based on the total lipids contained in the lipid complex.

One cationic lipid can be used singly, and mixture of two or more cationic lipids can also be used.

The lipid complex in an embodiment comprises (I) the above-described cationic lipid and (II) at least one lipid selected from the group consisting of neutral lipid, polyethylene glycol-modified lipid, and sterol, as a lipid component. The lipid complex of an embodiment contains the lipid component in a content of, for example, 50 to 99.99% by weight, 70 to 99.9% by weight, or 90 to 99% by weight to the total weight of the lipid complex.

The term "neutral lipid" refers to a lipid present either as a non-charged form or as a neutral zwitterion at physiological pH. Examples of the neutral lipid of the present embodiment include phospholipid and ceramide. Examples of the phospholipid of the present embodiment include DOPE (1,2-Dioleoyl-sn-glycero-3-phosphoethanolamine), POPE (1-Palmitoyl-2-oleoyl-sn-glycero-3-phosphoethanolamine), HSPC (Hydrogenated soybean phosphatidylcholine), SOPC (1-Stearoyl-2-oleoyl-sn-glycero-3-phosphocholine), POPC (1-Palmitoyl-2-oleoyl-sn-glycero-3-phosphocholine), EPC (Egg phosphatidylcholine), DMPC (1,2-Dimyristoyl-sn-glycero-3-phosphocholine), DPPC (1,2-Dipalmitoyl-sn-glycero-3-phosphocholine), DSPC (1,2-Distearoyl-sn-glycero-3-phosphocholine), DAPC (1,2-Diarachidoyl-sn-glycero-3-phosphocholine), DBPC (1,2-Dibehenoyl-sn-glycero-3-phosphocholine), DLPC (1,2-Dilauroyl-sn-glycero-3-phosphocholine), DOPC (1,2-Dioleoyl-sn-glycero-3-phosphocholine), DOPG (1,2-Dioleoyl-sn-glycero-3-phosphoglycerol), DPPG (1,2-Dipalmitoyl-sn-glycero-3-phosphoglycerol), DSPG (1,2-Distearoyl-sn-glycero-3-phosphoglycerol), DOPS (1,2-Dioleoyl-sn-glycero-3-phospho-L-serine), DOPE-MAL (N-(3-Maleimide-1-oxopropyl)-L-α-phosphatidylethanolamine, Dioleoyl), and sphingomyelin. In an embodiment, the neutral lipid is DOPE, HSPC, DPPC, DSPC, or DAPC. In a particular embodiment, the neutral lipid is DSPC. One neutral lipid can be used singly, and mixture of two or more neutral lipids can also be used.

The lipid complex in an embodiment may contain the neutral lipid in a content of, for example, 0 to 50 mol %, 0 to 40 mol %, 0 to 30 mol %, or 0 to 20 mol % based on the total lipids contained in the lipid complex. In another embodiment, the lipid complex may contain the neutral lipid in a content of, for example, 0.1 to 20 mol % or 3 to 15 mol % based on the total lipids contained in the lipid complex.

The polyethylene glycol-modified lipid (PEG lipid) refers to a lipid having a polyethylene glycol group. Examples of the polyethylene glycol-modified lipid (PEG lipid) in an embodiment include PEG2000-DMG PEG2000-DPG PEG2000-DSG PEG5000-DMG PEG5000-DPG PEG5000-DSG PEG-cDMA, PEG-C-DOMG PEG-DAG PEG-DAA, PEG-phospholipid, PEG-cholesterol, and PEG-ceramide (Cer). Examples of PEG2000-DMG PEG2000-DPG PEG2000-DSG PEG-cDMA, and PEG-C-DOMG. In a particular embodiment, the polyethylene glycol-modified lipid is PEG2000-DMG. The PEG in the present specification also includes methoxy PEG (MPEG). Specifically, for example, MPEG2000-DMG is included in PEG2000-DMG and MPEG2000-DPG is also included in PEG2000-DPG One polyethylene glycol-modified lipid can be used singly, and mixture of two or more polyethylene glycol-modified lipids can also be used.

The lipid complex in an embodiment may contain the polyethylene glycol-modified lipid in a content of, for example, 0 to 30 mol %, 0 to 20 mol %, 0 to 10 mol %, or 0.5 to 2 mol % based on the total lipids contained in the lipid complex. In another embodiment, the lipid complex may contain the polyethylene glycol-modified lipid in a content of, for example, 0.01 to 10 mol % or 0.1 to 3 mol % based on the total lipids contained in the lipid complex.

Sterol is an alcohol having a steroid backbone. Examples of the sterol of an embodiment include cholesterol, dihydrocholesterol, lanosterol, β-sitosterol, campesterol, stigmasterol, brassicasterol, ergosterol, fucosterol, and 3β-[N—(N',N'-dimethylaminoethyl)carbamoyl]cholesterol (DC-Chol). In an embodiment, the sterol is cholesterol, dihydrocholesterol, lanosterol, or β-sitosterol. In a particular embodiment, the sterol is cholesterol. One sterol can be used singly, and mixture of two or more sterols can also be used.

The lipid complex in an embodiment may contain the sterol in a content of, for example, 0 to 90 mol %, 10 to 80 mol %, or 20 to 40 mol % based on the total lipids contained in the lipid complex. In another embodiment, the lipid complex may contain the sterol in a content of, for example, 0.1 to 70 mol % or 15 to 60 mol % based on the total lipids contained in the lipid complex.

Combination of lipid components in the lipid complex in an embodiment is not particularly limited, and examples thereof include combination of the above-described cationic lipid, neutral lipid, and sterol, and combination of the above-described cationic lipid, neutral lipid, polyethylene glycol-modified lipid, and sterol.

In an embodiment, the lipid complex comprises a cationic lipid, neutral lipid, polyethylene glycol-modified lipid, and sterol. The cationic lipid is needed for encapsulation of a nucleic acid or efficient delivery of a nucleic acid to target cells, and the polyethylene glycol-modified lipid has been reported to be needed for preventing particles from aggregating (Molecular Therapy-Nucleic Acids (2012)1, e37). Moreover, it has been reported that coexistence of four lipids: neutral lipid and sterol in addition to those two lipids, is crucial for encapsulation of a nucleic acid to form stable particles (Nanoscale. 2019 Nov. 21; 11(45): 21733-21739.).

The lipid complex in an embodiment may be a lipid complex containing, for example, 2-{9-oxo-9-[(3-pentyloctyl)oxy]nonyl}dodecyl 1-methylpiperidine-4-carboxylate and at least one lipid selected from the group consisting of DSPC, PEG2000-DMQ and cholesterol, or a lipid complex containing 2-{9-oxo-9-[(3-pentyloctyl)oxy]nonyl}dodecyl 1-methylpiperidine-4-carboxylate, DSPC, PEG2000-DMQ and cholesterol.

The lipid complex in an embodiment encapsulating the double-stranded ribonucleic acid comprises lipid components of cationic lipid/neutral lipid/polyethylene glycol-modified lipid/sterol, and the mole ratio of the lipids may be, for example, 10 to 99/0 to 50/0 to 10/0 to 50, 10 to 99/1 to 50/0.5 to 10/10 to 50, 40 to 70/1 to 20/0.5 to 2/20 to 40, or 40 to 70/0 to 20/0.5 to 2/20 to 40. In an embodiment, the mole ratio of cationic lipid/neutral lipid/polyethylene glycol-modified lipid/sterol in the lipid complex is 30 to 90/0.1 to 20/0.01 to 10/0.1 to 70. In another embodiment, the mole ratio of cationic lipid/neutral lipid/polyethylene glycol-modified lipid/sterol in the lipid complex is 40 to 70/3 to 15/0.1 to 3/15 to 60. In a particular embodiment, the mole ratio of cationic lipid/neutral lipid/polyethylene glycol-modified lipid/sterol in the lipid complex is 60/10.5/1.5/28.

The "average particle size" of the lipid complex in the present specification refers to the Z-average particle size, and the average particle size is measured by a dynamic light scattering method. The average particle size (Z-average) of the lipid complex comprising a double-stranded ribonucleic acid may be, for example, 10 to 1000 nm, 30 to 500 nm, or 30 to 200 nm, though the average particle size is not particularly limited thereto. In an embodiment, the average particle size of the lipid complex comprising a double-stranded ribonucleic acid is 100 nm or less. In a particular embodiment, the average particle size of the lipid complex comprising a double-stranded ribonucleic acid is 65 nm or more and 100 nm or less. In another embodiment, the average particle size of the lipid complex comprising a double-stranded ribonucleic acid is 80 nm or more and 100 nm or less, and, in still another embodiment, the average particle size of the lipid complex comprising a double-stranded ribonucleic acid is 85 nm or more and 100 nm or less.

In an embodiment, the pH of a solution of the lipid complex is 5.0 or less or 7.5 or more. In another embodiment, the pH of a solution of the lipid complex is 2.0 or more and 5.0 or less, or 7.5 or more and 11.0 or less. In another embodiment, the pH of a solution of the lipid complex is 2.0 or more and 5.0 or less, 2.5 or more and 5.0 or less, 3.0 or more and 5.0 or less, 3.5 or more and 5.0 or less, 4.0 or more and 5.0 or less, 4.5 or more and 5.0 or less, 7.5 or more and 11.0 or less, 7.5 or more and 10.5 or less, 7.5 or more and 10.0 or less, 7.5 or more and 9.5 or less, 7.5 or more and 9.0 or less, or 7.5 or more and 8.5 or less. In a particular embodiment, the pH of a solution of the lipid complex is 7.5 or more and 8.5 or less. The storage stability of the pharmaceutical composition is improved by setting the pH of a solution of the lipid complex in the above range.

The storage stability of the pharmaceutical composition of the present embodiment can be determined, for example, on the basis of the degree of change in the average particle size by comparing the average particle size of the lipid complex before storage and the average particle size of the lipid complex after storage for a given period of time. In the present specification, "before storage" may be, for example, the time immediately after production of the pharmaceutical composition, or, if the pH has been adjusted, the time immediately after the pH adjustment. Examples of conditions for storage of the pharmaceutical composition of the present embodiment include conditions that allow to keep in a cool place or refrigerator (conditions for refrigerated storage), and normal temperature or room temperature. In an embodiment, a condition for the storage of the pharmaceutical composition is 2 to 8° C. In another embodiment, a condition for the storage of the pharmaceutical composition is 5° C. In still another embodiment, a condition for the storage of the pharmaceutical composition is 25° C.

The storage stability of the pharmaceutical composition may be determined, for example, on the basis of the average particle size of the lipid complex 2 weeks after the initiation of storage (after storage for 2 weeks), or determined on the basis of the average particle size of the lipid complex 1 month after the initiation of storage (after storage for 1 month), or determined on the basis of the average particle size of the lipid complex 2 months after the initiation of storage (after storage for 2 months), or determined on the basis of the average particle size of the lipid complex 3 months after the initiation of storage (after storage for 3 months). In an embodiment, the storage stability may be determined to be good if the change in the average particle size of the lipid complex after storage is ±10% or less from the average particle size of the lipid complex before storage, the storage stability may be determined to be good if the change in the average particle size of the lipid complex after storage is ±8% or less from the average particle size of the lipid complex before storage, and the storage stability may be determined to be good if the change in the average particle size of the lipid complex after storage is ±5% or less from the average particle size of the lipid complex before storage. Specifically, for example, the storage stability may be determined to be good if the average particle size of the lipid complex 2 weeks after the initiation of storage differs by ±10% or less from the average particle size of the lipid complex before the storage. In another embodiment, the storage stability of the pharmaceutical composition can be determined on the basis of increase in the average particle size, and, for example, the storage stability may be determined to be good if the average particle size of the lipid complex after storage for a given period of time differs by +10% or less from the average particle size of the lipid complex before the storage, the storage stability may be determined to be good if the average particle size of the lipid complex after storage for a given period of time differs by +8% or less from the average particle size of the lipid complex before the storage, and the storage stability may be determined to be good if the average particle size of the lipid complex after storage for a given period of time differs by +5% or less from the average particle size of the lipid complex before the storage. Specifically, for example, the storage stability of the pharmaceutical composition may be determined to be good if the average particle size of the lipid complex 2 weeks after the initiation of storage differs by +10% or less from the average particle size of the lipid complex before the storage.

The siRNA encapsulation efficiency for a lipid complex in an embodiment encapsulating the double-stranded ribonucleic acid can be calculated, for example, from the siRNA concentration of a formulation diluted with RNase Free Water, which is assumed as the concentration of siRNA present in the LNP external solution, and the siRNA concentration of the formulation diluted with 1% Triton X-100, which is assumed as the total siRNA concentration of the formulation, where each siRNA concentration is measured by using Quant-iT RiboGreen RNA Reagent (Invitrogen, Cat #R11491) (see also Kewal K. Jain, Drug Delivery System, Methods in Molecular Biology, Vol. 1141: 109-120). The encapsulation efficiency calculated in this manner is, for example, higher than 80%, higher than 85%, or higher than 90%. The siRNA encapsulation efficiency for a lipid complex in an embodiment is higher than 90%.

<Method for Producing Lipid Complex>

Examples of methods for encapsulating an effective molecule in a lipid complex include a reverse phase evaporation method, a zwitterion (NaCl) hydration method, a cationic core hydration method, and a method with ethanol and calcium (see, Biomembr., 1468, 239-252 (2000)). A lipid complex in pharmaceutical composition of an embodiment encapsulating the double-stranded ribonucleic acid can be prepared by using any of these methods known in the art.

A lipid complex in an embodiment comprising the double-stranded ribonucleic acid can be prepared by, for example, mixing a lipid solution containing the cationic lipid and at least one lipid selected from the group consisting of neutral lipid, polyethylene glycol-modified lipid, and sterol, and an acidic buffer containing the double-stranded ribonucleic acid. By using such a method, a lipid complex the inside of which is filled with a core of the double-stranded ribonucleic acid and the lipids can be obtained. A lipid complex of an embodiment comprising the double-stranded ribonucleic acid may contain the cationic lipid and at least one lipid selected from the group consisting of neutral lipid, polyethylene glycol-modified lipid, and sterol.

A lipid complex of an embodiment comprising the double-stranded ribonucleic acid can be produced by using a method including: a step (a) of mixing a polar organic solvent-containing aqueous solution containing (I) the cationic lipid and (II) at least one lipid selected from the group consisting of neutral lipid, polyethylene glycol-modified lipid, and sterol, and an aqueous solution containing (III) the double-stranded ribonucleic acid to obtain a mixed solution; and a step (b) of reducing the content of the polar organic solvent in the mixed solution.

Through the electrostatic interaction between the double-stranded ribonucleic acid and the cationic lipid, each being water-soluble, and the hydrophobic interaction among the lipids, a lipid complex encapsulating the double-stranded ribonucleic acid in a fine particle comprising the lipids can be formed. For example, a lipid complex can be formed by reducing the content of the polar organic solvent in the mixed solution to change the solubility of the lipid component containing (I) the cationic lipid and (II) at least one lipid selected from the group consisting of neutral lipid, polyethylene glycol-modified lipid, and sterol in the polar organic solvent-containing aqueous solution. Examples of the polar organic solvent include alcohol such as ethanol.

First, in the step (a), a polar organic solvent-containing aqueous solution containing (I) the cationic lipid and (II) at least one lipid selected from the group consisting of neutral lipid, polyethylene glycol-modified lipid, and sterol dissolved therein is mixed with an aqueous solution containing (III) the double-stranded ribonucleic acid to obtain a mixed solution. The concentration of the polar organic solvent in the polar organic solvent-containing aqueous solution is not particularly limited as long as conditions for dissolving lipid molecules are satisfied even after mixing with the aqueous solution containing the double-stranded ribonucleic acid. The concentration of the polar organic solvent in the mixed solution obtained in the step (a) can be 0.1 to 60% by weight. The aqueous solution containing (III) the double-stranded ribonucleic acid is obtained by, for example, dissolving the double-stranded ribonucleic acid in an acidic buffer.

Subsequently, in the step (b), the content of the polar organic solvent is reduced by adding water or the like to the mixed solution. Thereby, a lipid complex can be formed. It is preferred for efficient formation of the lipid complex to rapidly lower the content of the polar organic solvent. In an example, the concentration of the polar organic solvent in the final polar organic solvent-containing aqueous solution in the step (b) can be 0 to 5% by weight.

The mixed solution obtained in the step (a) may be subjected to dialysis to remove the polar organic solvent and substitute the solvent with a pharmaceutically acceptable medium. The content of the polar organic solvent in the solution decreases during the dialysis, by which a lipid complex can be formed.

By using the method for producing a composition of an embodiment, a lipid complex encapsulating the double-stranded ribonucleic acid in the inside of a fine particle can be obtained with high encapsulation efficiency.

Examples of the acidic buffer to dissolve the double-stranded ribonucleic acid therein include sulfate buffer, phosphate buffer, phthalate buffer, tartrate buffer, citrate buffer, formate buffer, oxalate buffer, and acetate buffer.

Examples of the solvent to dissolve the lipids therein include polar organic solvent such as alcohol, and the solvent may be, for example, ethanol, isopropanol, chloroform, or tert-butanol.

The method of the present embodiment for producing a pharmaceutical composition can further comprise adjusting the pH of a solution of the lipid complex. The adjustment of the pH of the solution is typically performed after inclusion of a double-stranded ribonucleic acid in the lipid complex. The adjusting step may be, for example, adjusting the pH of a solution of the lipid complex to 5.0 or less or 7.5 or more, or adjusting the pH of a solution of the lipid complex to 2.0 or more and 5.0 or less, or 7.5 or more and 11.0 or less, or adjusting the pH of a solution of the lipid complex to 2.0 or more and 5.0 or less, or adjusting the pH of a solution of the lipid complex to 7.5 or more and 11.0 or less, or adjusting the pH of a solution of the lipid complex to 7.5 or more or 10.0, or adjusting the pH of a solution of the lipid complex to 7.5 or more and 9.5 or less, or adjusting the pH of a solution of the lipid complex to 7.5 or more and 9.0 or less, or adjusting the pH of a solution of the lipid complex to 7.5 or more and 8.5 or less. In a particular embodiment, the adjusting step is adjusting the pH of a solution of the lipid complex to 7.5 or more and 8.5 or less.

The adjustment of the pH can be performed by using a known method, and may be performed, for example, by using an acidic aqueous solution of hydrochloric acid or the like or a basic aqueous solution of sodium hydroxide or the like, or performed by using buffer solution (buffer) of phosphate, citrate, acetate, tartrate, borate, or the like.

As described above, expression of complement C5 can be inhibited through RNAi by using the double-stranded ribonucleic acid comprised in the pharmaceutical composition of the present embodiment. In an embodiment, the pharmaceutical composition can comprise a pharmaceutically acceptable carrier in addition to the lipid complex comprising a double-stranded ribonucleic acid.

Examples of the pharmaceutically accepted carrier include liquid or solid fillers, diluent, excipients, production aids, and solvent-encapsulating materials.

The pharmaceutical composition in an embodiment may be, for example, in the form of powder obtained by removing solvent through freeze-drying or the like, or in the form of liquid. A pharmaceutical composition of an embodiment is a powder composition containing a lipid complex of any of the above-described embodiments. The powder composition may be prepared by removing solvent from a composition in the form of liquid (dispersion), for example, through filtration or centrifugation, or prepared by freeze-drying the dispersion. In the case that the pharmaceutical composition is in the form of powder, the pharmaceutical composition can be suspended or dissolved in a pharmaceutically acceptable medium before use and used as an injection. A pharmaceutical composition of an embodiment is a liquid composition containing a lipid complex of any of the above-described embodiments and a pharmaceutically acceptable medium. In the case that the pharmaceutical composition is in the form of liquid, the pharmaceutical composition can be directly used as an injection, or suspended or dissolved in a pharmaceutically acceptable medium and used as an injection.

By administering to a subject in need thereof, the pharmaceutical composition of the present embodiment can inhibit expression of complement C5 in the subject through RNAi. Here, the "subject in need thereof" refers to a subject presenting with a disease or disorder associated with expression or activity of the C5 gene, or a subject determined to have a high risk of development thereof.

In some embodiments, the double-stranded ribonucleic acid that the pharmaceutical composition of the present embodiment comprises can suppress expression of complement C5, and hence the pharmaceutical composition of the present embodiment can be useful for treating paroxysmal nocturnal hemoglobinuria (PNH) and atypical hemolytic uremic syndrome (aHUS). Thus, in other embodiments, the invention is encompassed a method for treating paroxysmal nocturnal hemoglobinuria or atypical hemolytic uremic syndrome, the method including administering a therapeutically effective amount of a pharmaceutical composition of an embodiment to a subject.

The subject to administer a pharmaceutical composition of an embodiment is not limited, and, for example, the invention can be used to humans or non-human mammals (such as monkeys, mice, rats, rabbits, cows, horses, goats).

The method for administering a pharmaceutical composition of an embodiment to a subject (such as the route of administration, dose, frequency of administration per day, timing of administration) is not limited, and can be appropriately determined by one of ordinary skill in the art (e.g., physicians) in accordance with the health condition of a subject, the degree of a disease, the type of an agent to be used in combination.

(Administration Method)

The mode of administration of a pharmaceutical composition of an embodiment is not particularly limited, and may be parenteral administration, and examples thereof include intravenous administration, intramuscular administration, subcutaneous administration, intradermal administration, and intrathecal administration.

A pharmaceutical composition of an embodiment can be administered in an amount enough to inhibit complement C5 depending on the mode of administration. The dose of a pharmaceutical composition of an embodiment may be, for example, 0.01 mg to 100 mg, or 0.1 mg to 50 mg, or 0.3 mg to 10 mg, per kg body weight of a subject.

One of ordinary skill in the art understand that the present invention may be implemented with appropriate combination of any one or more of all the embodiments described herein, unless the combination causes any technical contradiction. In addition, one of ordinary skill in the art understand that it would be preferred to implement the present invention with appropriate combination of any of all the preferred or advantageous embodiments described herein, unless the combination causes any technical contradiction.

All of the contents disclosed in the literatures mentioned herein are incorporated by reference in their entirety, and one of ordinary skill in the art can cite and understand related contents disclosed in the literatures as a part of the present specification in accordance with the context of the present specification, without departing from the spirit and scope of the present invention.

The literatures cited herein are provided only for the purpose of disclosing related art before the filing date of the present application, and should not be interpreted as admission that the present inventors have no right of priority to the disclosures because of any prior invention or for any other reason. All of the descriptions in the literatures are based on information which was available for the applicant, and by no means constitute admission that the described contents are correct.

The terms used herein are for describing specific embodiments, and not intended to limit the invention.

The term "comprise" used herein is intended to indicate the presence of a mentioned matter (e.g., a member, a step, an element, or a number) unless the context apparently requires different understanding, and does not exclude the presence of another matter (e.g., a member, a step, an element, or a number). The term "consist of" encompasses embodiments described with the term(s) "consist of" and/or "consist essentially of".

Unless otherwise defined, all terms used herein (including technical terms and scientific terms) have the same meaning as commonly understood by one of ordinary skill in the art to which the present invention pertains. Each of the terms used herein should be interpreted to have a meaning consistent with that in the present specification and in the fields of related art unless otherwise specified, and should not be interpreted with respect to an idealized or excessively literal meaning.

While terms such as "first" and "second" are used to represent various elements, it is to be understood that such elements should not be limited by the terms themselves. The terms are used only to distinguish one element from another element, and, for example, it is acceptable without departing from the scope of the present invention to express a first element as "second element" and to express a second element as "first element", similarly.

Numerical values used herein to indicate component contents, numerical ranges, and so forth should be understood to be modified with the term "approximately", unless otherwise specified. For example, "4° C." is understood to refer to "approximately 4° C.", unless otherwise specified, and, needless to say, one of ordinary skill in the art can rationally understand the allowance in accordance with the common general knowledge and the context of the present specification. In this case, "approximately" is understood with applying the common round-off technique considering significant figures of each numerical value. Specifically, "approximately" is used to additionally include numerical values rounded to the nearest integer, wherein, for example, the range corresponding to "approximately 4" is from 3.5 to 4.4, and used to additionally include numerical values rounded to one decimal place, wherein, for example, the range corresponding to "approximately 4.5" is from 4.45 to 4.54. Cases of three or more decimal places are similarly understood.

Unless the context clearly indicates otherwise, embodiments with a singular form as used herein and in the claims are to be understood to allow the plural form, and vice versa, as long as no technical contradiction is caused.

Hereinafter, the present invention will be described in more detail with reference to Examples. However, the present invention can be realized in various embodiments, and should not be interpreted to be limited to Examples described below. One of ordinary skill in the art can implement the present invention with various modifications, additions, deletions, substitutions, and so forth, without changing the spirit or scope of the present invention.

EXAMPLES

Example 1: In-Vitro Screening for Single Administration (1)

(Preparation of Double-Stranded Nucleic Acids)

Sense strands and antisense strands listed in Table 2 were synthesized by using the phosphoramidite method, and then annealed to synthesize double-stranded nucleic acids (GeneDesign, Inc.). Abbreviations in the sequences are as shown in Table 1. Each double-stranded nucleic acid synthesized had a hydroxy group instead of a phosphate group at each 3'-terminal

TABLE 1

| Abbreviation | Nucleotide |
|---|---|
| A | Adenosine-3'-phosphate |
| U | Uridine-3'-phosphate |
| G | Guanosine-3'-phosphate |
| C | Cytidine-3'-phosphate |

TABLE 1-continued

| Abbreviation | Nucleotide |
|---|---|
| a | 2'-O-methyladenosine-3'-phosphate |
| u | 2'-O-methyluridine-3'-phosphate |
| g | 2'-O-methylguanosine-3'-phosphate |
| c | 2'-O-methylcytidine-3'-phosphate |
| dT | Deoxy-thymidine |
| (idT) | Inverted deoxy-thymidine (inverted dT) |
| ^ | Phosphorothioate bond |

No symbol indicates that nucleotides are linked together via a phosphodiester bond

TABLE 2

| Double strand ID | Numbers of nucleotides in sense strand/antisense strand | Sense strand Sequence (5'→3') | SEQ ID NO | Antisense strand Sequence (5'→3') | SEQ ID NO | Target site in NM_001735.2 |
|---|---|---|---|---|---|---|
| siRNA-001 | 21/21 | AGGcAAAGGuGuucAAAGAdT^dT | 1 | UCUUUGAAcACCUUUGCCUdT^dT | 2 | 2477-2495 |
| siRNA-002 | 21/21 | cuGucuuAAcuuucAuAGAdT^dT | 3 | UCuAUGAAAGUuAAGAcAGdT^dT | 4 | 506-524 |
| siRNA-003 | 21/21 | uAGcAuGuGccAGcuAcAAdT^dT | 5 | UUGuAGCUGGcAcAUGCuAdT^dT | 6 | 4238-4256 |
| siRNA-004 | 21/21 | cuGuGAuuGGAAuuAGAAdT^dT | 7 | UUUCuAAUUCCAAUGAcAGdT^dT | 8 | 3473-3491 |
| siRNA-006 | 21/21 | AAGGCAAAGGuGuucAAAGdT^dT | 9 | CUUUGAACACCUUUGCCUUdT^dT | 10 | 2476-2494 |
| siRNA-007 | 21/21 | GAAAGGAAcuGuuuAcAAcdT^dT | 11 | GUUGuAAACAGUUCCUUUCdT^dT | 12 | 2553-2571 |
| siRNA-008 | 21/21 | uGGuAuAuGuGuuGcuGAudT^dT | 13 | AUGAGCAAcAcAuAuAccAdT^dT | 14 | 2451-2469 |
| siRNA-009 | 21/21 | AcuGucuuAAcuuucAuAGdT^dT | 15 | CuAUGAAAGUuAAGAcAGUdT^dT | 16 | 505-523 |
| siRNA-010 | 21/21 | GuGccAGcuAcAAGcccAGdT^dT | 17 | CUGGGCUUGuAGCUGGcACHT^dT | 18 | 4244-4262 |
| siRNA-011 | 21/21 | AAGGAAcuGuuuAcAAcuAdT^dT | 19 | uAGUUGuAAACAGUUCCUUdT^dT | 20 | 2555-2573 |
| siRNA-012 | 21/21 | uccucuGGAAAuuGGccuudT^dT | 21 | AAGGCCAAUUUCcAGAGGAdT^dT | 22 | 2733-2751 |
| siRNA-013 | 21/21 | uuGAAAGGAAcuGuuuAcAdT^dT | 23 | UGuAAACAGUUCCUUUCAAdT^dT | 24 | 2551-2569 |
| siRNA-014 | 21/21 | AAAGGAAcuGuuuAcAAcudT^dT | 25 | AGUUGuAAACAGUUCCUUUdT^dT | 26 | 2554-2572 |
| siRNA-015 | 21/21 | AGGAAcuGuuuAcAAcuAudT^dT | 27 | AuAGUUGuAAACAGUUCCUdT^dT | 28 | 2556-2574 |
| siRNA-016 | 21/21 | uAcAcuGAAGcAuuuGAuGdT^dT | 29 | CAUCAAAUGCUUCAGUGuAdT^dT | 30 | 166-184 |
| siRNA-017 | 21/21 | CAcuGAAGcAuuuGAuGcAdT^dT | 31 | UGCAUCAAAUGCUUcAGUGdT^dT | 32 | 168-186 |
| siRNA-018 | 21/21 | cuGAAGcAuuuGAuGcAAcdT^dT | 33 | GUUGCAUCAAAUGCUUcAGdT^dT | 34 | 170-188 |
| siRNA-019 | 21/21 | uucuGcAAcuGAAuucGAudT^dT | 35 | AUCGAAUUCAGUUGGAGAAdT^dT | 36 | 4412-4430 |
| siRNA-020 | 21/21 | uGAAAGGAAcuGuuuAcAAdT^dT | 37 | UUGuAAACAGUUCCUUUcAdT^dT | 38 | 2552-2570 |
| siRNA-021 | 21/21 | AcuGAAGcAuuuGAuGcAAdT^dT | 39 | UUGCAUCAAAUGCUUCAGUdT^dT | 40 | 169-187 |
| siRNA-022 | 21/21 | cAuAcAGAcAAAccuGuuudT^dT | 41 | AAACAGGUUUGUCUGuAUGdT^dT | 42 | 415-433 |
| siRNA-023 | 21/21 | AAACAACAAGuAccuuuAudT^dT | 43 | AuAAAGGuACUUGUUGUUUdT^dT | 44 | 984-1002 |
| siRNA-024 | 21/21 | AuAcAGAcAAAccuGuuuAdT^dT | 45 | uAAAcAGGUUUGUCUGuAUdT^dT | 46 | 416-434 |
| siRNA-025 | 21/21 | GGuAuAuGuGuuGcuGAudT^dT | 47 | uAUcAGCAAcAcAuAuACCdT^dT | 48 | 2452-2470 |
| siRNA-026 | 21/21 | ucAGAAAGucuGuGAAGGAdT^dT | 49 | UCCUUcAcAGACUUUCUGAdT^dT | 50 | 4578-4596 |
| siRNA-027 | 21/21 | ucuccAGGccAAAcuGuGudT^dT | 51 | AcACAGUUUGGCCUGGAGAdT^dT | 52 | 1777-1795 |
| siRNA-028 | 21/21 | AcAAcAAGuAccuuuAuAudT^dT | 53 | AuAuAAAGGuACUUGUUGUdT^dT | 54 | 986-1004 |
| siRNA-029 | 21/21 | CAACAAGuAccuuuAuAuudT^dT | 55 | AAuAuAAAGGuACUUGUUGdT^dT | 56 | 987-1005 |
| siRNA-030 | 21/21 | AuucuccAGGccAAAcuGudT^dT | 57 | AcAGUUUGGCCUGGAGAAUdT^dT | 58 | 1775-1793 |
| siRNA-031 | 21/21 | GuGGcAAccAGcuccAGGudT^dT | 59 | ACCUGGAGCUGGUUGCCACdT^dT | 60 | 1730-1748 |
| siRNA-032 | 21/21 | AAGAGAcAucuGAcuuGGAdT^dT | 61 | UCCAAGUCAGAUGUCUCUUdT^dT | 62 | 1226-1244 |

TABLE 2-continued

| Double strand ID | Numbers of nucleotides in sense strand/anti-sense strand | Sense strand Sequence (5'→3') | SEQ ID NO | Antisense strand Sequence (5'→3') | SEQ ID NO | Target site in NM_001735.2 |
|---|---|---|---|---|---|---|
| siRNA-033 | 21/21 | AuucuGcAAcuGAAuucGAdT^dT | 63 | UCGAAUUCAGUUGCAGAAUdT^dT | 64 | 4411-4429 |
| SiRNA-034 | 21/21 | uuccucuGGAAAuuGGccudT^dT | 65 | AGGCCAAUUUCCAGAGGAAdT^dT | 66 | 2732-2750 |
| siRNA-035 | 21/21 | AACAAcAAGuAccuuuAuAdT^dT | 67 | uAuAAAGGuACUUGUUGUUdT^dT | 68 | 985-1003 |
| siRNA-036 | 21/21 | AAuAuGuccucucucccuAdT^dT | 69 | uAGGGAGAGAGGAcAuAUUdT^dT | 70 | 1067-1085 |
| siRNA-037 | 21/21 | AcucAcuAuAAuuAcuuGAdT^dT | 71 | UcAAGUAAUuAuAGUGAGUdT^dT | 72 | 1519-1537 |
| siRNA-038 | 21/21 | AuAAcucAcuAuAAuuAcudT^dT | 73 | AGUAAUuAuAGUGAGUuAUdT^dT | 74 | 1516-1534 |
| SiRNA-039 | 21/21 | AAAuAuGuccucucuccoudT^dT | 75 | AGGGAGAGAGGACAuAUUUdT^dT | 76 | 1066-1084 |
| SiRNA-040 | 21/21 | AAGAuAuuuuuAuAAuAAAdT^dT | 77 | UUuAUuAuAAAAAuAUCUUdT^dT | 78 | 876-894 |
| siRNA-042 | 21/21 | AAAAuAAcucAcuAuAAuudT^dT | 79 | AAUuAuAGUGAGUuAUUUUdT^dT | 80 | 1513-1531 |
| siRNA-043 | 21/21 | AAAuAAcucAcuAuAAuuAdT^dT | 81 | uAAUuAuAGUGAGUuAUUUdT^dT | 82 | 1514-1532 |
| siRNA-044 | 21/21 | GuGuuAAAAuGucuGcuGudT^dT | 83 | AcAGcAGAcAUUUuAAcACdT^dT | 84 | 2597-2615 |
| siRNA-045 | 21/21 | AAAAuGuuuuuGucAAGuAdT^dT | 85 | uACUUGACAAAAAcAUUUUdT^dT | 86 | 4742-4760 |
| Mock | 21/21 | cuuAcGcuGAGuAcuucGAdT^dT | 87 | UCGAAGuACUcAGCGuAAGdT^dT | 88 | — |

(In-Vitro Screening)

Each of the double-stranded nucleic acids listed in Table 2 in combination with the transfection reagent Lipofectamine RNAiMax (from Invitrogen, catalog number: 13778150) was diluted with an Opti-MEM medium (from Gibco, catalog number: 31985062) to prepare siRNA/RNAiMax mixed solution with a final concentration of 3 nM double-stranded nucleic acid and 0.3% RNAiMax. The siRNA/RNAiMax mixed solution was aliquoted into 20 μL portions in wells of a 96-well culture plate, and Hep3B cells (obtained from ATCC) as cell lines derived from human liver cancer were seeded in each well at 20000 cells/80 μL/well, and cultured under conditions of 37° C. and 5% $CO_2$ overnight. From the cultured cells, a template lysate for real-time PCR was prepared by using a CellAmp (registered trademark) Direct RNA Prep Kit for RT-PCR (Real Time) (from Takara Bio Inc., catalog number: 3732) and Proteinase K (from Takara Bio Inc., catalog number: 9034) in accordance with a protocol provided by Takara Bio Inc. Thereafter, cDNA was prepared by using a PrimeScript (registered trademark) RT Master Mix (Perfect Real Time) (from Takara Bio Inc., catalog number: RR036A) in accordance with a protocol provided by Takara Bio Inc. Further, Ct values were measured for the target gene human C5 and the endogenous control gene human GAPDH (glyceraldehyde-3-phosphate dehydrogenase) by using an EagleTaq Universal Master Mix (ROX) (from Roche Diagnostics K.K., catalog number: 07260296190) and a TaqMan probe (from Applied Biosystems, C5: Hs00156197_m1; GAPDH: Hs02758991_g1) with an ABI7900HT real-time PCR system (from Applied Biosystems) in accordance with a protocol provided by Applied Biosystems. The C5 mRNA expression level in the case that Hep3B cells were treated only with the transfection reagent without addition of siRNA was defined as 100%, and a C5 mRNA residual rate (relative value) was calculated for each introduction of siRNA by using a calibration curve method. As a negative control, Mock which does not cross over with any human gene was used.

The results are shown in Table 3.

TABLE 3

| Double strand ID | C5 mRNA residual rate (n = 3, average) (3 nM siRNA) |
|---|---|
| siRNA-001 | 18% |
| siRNA-002 | 43% |
| siRNA-003 | 107% |
| siRNA-004 | 35% |
| siRNA-006 | 37% |
| siRNA-007 | 28% |
| siRNA-008 | 18% |
| siRNA-009 | 89% |
| siRNA-010 | 107% |
| siRNA-011 | 107% |
| siRNA-012 | 37% |
| siRNA-013 | 53% |
| siRNA-014 | 64% |
| siRNA-015 | 125% |
| siRNA-016 | 35% |
| siRNA-017 | 26% |
| siRNA-018 | 48% |
| siRNA-019 | 27% |
| siRNA-020 | 42% |
| siRNA-021 | 74% |
| siRNA-022 | 39% |
| siRNA-023 | 101% |
| siRNA-024 | 41% |
| siRNA-025 | 125% |
| siRNA-026 | 41% |
| siRNA-027 | 143% |
| siRNA-028 | 61% |
| siRNA-029 | 40% |
| siRNA-030 | 151% |
| siRNA-031 | 96% |

TABLE 3-continued

| Double strand ID | C5 mRNA residual rate (n = 3, average) (3 nM siRNA) |
|---|---|
| siRNA-032 | 73% |
| siRNA-033 | 70% |
| siRNA-034 | 121% |
| siRNA-035 | 54% |
| siRNA-036 | 119% |
| siRNA-037 | 119% |
| siRNA-038 | 47% |
| siRNA-039 | 100% |
| siRNA-040 | 111% |
| siRNA-042 | 112% |
| siRNA-043 | 53% |
| siRNA-044 | 87% |
| siRNA-045 | 115% |
| Mock | 116% |
| Lipofection only | 100% |

Example 2: In-Vitro Screening for Single Administration (2)

(Preparation of Double-Stranded Nucleic Acids)

Sense strands and antisense strands listed in Table 4 were synthesized by using the phosphoramidite method, and then annealed to synthesize double-stranded nucleic acids (GeneDesign, Inc.).

TABLE 4

| Double strand ID | Numbers of nucleotides in sense strand/ antisense strand | Sense strand Sequence (5'→3') | SEQ ID NO | Antisense strand Sequence (5'→3') | SEQ ID NO |
|---|---|---|---|---|---|
| siRNA-001 | 21/21 | AGGcAAAGGuGuucAAAGAdT^dT | 89 | UCUUUGAAcACCUUUGCCUdT^dT | 90 |
| siRNA-001-02 | 19/19 | AGGcAAAGGuGuucAAAGA | 91 | UCUUUGAAcACCUUUGCCU | 92 |
| SiRNA-001-08 | 21/21 | A^GGcAAAGGuGuucAAAGAuu | 93 | U^CUUUGAAcACCUUUGCCUuu | 94 |
| SiRNA-001-09 | 21/21 | A^G^GcAAAGGuGuucAAAGAuu | 95 | U^C^UUUGAAcACCUUUGCCUuu | 96 |
| SiRNA-001-10 | 21/21 | A^GGcAAAGGuGuucAAAGA^u^u | 97 | U^CUUUGAAcACCUUUGCCU^u^u | 98 |
| SiRNA-001-11 | 19/21 | AGGcAAAGGuGuucAAAGA | 99 | UCUUUGAAcACCUUUGCCUuu | 100 |
| SiRNA-001-12 | 21/21 | AuAGGcAAAGGuGuucAAAGA | 101 | UCUUUGAAcACCUUUGCCUuu | 102 |
| SiRNA-001-13 | 22/21 | uAuAGGcAAAGGuGuucAAAGA | 103 | UCUUUGAAcACCUUUGCCUuu | 104 |
| siRNA-006 | 21/21 | AAGGcAAAGGuGuucAAAGdT^dT | 105 | CUUUGAAcACCUUUGCCUUdT^dT | 106 |
| SiRNA-006-02 | 19/19 | AAGGcAAAGGuGuucAAAG | 107 | CUUUGAAcACCUUUGCCUU | 108 |
| siRNA-007 | 21/21 | GAAAGGAcuGuuuAcAAcdT^dT | 109 | GUUGuAAAcAGUUCCUUUCdT^dT | 110 |
| SiRNA-007-02 | 19/19 | GAAAGGAcuGuuuAcAAc | 111 | GUUGuAAAcAGUUCCUUUC | 112 |
| siRNA-008 | 21/21 | uGGuAuAuGuGuuGcuGAudT^dT | 113 | AUcAGcAAcAcAuAuAccAdT^dT | 114 |
| SiRNA-008-02 | 19/19 | uGGuAuAuGuGuuGcuGAu | 115 | AUcAGcAAcAcAuAuACcA | 116 |
| SiRNA-008-08 | 21/21 | u^GGuAuAuGuGuuGcuGAuuu | 117 | A^UcAGcAAcAcAuAuAccAuu | 118 |
| SiRNA-008-09 | 21/21 | u^G^GuAuAuGuGuuGcuGAuuu | 119 | A^U^cAGcAAcAcAuAuACcAuu | 120 |
| SiRNA-008-10 | 21/21 | u^GGuAuAuGuGuuGcuGAu^u^u | 121 | A^UcAGcAAcAcAuAuAccA^u^u | 122 |
| SiRNA-008-11 | 19/21 | uGGuAuAuGuGuuGcuGAu | 123 | AUcAGcAAcAcAuAuAccAuu | 124 |
| SiRNA-008-12 | 21/21 | AuuGGuAuAuGuGuuGcuGAu | 125 | AUcAGcAAcAcAuAuACcAuu | 126 |
| SiRNA-008-13 | 22/21 | uAuuGGuAuAuGuGuuGcuGAu | 127 | AUcAGcAAcAcAuAuAccAuu | 128 |
| SiRNA-008-14 | 23/21 | uAuuGGuAuAuGuGuuGcuGAu(idT) | 129 | AUcAGcAAcAcAuAuAccAuu | 130 |
| siRNA-008-22 | 21/21 | uGGuAuAuGuGuuGCuGAuuu | 131 | AUcAGcAAcAcAuAuACcAuu | 132 |
| SiRNA-008-23 | 21/21 | uGGuAuAuGuGuuGcUGAuuu | 133 | AUcAGcAAcAcAuAuACcAuu | 134 |
| siRNA-008-29 | 20/20 | AuuGGuAuAuGuGuuGcuGA | 135 | UcAGcAAcAcAuAuAccAuu | 136 |
| siRNA-008-30 | 20/20 | AuGGuAuAuGuGuuGcuGAu | 137 | AUcAGcAAcAcAuAuAccuu | 138 |

TABLE 4-continued

| Double strand ID | Numbers of nucleotides in sense strand/ antisense strand | Sense strand Sequence (5'→3') | SEQ ID NO | Antisense strand Sequence (5'→3') | SEQ ID NO |
|---|---|---|---|---|---|
| SiRNA-008-31 | 19/23 | uGGuAuAuGuGuuGcuGAu | 139 | AUcAGcAAcAcAuAuACcAuuuu | 140 |
| SiRNA-008-32 | 19/23 | uGGuAuAuGuGuuGCuGAu | 141 | AUcAGcAAcAcAuAuACcAuuuu | 142 |
| SiRNA-008-33 | 19/23 | uGGuAuAuGuGuuGCuGAu | 143 | AUcAGcAAcAcAuAuACcAuuaa | 144 |
| siRNA-008-34 | 19/23 | uGGuAuAuGuGuuGCuGAu | 145 | AUcAGcAAcAcAuAuACcAuu^a^a | 146 |
| SiRNA-008-35 | 19/23 | uGGuAuAuGuGuuGCuGAu | 147 | AUcAGcAAcAcAuAuACcA^u^uaa | 148 |
| siRNA-008-36 | 19/23 | uGGuAuAuGuGuuGCuGAu | 149 | a^UcAGcAAcAcAuAuACcA^u^uaa | 150 |
| SiRNA-008-37 | 19/23 | uGGuAuAuGuGuuGCuGAu | 151 | aUcAGcAAcAcAuAuACcAuuuu | 152 |
| siRNA-008-38 | 19/23 | u?GGuAuAuGuGuuGCuGAu | 153 | AUcAGcAAcAcAuAuACcA^u^uaa | 154 |
| siRNA-038 | 21/21 | AuAAcucAcuAuAAuuAcudT^dT | 155 | AGuAAUuAuAGUGAGUuAUdT^dT | 156 |
| siRNA-038-02 | 19/19 | AuAAcucAcuAuAAuuAcu | 157 | AGuAAUuAuAGUGAGUuAU | 158 |
| Mock | 21/21 | cuuAcGouGAGuAcuucGAdT^dT | 87 | UCGAAGuACUcAGCGuAAGdT^dT | 88 |

(In-Vitro Screening)

A test was performed to measure Ct values for the target gene human C5 and the endogenous control gene human GAPDH in cultured Hep3B cells in the same manner as in Example 1, except that siRNA/RNAiMax mixed solution was prepared with a final concentration of 1 nM double-stranded nucleic acid and 0.3% RNAiMax. As in Example 1, the C5 mRNA expression level in the case of Lipofection only was defined as 100%, and a C5 mRNA residual rate (relative value) was calculated for each introduction of siRNA.

The results are shown in Table 5. Lowered C5 mRNA residual rates were found for all of the double-stranded nucleic acids except siRNA-008-29, demonstrating that expression of C5 was suppressed.

TABLE 5

| Double strand ID | C5 mRNA residual rate (n = 3, average) (1 nM siRNA) |
|---|---|
| siRNA-001 | 36% |
| siRNA-001-02 | 44% |
| siRNA-001-08 | 42% |
| siRNA-001-09 | 42% |
| siRNA-001-10 | 44% |
| siRNA-001-11 | 45% |
| siRNA-001-12 | 39% |
| siRNA-001-13 | 45% |
| siRNA-006 | 43% |
| siRNA-006-02 | 40% |
| siRNA-007 | 44% |
| siRNA-007-02 | 50% |
| siRNA-008 | 34% |
| siRNA-008-02 | 37% |
| siRNA-008-08 | 37% |
| siRNA-008-09 | 41% |
| siRNA-008-10 | 45% |
| siRNA-008-11 | 38% |
| siRNA-008-12 | 39% |
| siRNA-008-13 | 46% |
| siRNA-008-14 | 42% |
| siRNA-008-22 | 37% |

TABLE 5-continued

| Double strand ID | C5 mRNA residual rate (n = 3, average) (1 nM siRNA) |
|---|---|
| siRNA-008-23 | 36% |
| siRNA-008-29 | 119% |
| siRNA-008-30 | 33% |
| siRNA-008-31 | 36% |
| siRNA-008-32 | 39% |
| siRNA-008-33 | 36% |
| siRNA-008-34 | 32% |
| siRNA-008-35 | 33% |
| siRNA-008-36 | 37% |
| siRNA-008-37 | 34% |
| siRNA-008-38 | 38% |
| siRNA-038 | 43% |
| siRNA-038-02 | 54% |
| Mock | 90% |
| Lipofection only | 100% |

Example 3: In-Vivo Screening (Sequence Finding)

(Preparation of siRNA-LNPs)

Each siRNA listed in Table 6 was dissolved in 10 mM sodium citrate (pH 4.0) to prepare diluted siRNA solution. Lipid solution was prepared by dissolving 2-{9-oxo-9-[(3-pentyloctyl)oxy]nonyl}dodecyl 1-methylpiperidine-4-carboxylate, DSPC (NIPPON FINE CHEMICAL CO., LTD.), Cholesterol (NIPPON FINE CHEMICAL CO., LTD.), and MPEG2000-DMG (NOF CORPORATION) at a mole ratio of 60/10.5/28/1.5 in ethanol. Lipid Nanoparticles (LNPs) were obtained by mixing the diluted siRNA solution and the lipid solution at flow rates of 3 mL/min and 1 mL/min, respectively, with an siRNA/lipid weight ratio of 0.1. The external solution of the resulting LNP aqueous solution was substituted with PBS (pH 7.4) through dialysis by using a Float-A-Lyzer G2 (SPECTRUM, 100K MWCO). After the dialysis, the resultant was subjected to concentration and filtration sterilization for use in experiments. The siRNA concentration and encapsulation efficiency were measured by using a Quant-iT RiboGreen RNA Reagent (Invitrogen, Cat #R11491). For calculation of the encapsulation efficiency, the siRNA concentration measured after dilution with RNase Free Water was assumed as the concentration of siRNA present in the LNP external solution, and the siRNA concentration measured after dilution with 1% Triton X-100 was assumed as the total siRNA concentration of the formulation. The average particle size (Z-average) was measured by using a particle size analyzer (Malvern Panalytical Ltd., Zetasizer Nano ZS). Results of evaluation of product quality for the prepared LNPs are shown in Table 7.

TABLE 8

| Double strand ID | Liver C5 mRNA residual rate 5 days after administration (n = 3, Average) | Liver C5 mRNA residual rate 14 days after administration (n = 3, Average) |
| --- | --- | --- |
| PBS | 100% | Not tested |
| Mock | 75% | 105% |
| siRNA-001-01 | 51% | 104% |
| siRNA-007-01 | 69% | 92% |
| siRNA-008-01 | 21% | 62% |

TABLE 6

| Double strand ID | Numbers of nucleotides in sense strand/ antisense strand | Sense strand Sequence (5'→3') | SEQ ID NO | Antisense strand Sequence (5'→3') | SEQ ID NO |
| --- | --- | --- | --- | --- | --- |
| Mock | 21/21 | cuuAcGcuGAGuAcuucGAdT^dT | 87 | UCGAAGuACUcAGCGuAAGdT^dT | 88 |
| SiRNA-001-01 | 21/21 | AGGcAAAGGuGuucAAAGAuu | 161 | UCUUUGAAcACCUUUGCCUuu | 162 |
| SiRNA-007-01 | 21/21 | GAAAGGAAcuGuuuAcAAcuu | 163 | GUUGUAAAcAGUUCCUUUCuu | 164 |
| SiRNA-008-01 | 21/21 | uGGuAuAuGuGuuGcuGAuuu | 159 | AUcAGcAAcAcAuAuACcAuu | 160 |

TABLE 7

| Double strand ID | Encapsulation efficiency | Average particle size (nm) | Polydispersity index |
| --- | --- | --- | --- |
| Mock | >90% | 92 | 0.06 |
| siRNA-001-01 | >90% | 90 | 0.08 |
| siRNA-007-01 | >90% | 87 | 0.06 |
| siRNA-008-01 | >90% | 88 | 0.1 |

(In-Vivo Screening)

LNPs encapsulating PBS or siRNA listed in Table 6 therein were intravenously administered to a BALB/c mouse (male, 6 weeks old, n=3 per group) from the tail vein at a dose of 0.1 mg/kg siRNA, and the blood and liver were sampled under anesthesia 5 days and 14 days after the administration. From the liver frozen with liquid nitrogen, Total RNA was purified by using an RNeasy Plus Mini Kit (Qiagen, Cat #74106) in accordance with a protocol provided by the manufacturer. Thereafter, cDNA was prepared by using a PrimeScript RT Master Mix (Perfect Real Time) (Takara Bio Inc., Cat #RR036A) in accordance with a protocol provided by the manufacturer. Further, Ct values were measured for the target gene mouse C5 and the endogenous control gene mouse GAPDH by using a TaqMan (registered trademark) Gene Expression Master Mix (Applied Biosystem, Cat #4369510) and a TaqMan probe (Applied Biosystems, C5: Mm01336776_g1; GAPDH: Mm99999915_g1) with an ABI7500 Fast (Applied Biosystems) in accordance with a protocol provided by the manufacturer. The liver C5 mRNA residual rate 5 days after the administration for the PBS administration group was defined as 100%, and a liver C5 mRNA residual rate (relative value) was calculated for each siRNA administration group by using the comparative Ct method. The results are shown in Table 8.

The blood sampled on each sampling day was centrifuged at 3000 rpm for 15 minutes, and then the heparin plasma as the supernatant was collected and stored at −80° C. Thereafter, the plasma Mouse C5 was quantified by ELISA. Specifically, the mouse anti-05 antibody BB5.1 (Hycult Biotech, Cat #HM1073-FS) as an immobilized antibody was diluted with PBS(−) (Wako Pure Chemical Industries, Ltd., #045-29795) to a final concentration of 2 μg/mL and added to an assay plate (Nunc, Cat #442404), and incubated at 4° C. overnight. Thereafter, blocking solution (PBS(−) (Wako Pure Chemical Industries, Ltd.) containing 1% BSA (R&D systems, Inc., Cat #DY995)) was added, and the resultant was incubated at room temperature for 1 hour. The blocking solution was discarded, and washing was performed three times with washing solution (PBS(−) (Wako Pure Chemical Industries, Ltd.) containing 0.02% Tween20). The washing solution was discarded, and the heparin plasma sample diluted with blocking solution was then added, and the resultant was incubated at room temperature for 5 hours. The plasma of the PBS administration group was used as a standard sample. The sample was discarded, and washing was then performed five times with washing solution, and a goat anti-human C5 antibody (Quidel Corporation, Cat #A306) diluted 4000-fold with blocking solution was added, and the resultant was incubated at room temperature for 1 hour. The antibody was discarded, and washing was then performed five times with washing solution, and an HRP-labeled donkey anti-goat IgG (H+L) (Jackson ImmunoResearch Inc., Cat #805-035-180) diluted 40000-fold with blocking solution was added, and the resultant was incubated at room temperature for 1 hour. The antibody was discarded, and washing was then performed five times with washing solution. Thereafter, equal amounts of TMB (3,3′, 5,5′-tetramethylbenzidine) Peroxidase Substrate (Kirkegaard & Perry Laboratories, Inc., Cat #50-76-01) and Peroxidase Substrate Solution B (Kirkegaard & Perry Laboratories, Inc., Cat #50-65-00) were mixed together as detection reagent, which was added and allowed to develop color. $H_2SO_4$ (Wako Pure Chemical Industries, Ltd., Cat #198-09595) was added as quenching solution, and absorbance was then measured at 450 nm and 650 nm. Relative values for the samples as the plasma C5 concentration 5 days after the administration for the PBS administration group was defined as 100% are shown in Table 9.

TABLE 9

| Double strand ID | Blood C5 protein residual rate 5 days after administration (n = 3, Average) | Blood C5 protein residual rate 14 days after administration (n = 3, Average) |
|---|---|---|
| PBS | 100% | Not tested |
| Mock | 94% | 96% |
| siRNA-001-01 | 44% | 87% |
| siRNA-007-01 | 79% | 103% |
| siRNA-008-01 | 22% | 48% |

Example 4: In-Vitro Screening

Sense strands and antisense strands listed in Table 10 were synthesized by using the phosphoramidite method, and then annealed to synthesize double-stranded nucleic acids (GeneDesign, Inc.). A test was performed to measure Ct values for the target gene human C5 and the endogenous control gene human GAPDH in cultured Hep3B cells in the same manner as in Example 1, except that siRNA/RNAiMax mixed solution was prepared with a final concentration of 0.003 to 10 nM double-stranded nucleic acid and 0.3% RNAiMax. As in Example 1, the C5 mRNA expression level in the case of Lipofection only was defined as 100%, and a C5 mRNA residual rate (relative value) was calculated for each introduction of siRNA. The results are shown in Table 11.

TABLE 11

| siRNA (nM) | Double strand ID | C5 mRNA residual rate (n = 3, average) |
|---|---|---|
| 10 | siRNA-008-01 | 17% |
| 3 | siRNA-008-01 | 20% |
| 1 | siRNA-008-01 | 22% |
| 0.3 | siRNA-008-01 | 26% |
| 0.1 | siRNA-008-01 | 34% |
| 0.03 | siRNA-008-01 | 60% |
| 0.01 | siRNA-008-01 | 66% |
| 0.003 | siRNA-008-01 | 85% |
| 10 | siRNA-008-31 | 16% |
| 3 | siRNA-008-31 | 22% |
| 1 | siRNA-008-31 | 26% |
| 0.3 | siRNA-008-31 | 35% |
| 0.1 | siRNA-008-31 | 49% |
| 0.03 | siRNA-008-31 | 79% |
| 0.01 | siRNA-008-31 | 96% |
| 0.003 | siRNA-008-31 | 83% |
| 10 | siRNA-008-33 | 15% |
| 3 | siRNA-008-33 | 27% |
| 1 | siRNA-008-33 | 37% |
| 0.3 | siRNA-008-33 | 53% |
| 0.1 | siRNA-008-33 | 70% |
| 0.03 | siRNA-008-33 | 96% |
| 0.01 | siRNA-008-33 | 103% |
| 0.003 | siRNA-008-33 | 112% |
| 10 | siRNA-008-34 | 16% |
| 3 | siRNA-008-34 | 28% |
| 1 | siRNA-008-34 | 34% |
| 0.3 | siRNA-008-34 | 38% |
| 0.1 | siRNA-008-34 | 44% |
| 0.03 | siRNA-008-34 | 68% |
| 0.01 | siRNA-008-34 | 76% |
| 0.003 | siRNA-008-34 | 91% |
| 10 | siRNA-008-35 | 15% |
| 3 | siRNA-008-35 | 23% |
| 1 | siRNA-008-35 | 30% |
| 0.3 | siRNA-008-35 | 42% |
| 0.1 | siRNA-008-35 | 59% |
| 0.03 | siRNA-008-35 | 87% |
| 0.01 | siRNA-008-35 | 92% |
| 0.003 | siRNA-008-35 | 98% |
| 10 | Mock | 116% |
| — | Lipofection only | 100% |

TABLE 10

| Double strand ID | Numbers of nucleotides in sense strand/ antisense strand | Sense strand Sequence (5′→3′) | SEQ ID NO | Antisense strand Sequence (5′→3′) | SEQ ID NO |
|---|---|---|---|---|---|
| siRNA-008-01 | 21/21 | uGGuAuAuGuGuuGcuGAuuu | 159 | AUcAGcAAcAcAuAuACcAuu | 160 |
| siRNA-008-31 | 19/23 | uGGuAuAuGuGuuGcuGAu | 139 | AUcAGcAAcAcAuAuACcAuuuu | 140 |
| siRNA-008-33 | 19/23 | uGGuAuAuGuGuuGcuGAu | 143 | AUcAGcAAcAcAuAuACcAuuaa | 144 |
| siRNA-008-34 | 19/23 | uGGuAuAuGuGuuGcuGAu | 145 | AUcAGcAAcAcAuAuACcAuu^a^a | 146 |
| siRNA-008-35 | 19/23 | uGGuAuAuGuGuuGcuGAu | 147 | AUcAGcAAcAcAuAuACcA^u^uaa | 148 |
| Mock | 21/21 | cuuAcGcuGAGuAcuucGAdT^dT | 87 | UCGAAGuACUcAGCGuAAGdT^dT | 88 |

Example 5: In-Vivo Screening (Overhang Modification)

(Preparation of siRNA-LNPs)

Lipid nanoparticles (LNPs) encapsulating siRNA therein were prepared in the same manner as in Example 3, except that siRNAs listed in Table 12 were used. Results of evaluation of product quality for the prepared LNPs are shown in Table 13.

| Double strand ID | Numbers of nucleotides in sense strand/ antisense strand | Sense strand Sequence (5'→3') | SEQ ID NO | Antisense strand Sequence (5'→3') | SEQ ID NO |
|---|---|---|---|---|---|
| Mock | 21/21 | cuuAcGcuGAGuAcuucGAdT^dT | 87 | UCGAAGuACUcAGCGuAAGdT^dT | 88 |
| siRNA-008 | 21/21 | uGGuAuAuGuGuuGcuGAudT^dT | 13 | AUcAGcAAcAcAuAuACcAdT^dT | 14 |
| siRNA-008-32 | 19/23 | uGGuAuAuGuGuuGCuGAu | 141 | AUcAGcAAcAcAuAuACcAuuuu | 142 |
| SiRNA-008-33 | 19/23 | uGGuAuAuGuGuuGCuGAu | 143 | AUcAGcAAcAcAuAuACcAuuaa | 144 |
| siRNA-008-34 | 19/23 | uGGuAuAuGuGuuGCuGAu | 145 | AUcAGcAAcAcAuAuACcAuu^a^a | 146 |
| siRNA-008-35 | 19/23 | uGGuAuAuGuGuuGCuGAu | 147 | AUcAGcAAcAcAuAuACcA^u^uaa | 148 |
| SiRNA-008-38 | 19/23 | u^GGuAuAuGuGuuGCuGAu | 153 | AUcAGcAAcAcAuAuACcA^u^uaa | 154 |

TABLE 13

| Double strand ID | Encapsulation efficiency | Average particle size (nm) | Polydispersity index |
|---|---|---|---|
| Mock | >90% | 76 | 0.11 |
| siRNA-008 | >90% | 68 | 0.01 |
| siRNA-008-32 | >90% | 68 | 0.03 |
| siRNA-008-33 | >90% | 69 | 0.05 |
| siRNA-008-34 | >90% | 70 | 0.06 |
| siRNA-008-35 | >90% | 71 | 0.02 |
| siRNA-008-38 | >90% | 70 | 0.01 |

(In-Vivo Screening)

LNPs encapsulating PBS or siRNA listed in Table 12 therein were intravenously administered to a BALB/c mouse (male, 6 weeks old, n=3 per group) from the tail vein at a dose of 0.3 mg/kg siRNA, and the blood and liver were sampled under anesthesia 5 days, 14 days, and 21 days after the administration. From the liver frozen with liquid nitrogen, Total RNA was purified by using an RNeasy Plus Mini Kit (Qiagen, Cat #74106) in accordance with a protocol provided by the manufacturer. Thereafter, cDNA was prepared by using a PrimeScript RT Master Mix (Perfect Real Time) (Takara Bio Inc., Cat #RR036A) in accordance with a protocol provided by the manufacturer. Further, Ct values were measured for the target gene mouse C5 and the endogenous control gene mouse GAPDH by using a TaqMan (registered trademark) Gene Expression Master Mix (Applied Biosystem, Cat #4369510) and a TaqMan probe (Applied Biosystems, C5: Mm01336776_g1; GAPDH: Mm99999915_g1) with an ABI7500 Fast (Applied Biosystems) in accordance with a protocol provided by the manufacturer. The liver C5 mRNA residual rate on each day of measurement for the PBS administration group was defined as 100%, and liver C5 mRNA residual rates (relative values) were calculated for each siRNA administration group by using the comparative Ct method. The results are shown in Table 14.

TABLE 14

| | Liver C5 mRNA residual rate (n = 3, average) | | |
|---|---|---|---|
| Double strand ID | 5 days after administration | 14 days after administration | 21 days after administration |
| PBS | 100% | 100% | 100% |
| Mock | 90% | 119% | 82% |
| siRNA-008 | 22% | 35% | 60% |
| siRNA-008-32 | 22% | 23% | 46% |
| siRNA-008-33 | 17% | 37% | 47% |
| siRNA-008-34 | 16% | 26% | 35% |
| siRNA-008-35 | 12% | 20% | 47% |
| siRNA-008-38 | 14% | 24% | 40% |

The blood sampled on each sampling day was centrifuged at 3000 rpm for 15 minutes, and then the heparin plasma as the supernatant was collected and stored at ~80° C. Thereafter, the plasma Mouse C5 was quantified by ELISA. Specifically, the mouse anti-05 antibody BB5.1 (Hycult Biotech, Cat #HM1073-FS) as an immobilized antibody was diluted with PBS(-) (Wako Pure Chemical Industries, Ltd., #045-29795) to a final concentration of 2 µg/mL and added to an assay plate (Nunc, Cat #442404), and incubated at 4° C. overnight. Thereafter, blocking solution (PBS(-) (Wako Pure Chemical Industries, Ltd.) containing 1% BSA (R&D systems, Inc., Cat #DY995)) was added, and the resultant was incubated at room temperature for 1 hour. The blocking solution was discarded, and washing was performed three times with washing solution (PBS(-) (Wako Pure Chemical Industries, Ltd.) containing 0.02% Tween20). The washing solution was discarded, and the heparin plasma sample diluted with blocking solution was then added, and the resultant was incubated at room temperature for 5 hours. The plasma of the PBS administration group was used as a standard sample. The sample was discarded, and washing was then performed five times with washing solution, and a goat anti-human C5 antibody (Quidel Corporation, Cat

A306) diluted 4000-fold with blocking solution was added, and the resultant was incubated at room temperature for 1 hour. The antibody was discarded, and washing was then performed five times with washing solution, and an HRP-labeled donkey anti-goat IgG (H+L) (Jackson ImmunoResearch Inc., Cat #805-035-180) diluted 40000-fold with blocking solution was added, and the resultant was incubated at room temperature for 1 hour. The antibody was discarded, and washing was then performed five times with washing solution. Thereafter, equal amounts of TMB (3,3', 5,5'-tetramethylbenzidine) Peroxidase Substrate (Kirkegaard & Perry Laboratories, Inc., Cat #50-76-01) and Peroxidase Substrate Solution B (Kirkegaard & Perry Laboratories, Inc., Cat #50-65-00) were mixed together as detection reagent, which was added and allowed to develop color. $H_2SO_4$ (Wako Pure Chemical Industries, Ltd., Cat #198-09595) was added as quenching solution, and absorbance was then measured at 450 nm and 650 nm. Relative values for the samples as the plasma C5 concentration on the day before the administration for the PBS administration group was defined as 100%, are shown in Table 15.

TABLE 15

| Double strand ID | Plasma C5 residual rate (n = 3, average) | | |
| --- | --- | --- | --- |
| | 5 days after administration | 14 days after administration | 21 days after administration |
| PBS | 98% | 97% | 101% |
| Mock | 106% | 104% | 108% |
| siRNA-008 | 8% | 21% | 47% |
| siRNA-008-32 | 9% | 15% | 42% |
| siRNA-008-33 | 7% | 29% | 50% |
| siRNA-008-34 | 4% | 11% | 29% |
| siRNA-008-35 | 7% | 19% | 49% |
| siRNA-008-38 | 5% | 17% | 42% |

Figure 2:
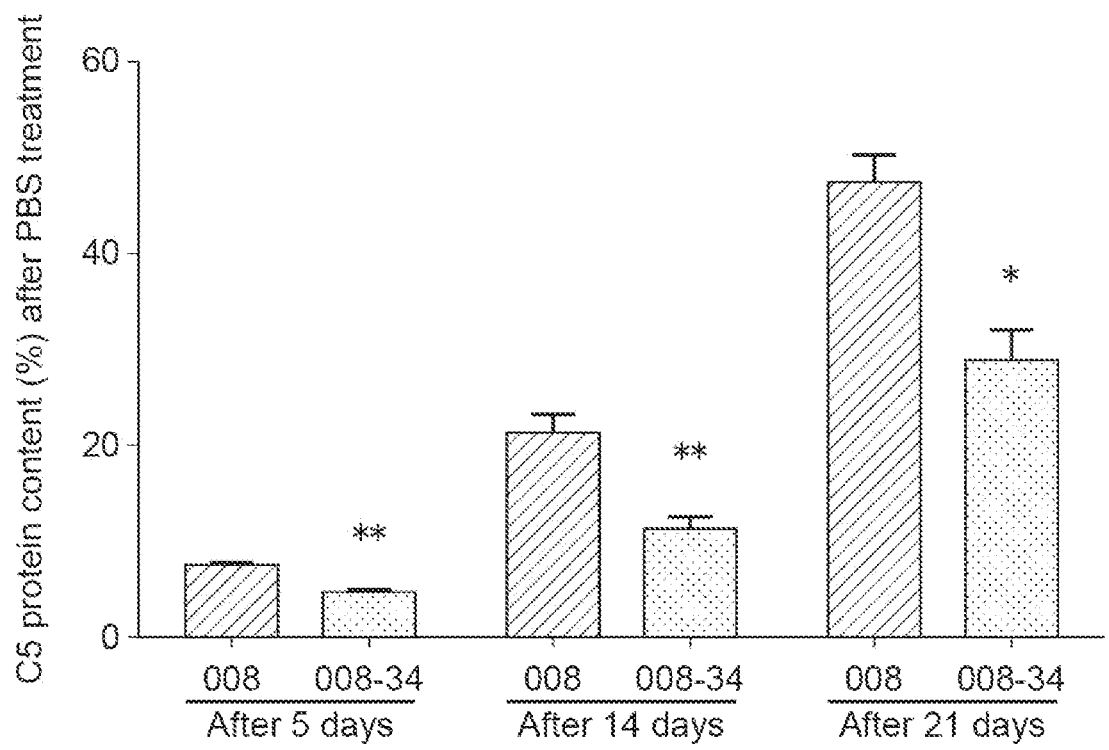
FIG. 2 shows graphs representing results of plasma C5 residual rates after administration of siRNA-008 and plasma C5 residual rates after administration of siRNA-008-34 in Example 5.

Liver C5 mRNA residual rates and plasma C5 concentrations 5 days, 14 days, and 21 days after the administration were quantified, and subjected to statistical analysis (unpaired T-test) for the siRNA-008-34 administration group to the siRNA-008 administration group. The results are shown in FIG. 1 and FIG. 2. Groups with a P value of 0.05 or lower were provided with * (asterisk), and groups with a P value of 0.01 or lower were provided with **.

Example 6: In-Vitro Analysis (Sequence Walk)

Sense strands and antisense strands listed in Table 16 were synthesized by using the phosphoramidite method, and then annealed to synthesize double-stranded nucleic acids (GeneDesign, Inc.). As in Example 1, the C5 mRNA expression level in the case of Lipofection only was defined as 100%, and a C5 mRNA residual rate (relative value) was calculated for each introduction of siRNA. The results are shown in Table 17.

TABLE 16

| Double strand ID | Numbers of nucleotides in sense strand/ antisense strand | Sense strand Sequence (5'→3') | SEQ ID NO | Antisense strand Sequence (5'→3') | SEQ ID NO | Target site in NM_001735.2 |
| --- | --- | --- | --- | --- | --- | --- |
| Seq2449 | 21/21 | AcuGGuAuAuGuGuuGcuGdT^dT | 165 | cAGcAAcAcAuAuAccAGUdT^dT | 166 | 2449-2467 |
| Seq2450 | 21/21 | cuGGuAuAuGuGuuGcuGAdT^dT | 167 | UcAGcAAcAcAuAuAccAGdT^dT | 168 | 2450-2468 |
| Seq2451 (= siRNA-008) | 21/21 | uGGuAuAuGuGuuGcuGAudT^dT | 13 | AUcAGcAAcAcAuAuAccAdT^dT | 14 | 2451-2469 |
| Seq2452 | 21/21 | GGuAuAuGuGuuGcuGAuAdT^dT | 169 | uAUcAGcAAcAcAuAuACCdT^dT | 170 | 2452-2470 |
| Seq2453 | 21/21 | GuAuAuGuGuuGcuGAuAcdT^dT | 171 | GuAUcAGcAAcAcAuAuACdT^dT | 172 | 2453-2471 |
| Mock | 21/21 | cuuAcGcuGAGuAcuucGAdT^dT | 87 | UCGAAGuACUcAGCGuAAGdT^dT | 88 | |

TABLE 17

| siRNA (nM) | Double strand ID | C5 mRNA residual rate (n = 3, average) |
| --- | --- | --- |
| 10 nM | Seq2449 | 107% |
| | Seq2450 | 105% |
| | Seq2451 (=siRNA-008) | 12% |
| | Seq2452 | 111% |
| | Seq2453 | 20% |
| 1 nM | Seq2449 | 110% |
| | Seq2450 | 97% |
| | Seq2451 (=siRNA-008) | 14% |
| | Seq2452 | 107% |
| | Seq2453 | 24% |
| 10 nM | Mock | 96% |
| — | Lipofection only | 100% |

Example 7: Pharmacological Test (Hemolysis-Suppressing Effect)

(Preparation of siRNA-LNPs)

Lipid nanoparticles (LNPs) encapsulating siRNA therein were prepared in the same manner as in Example 3, except that siRNAs listed in Table 18 were used. Results of evaluation of product quality for the prepared LNPs are shown in Table 19.

TABLE 18

| Double strand ID | Numbers of nucleotides in sense strand/ antisense strand | Sense strand Sequence (5'→3') | SEQ ID NO | Antisense strand Sequence (5'→3') | SEQ ID NO |
|---|---|---|---|---|---|
| Mock | 21/21 | cuuAcGcuGAGuAcuucGAdT^dT | 89 | UCGAAGuACUcAGCGuAAGdT^dT | 90 |
| siRNA-008-34 | 19/23 | uGGuAuAuGuGuuGCuGAu | 145 | AUcAGcAAcAcAuAuACcAuu^a^a | 146 |

TABLE 19

| Double strand ID | Encapsulation efficiency | Average particle size (nm) | Polydispersity index |
|---|---|---|---|
| Mock | >90% | 92 | 0.06 |
| siRNA-008-34 | >90% | 88 | 0.1 |

TABLE 20

| Double strand ID | siRNA (mg/kg) | Complement activity (n = 3, average) 5 days after administration | 9 days after administration |
|---|---|---|---|
| PBS | — | 106% | Not tested |
| Mock | 1 | 130% | 126% |
| siRNA-008-34 | 1 | 2% | 6% |
| siRNA-008-34 | 3 | 2% | 0% |

(In-Vivo Evaluation)

LNPs encapsulating PBS or siRNA listed in Table 18 therein were intravenously administered to a BALB/c mouse (male, 6 weeks old, n=3 per group) from the tail vein at a dose of 1 to 3 mg/kg siRNA, and the blood was sampled under anesthesia 5 days and 9 days after the administration. The blood sampled on each sampling day was placed in a blood separator tube containing clot activator (Immuno-Biological Laboratories Co, Ltd., Cat #31203) and centrifuged at 3000 rpm for 15 minutes, and then the serum as the supernatant was collected and stored at −80° C. Thereafter, the complement activity in the serum was quantified in the following manner Specifically, sheep erythrocytes with a concentration of $1.5 \times 10^8$ cells/mL were prepared by using a serum complement titer CH50 kit (DENKA SEIKEN Co., Ltd., Cat #400017) in accordance with a protocol provided by the manufacturer. Subsequently, zymosan (Wako Pure Chemical Industries, Ltd., Cat #263-01491) was prepared so as at a dose of 20 µg/mL with a diluting medium attached to the serum complement titer CH50 kit. The sample serum was diluted 40-fold with the same diluting medium. The sheep erythrocytes, the zymosan, and the diluted serum sample each in a volume of 50 µL were mixed together, and the mixture was incubated at 37° C. overnight. On the next day, the assay plate was centrifuged at 2000 rpm at room temperature for 10 minutes, and the absorbance of the supernatant was then measured at 405 nm. Values for the samples as the complement activity in the serum on the day before the administration to each individual was defined as 100% are shown in Table 20.

Example 8: Pharmacological Test (Hemolysis-Suppressing Effect with Single Administration)

(Preparation of siRNA-LNPs)

LNPs encapsulating siRNA therein were prepared in the same manner as in Example 3, except that siRNAs listed in Table 21 were used. Results of evaluation of product quality for the prepared LNPs are shown in Table 22.

TABLE 21

| Double strand ID | Numbers of nucleotides in sense strand/ antisense strand | Sense strand Sequence (5'→3') | SEQ ID NO | Antisense strand Sequence (5'→3') | SEQ ID NO |
|---|---|---|---|---|---|
| SiRNA-008-34 | 19/23 | uGGuAuAuGuGuuGCuGAu | 145 | AUcAGcAAcAcAuAuACcAuu^a^a | 146 |

TABLE 22

| Double strand ID | Encapsulation efficiency | Average particle size (nm) | Polydispersity index |
|---|---|---|---|
| siRNA-008-34 | >90% | 92 | 0.09 |

(In-Vivo Evaluation)

Figure 3:
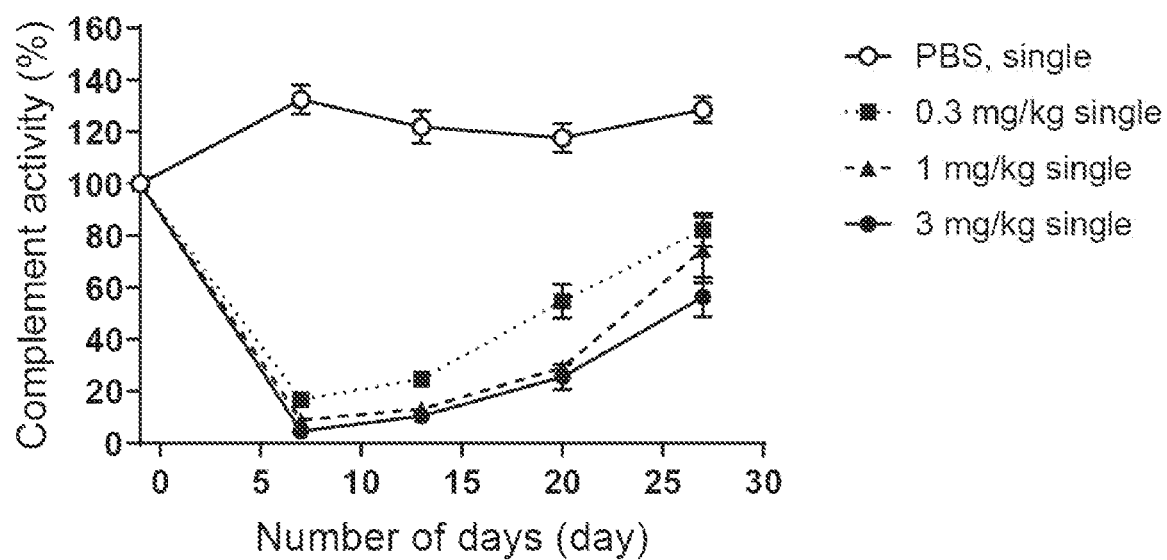
FIG. 3 shows a graph representing results of complement activity after administration of siRNA-008-34 in Example 8.

LNPs encapsulating PBS or siRNA listed in Table 21 therein were intravenously administered to a BALB/c mouse (male, 7 weeks old, n=4 per group) from the tail vein at a dose of 0.3, 1 and 3 mg/kg siRNA. The blood was sampled under anesthesia on the day before the administration (−1 Day in Table 23), and 7 days, 13 days, 20 days and 27 days after the administration. The blood sampled on each sampling day was placed in a blood separator tube containing clot activator (Immuno-Biological Laboratories Co, Ltd., Cat #31203) and centrifuged at 3000 rpm for 15 minutes, and then the serum as the supernatant was collected and stored at −80° C. Thereafter, the complement activity in the serum was quantified in the following manner. Specifically, sheep erythrocytes with a concentration of $1.5 \times 10^8$ cells/mL were prepared by using a serum complement titer CH50 kit (DENKA SEIKEN Co., Ltd., Cat #400017) in accordance with a protocol provided by the manufacturer. Subsequently, zymosan (Wako Pure Chemical Industries, Ltd., Cat #263-01491) was prepared so as to achieve a dose of 20 μg/mL with a diluting medium attached to the serum complement titer CH50 kit. The sample serum was diluted 40-fold with the same diluting medium. The sheep erythrocytes, the zymosan, and the diluted serum sample each in a volume of 50 μL were mixed together, and the mixture was incubated at 37° C. overnight. On the next day, the assay plate was centrifuged at 2000 rpm at room temperature for 10 minutes, and the absorbance of the supernatant was then measured at 405 nm. Values for the samples as the complement activity in the serum on the day before the administration to each individual was defined as 100% are shown in Table 23. Complement activity from 1 mouse in 1 mg/kg group was excluded because it was seemed to be outlier. Therefore, the value of 1 mg/kg group in Table 23 is shown as the average of 3 mice. The values of PBS group, 0.3 mg/kg group and 3 mg/kg group in Table 23 are shown as the average of 4 mice. The results are also shown in FIG. 3.

TABLE 23

| Double strand ID | siRNA (mg/kg) | Complement activity (average) | | | | |
|---|---|---|---|---|---|---|
| | | −1 Day | 7 Day | 13 Day | 20 Day | 27 Day |
| PBS | — | 100% | 133% | 122% | 118% | 129% |
| siRNA-008-34 | 0.3 | 100% | 7% | 25% | 55% | 82% |
| siRNA-008-34 | 1 | 100% | 9% | 13% | 29% | 75% |
| siRNA-008-34 | 3 | 100% | 5% | 10% | 26% | 56% |

Example 9: Pharmacological Test
(Hemolysis-Suppressing Effect with Bi-Weekly Administration)

(Preparation of siRNA-LNPs)

LNPs encapsulating siRNA therein were prepared in the same manner as in Example 8.

(In-Vivo Evaluation)

Figure 4:
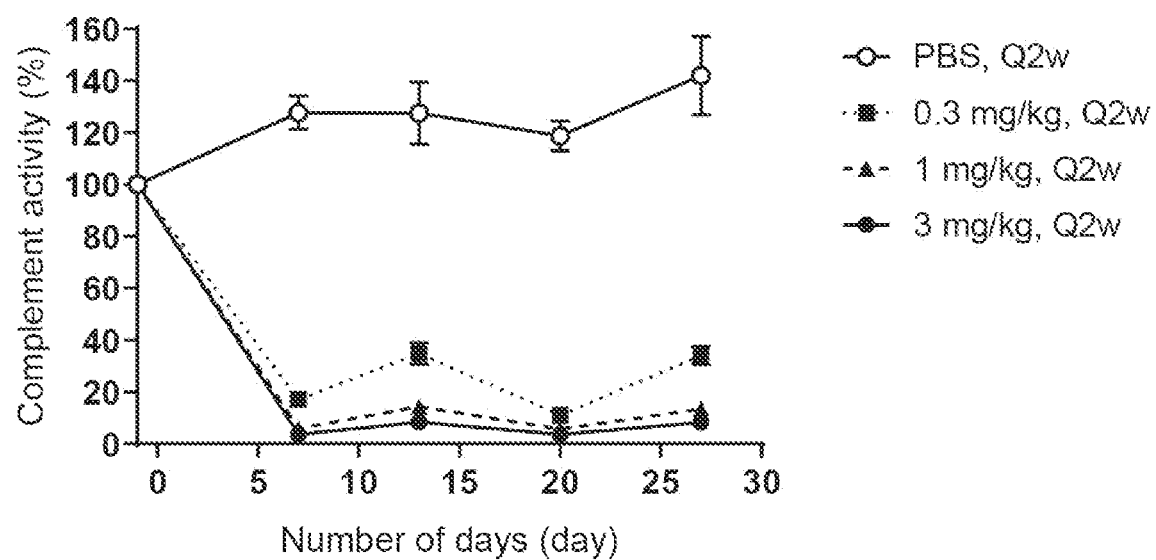
FIG. 4 shows a graph representing results of complement activity after administration of siRNA-008-34 in Example 9.

LNPs encapsulating PBS or siRNA listed in Table 21 of Example 8 therein were intravenously administered to a BALB/c mouse (male, 7 weeks old, n=4 per group) from the tail vein at a dose of 0.3, 1 and 3 mg/kg siRNA bi-weekly. The blood was sampled under anesthesia on the day before the administration (−1 Day in Table 24), and 7 days, 13 days, 20 days and 27 days after the administration. The blood sampled on each sampling day was placed in a blood separator tube containing clot activator (Immuno-Biological Laboratories Co, Ltd., Cat #31203) and centrifuged at 3000 rpm for 15 minutes, and then the serum as the supernatant was collected and stored at −80° C. Thereafter, the complement activity in the serum was quantified in the following manner Specifically, sheep erythrocytes with a concentration of $1.5 \times 10^8$ cells/mL were prepared by using a serum complement titer CH50 kit (DENKA SEIKEN Co., Ltd., Cat #400017) in accordance with a protocol provided by the manufacturer. Subsequently, zymosan (Wako Pure Chemical Industries, Ltd., Cat #263-01491) was prepared so as to achieve a dose of 20 μg/mL with a diluting medium attached to the serum complement titer CH50 kit. The sample serum was diluted 40-fold with the same diluting medium. The sheep erythrocytes, the zymosan, and the diluted serum sample each in a volume of 50 μL were mixed together, and the mixture was incubated at 37° C. overnight. On the next day, the assay plate was centrifuged at 2000 rpm at room temperature for 10 minutes, and the absorbance of the supernatant was then measured at 405 nm. Values for the samples as the complement activity in the serum on the day before the administration to each individual was defined as 100% are shown in Table 24. The results are also shown in FIG. 4.

TABLE 24

| Double strand ID | siRNA (mg/kg) | Complement activity (n = 4, average) | | | | |
|---|---|---|---|---|---|---|
| | | −1 Day | 7 Day | 13 Day | 20 Day | 27 Day |
| PBS | — | 100% | 128% | 128% | 119% | 142% |
| siRNA-008-34 | 0.3 | 100% | 17% | 35% | 11% | 34% |
| siRNA-008-34 | 1 | 100% | 6% | 14% | 6% | 13% |
| siRNA-008-34 | 3 | 100% | 4% | 8% | 4% | 8% |

Example 10: Pharmacological Test
(Hemolysis-Suppressing Effect with Bi-Weekly Administration)

(Preparation of siRNA-LNPs)

LNPs encapsulating siRNA therein were prepared in the same manner as in Example 8.

(In-Vivo Evaluation)

Figure 5:
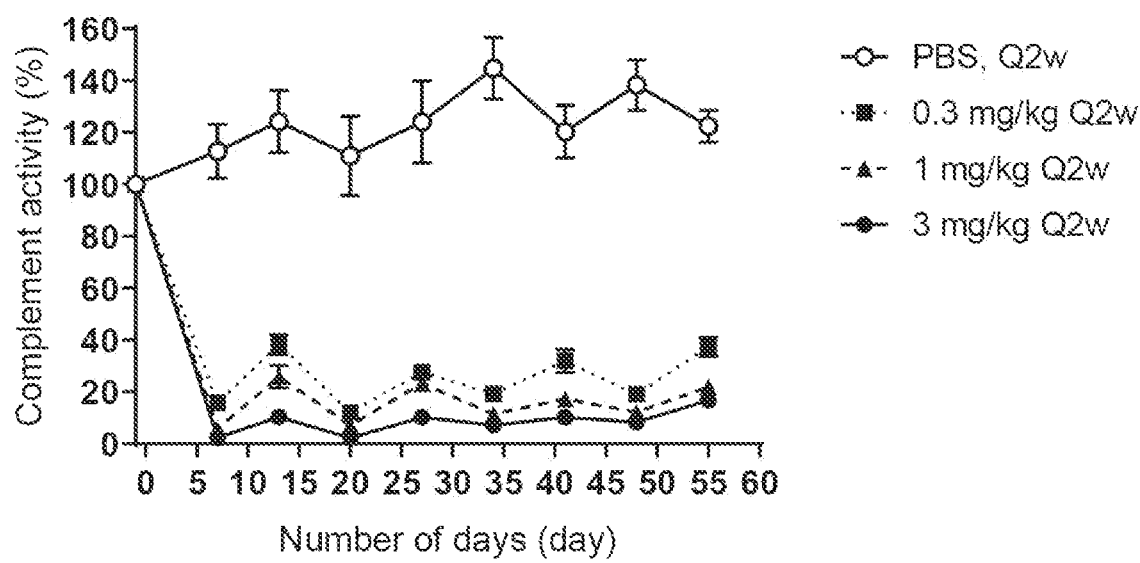
FIG. 5 shows a graph representing results of complement activity after administration of siRNA-008-34 in Example 10.

LNPs encapsulating PBS or siRNA listed in Table 21 of Example 8 therein were intravenously administered to a BALB/c mouse (male, 7 weeks old, n=4 per group) from the tail vein at a dose of 0.3, 1 and 3 mg/kg siRNA bi-weekly. The blood was sampled under anesthesia on the day before the administration (−1 Day in Table 25), and 7 days, 13 days, 20 days, 27 days, 34 days, 41 days, 48 days and 55 days after the administration. The blood sampled on each sampling day was placed in a blood separator tube containing clot activator (Immuno-Biological Laboratories Co, Ltd., Cat #31203) and centrifuged at 3000 rpm for 15 minutes, and then the serum as the supernatant was collected and stored at −80° C. Thereafter, the complement activity in the serum was quantified in the following manner. Specifically, sheep erythrocytes with a concentration of $1.5 \times 10^8$ cells/mL were prepared by using a serum complement titer CH50 kit (DENKA SEIKEN Co., Ltd., Cat #400017) in accordance with a protocol provided by the manufacturer. Subsequently, zymosan (Wako Pure Chemical Industries, Ltd., Cat #263-01491) was prepared so as to achieve a dose of 20 μg/mL with a diluting medium attached to the serum complement titer CH50 kit. The sample serum was diluted 40-fold with the same diluting medium. The sheep erythrocytes, the zymosan, and the diluted serum sample each in a volume of 50 μL were mixed together, and the mixture was incubated at 37° C. overnight. On the next day, the assay plate was centrifuged at 2000 rpm at room temperature for 10 minutes, and the absorbance of the supernatant was then measured at 405 nm. Values for the samples as the complement activity in the serum on the day before the administration to each individual was defined as 100% are shown in Table 25. The results are also shown in FIG. 5.

TABLE 25

| Double strand ID | siRNA (mg/kg) | Complement activity (n = 4, average) | | | | |
|---|---|---|---|---|---|---|
| | | −1 Day | 7 Day | 13 Day | 20 Day | 27 Day |
| PBS | — | 100% | 113% | 124% | 111% | 124% |
| siRNA-008-34 | 0.3 | 100% | 16% | 38% | 12% | 27% |
| siRNA-008-34 | 1 | 100% | 6% | 26% | 7% | 23% |
| siRNA-008-34 | 3 | 100% | 2% | 10% | 2% | 10% |

| Double strand ID | siRNA (mg/kg) | 34 Day | 41 Day | 48 Day | 55 Day |
|---|---|---|---|---|---|
| PBS | — | 145% | 120% | 138% | 122% |
| siRNA-008-34 | 0.3 | 19% | 32% | 19% | 37% |
| siRNA-008-34 | 1 | 11% | 17% | 12% | 22% |
| siRNA-008-34 | 3 | 7% | 10% | 8% | 17% |

Example 11: Pharmacological Test
(Hemolysis-Suppressing Effect with Administration Once Every Three Weeks)

(Preparation of siRNA-LNPs)

LNPs encapsulating siRNA therein were prepared in the same manner as in Example 8.

(In-Vivo Evaluation)

Figure 6:
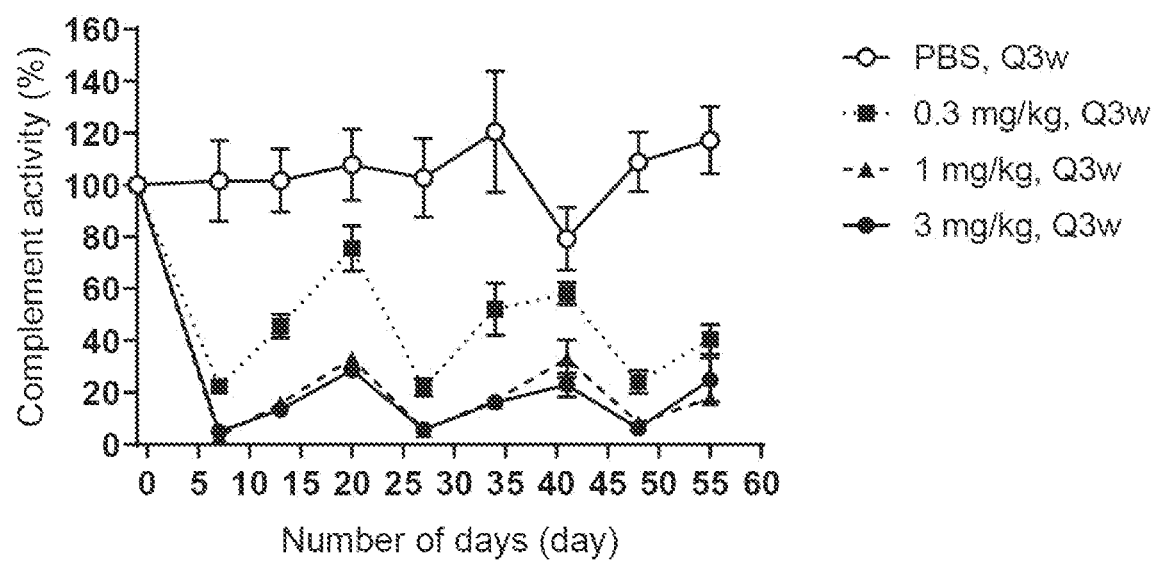
FIG. 6 shows a graph representing results of complement activity after administration of siRNA-008-34 in Example 11.

LNPs encapsulating PBS or siRNA listed in Table 21 of Example 8 therein were intravenously administered to a BALB/c mouse (male, 7 weeks old, n=4 per group) from the tail vein at a dose of 0.3, 1 and 3 mg/kg siRNA once every three weeks. The blood was sampled under anesthesia on the day before the administration (−1 Day in Table 26), and 7 days, 13 days, 20 days, 27 days, 34 days, 41 days, 48 days and 55 days after the administration. The blood sampled on each sampling day was placed in a blood separator tube containing clot activator (Immuno-Biological Laboratories Co, Ltd., Cat #31203) and centrifuged at 3000 rpm for 15 minutes, and then the serum as the supernatant was collected and stored at −80° C. Thereafter, the complement activity in the serum was quantified in the following manner. Specifically, sheep erythrocytes with a concentration of $1.5 \times 10^8$ cells/mL were prepared by using a serum complement titer CH50 kit (DENKA SEIKEN Co., Ltd., Cat #400017) in accordance with a protocol provided by the manufacturer. Subsequently, zymosan (Wako Pure Chemical Industries, Ltd., Cat #263-01491) was prepared so as to achieve a dose of 20 μg/mL with a diluting medium attached to the serum complement titer CH50 kit. The sample serum was diluted 40-fold with the same diluting medium. The sheep erythrocytes, the zymosan, and the diluted serum sample each in a volume of 50 μL were mixed together, and the mixture was incubated at 37° C. overnight. On the next day, the assay plate was centrifuged at 2000 rpm at room temperature for 10 minutes, and the absorbance of the supernatant was then measured at 405 nm. Values for the samples as the complement activity in the serum on the day before the administration to each individual was defined as 100% are shown in Table 26. The results are also shown in FIG. 6.

TABLE 26

| Double strand ID | siRNA (mg/kg) | Complement activity (n = 4, average) | | | | |
|---|---|---|---|---|---|---|
| | | −1 Day | 7 Day | 13 Day | 20 Day | 27 Day |
| PBS | — | 100% | 102% | 102% | 108% | 103% |
| siRNA-008-34 | 0.3 | 100% | 22% | 45% | 75% | 22% |
| siRNA-008-34 | 1 | 100% | 3% | 16% | 33% | 6% |
| siRNA-008-34 | 3 | 100% | 5% | 13% | 29% | 6% |

| Double strand ID | siRNA (mg/kg) | 34 Day | 41 Day | 48 Day | 55 Day |
|---|---|---|---|---|---|
| PBS | — | 120% | 79% | 109% | 117% |
| siRNA-008-34 | 0.3 | 52% | 58% | 24% | 40% |
| siRNA-008-34 | 1 | 17% | 33% | 8% | 18% |
| siRNA-008-34 | 3 | 16% | 23% | 6% | 25% |

Example 12: Physical Properties Test (Particle Diameter of siRNA-LNPs Under Variation of pH of LNP Solution)

siRNA-008-34 shown in Table 4 was dissolved in 10 mM sodium citrate (pH 4.0) to prepare diluted siRNA solution. Lipid solution was prepared by dissolving 2-{9-oxo-9-[(3-pentyloctyl)oxy]nonyl}dodecyl 1-methylpiperidine-4-carboxylate, DSPC (NIPPON FINE CHEMICAL CO., LTD.), Cholesterol (Dishman Carbogen Amcis Limited), and MPEG2000-DMG (NOF CORPORATION) at a mole ratio of 60/10.5/28/1.5 in ethanol. LNPs were obtained by mixing the diluted siRNA solution and the lipid solution at 3:1 of flow rates. The resulting LNP solution was subjected to substitution with PBS (pH 7.5) in accordance with a conventional method, and then the LNPs were concentrated. Aqueous hydrochloric acid or sodium hydroxide solution was added to the concentrate of the LNPs to adjust to pH 6.0 to 8.5. After the pH adjustment, the LNPs were stored in a cool place.

Results of measurement of the particle sizes of those LNPs by using a particle size analyzer (Malvern Panalytical Ltd., Zetasizer Nano ZS) are shown in Table 27.

TABLE 27

| | | Immediately after pH adjustment | After 18 days | After 1 month |
|---|---|---|---|---|
| pH 6.0 | Average particle size (nm) | 91.7 | 95.4 | 96.4 |
| | Polydispersity index | 0.05 | 0.04 | 0.04 |
| pH 6.5 | Average particle size (nm) | 91.0 | 97.6 | 99.3 |
| | Polydispersity index | 0.04 | 0.04 | 0.04 |
| pH 7.0 | Average particle size (nm) | 89.6 | 100.7 | 101.4 |
| | Polydispersity index | 0.05 | 0.05 | 0.02 |
| pH 7.5 | Average particle size (nm) | 89.3 | 90.8 | 88.1 |
| | Polydispersity index | 0.05 | 0.04 | 0.05 |
| pH 8.0 | Average particle size (nm) | 88.1 | 90.5 | 89.4 |
| | Polydispersity index | 0.06 | 0.05 | 0.07 |
| pH 8.5 | Average particle size (nm) | 88.2 | 90.1 | 89.4 |
| | Polydispersity index | 0.05 | 0.05 | 0.06 |

Example 13: Physical Properties Test (Particle Diameter of siRNA-LNPs Under Variation of pH of LNP Solution)

siRNA-008-34 shown in Table 4 was dissolved in 10 mM sodium citrate (pH 4.0) to prepare diluted siRNA solution. Lipid solution was prepared by dissolving 2-{9-oxo-9-[(3-pentyloctyl)oxy]nonyl}dodecyl 1-methylpiperidine-4-carboxylate, DSPC (NIPPON FINE CHEMICAL CO., LTD.), Cholesterol (Dishman Carbogen Amcis Limited), and MPEG2000-DMG (NOF CORPORATION) at a mole ratio of 60/10.5/28/1.5 in ethanol. LNPs were obtained by mixing the diluted siRNA solution and the lipid solution at 3:1 of flow rates. The resulting LNP solution was subjected to substitution with PBS (pH 7.5) in accordance with a conventional method, and then the LNPs were concentrated. Aqueous hydrochloric acid or sodium hydroxide solution was added to the concentrate of the LNPs to adjust to pH 6.5 to 8.5. After the pH adjustment, the LNPs were stored in a cool place (5° C.).

Results of measurement of the particle sizes of those LNPs by using a particle size analyzer (NICOMP380) are shown in Table 28. The LNPs at each pH had an appearance of homogeneous solution with opalescence of white or yellowish white color as a feature, and no change was found from immediately after the pH adjustment to after storage for 1 month.

TABLE 28

|  |  | Immediately after pH adjustment | After 2 weeks | After 1 month |
|---|---|---|---|---|
| pH 6.5 | Average particle size (nm) | 93.2 | 93.8 | 94.5 |
|  | Polydispersity index | 0.054 | 0.041 | 0.048 |
| pH 7.0 | Average particle size (nm) | 92.9 | 99.2 | 100.5 |
|  | Polydispersity index | 0.056 | 0.045 | 0.043 |
| pH 7.5 | Average particle size (nm) | 92.6 | 91.0 | 91.1 |
|  | Polydispersity index | 0.050 | 0.056 | 0.058 |
| pH 8.0 | Average particle size (nm) | 92.0 | 91.4 | 91.4 |
|  | Polydispersity index | 0.054 | 0.054 | 0.055 |
| pH 8.5✕ | Average particle size (nm) | 92.2 | 91.9 | 92.0 |
|  | Polydispersity index | 0.055 | 0.049 | 0.049 |

*The pH of the LNP solution was adjusted so as to reach pH 8.5, but the actual measurement immediately after the adjustment was pH 8.3. The pH after storage for 1 month was pH 8.2.

Example 14: Physical Properties Test (Particle Diameter of siRNA-LNPs Under Variation of pH of LNP Solution)

siRNA-008-34 shown in Table 4 was dissolved in 10 mM sodium citrate (pH 4.0) to prepare diluted siRNA solution. Lipid solution was prepared by dissolving 2-{9-oxo-9-[(3-pentyloctyl)oxy]nonyl}dodecyl 1-methylpiperidine-4-carboxylate, DSPC (NIPPON FINE CHEMICAL CO., LTD.), Cholesterol (Dishman Carbogen Amcis Limited), and MPEG2000-DMG (NOF CORPORATION) at a mole ratio of 60/10.5/28/1.5 in ethanol. LNPs were obtained by mixing the diluted siRNA solution and the lipid solution at 3:1 of flow rates. The resulting LNP solution was subjected to substitution with PBS (pH 7.5) in accordance with a conventional method, and then the LNPs were concentrated. Aqueous hydrochloric acid or sodium hydroxide solution was added to the concentrate of the LNPs to adjust to pH 6.5 to 8.5. After the pH adjustment, the LNPs were stored in a cool place (5° C.).

Results of measurement of the particle sizes of those LNPs by using a particle size analyzer (NICOMP380) are shown in Table 29.

TABLE 29

|  |  | After 3 months |
|---|---|---|
| pH 6.5 | Average particle size (nm) | 107.0 |
|  | Polydispersity index | 0.048 |
| pH 7.0 | Average particle size (nm) | 103.8 |
|  | Polydispersity index | 0.063 |
| pH 7.5 | Average particle size (nm) | 91.8 |
|  | Polydispersity index | 0.064 |

TABLE 29-continued

|  |  | After 3 months |
|---|---|---|
| pH 8.0 | Average particle size (nm) | 91.1 |
|  | Polydispersity index | 0.061 |
| pH 8.5 | Average particle size (nm) | 91.6 |
|  | Polydispersity index | 0.045 |

*1: The pH after storage for 3 months was pH 7.7.
*2: The pH after storage for 3 months was pH 7.9.

Example 15: Physical Properties Test (Particle Diameter of siRNA-LNPs Under Variation of pH of LNP Solution)

siRNA-008-34 shown in Table 4 was dissolved in 10 mM sodium citrate (pH 4.0) to prepare diluted siRNA solution. Lipid solution was prepared by dissolving 2-{9-oxo-9-[(3-pentyloctyl)oxy]nonyl}dodecyl 1-methylpiperidine-4-carboxylate, DSPC (NIPPON FINE CHEMICAL CO., LTD.), Cholesterol (Dishman Carbogen Amcis Limited), and MPEG2000-DMG (NOF CORPORATION) at a mole ratio of 60/10.5/28/1.5 in ethanol. LNPs were obtained by mixing the diluted siRNA solution and the lipid solution at 3:1 of flow rates. The resulting LNP solution was subjected to substitution with PBS (pH 7.5) in accordance with a conventional method, and then the LNPs were concentrated. Aqueous hydrochloric acid or sodium hydroxide solution was added to the concentrate of the LNPs to adjust to pH 6.5 to 8.5. After the pH adjustment, the LNPs were stored at room temperature (25° C.).

Results of measurement of the particle sizes of those LNPs by using a particle size analyzer (NICOMP380) are shown in Table 30.

TABLE 30

|  |  | Immediately after pH adjustment | After 2 weeks |
|---|---|---|---|
| pH 6.5 | Average particle size (nm) | 93.2 | 95.8 |
|  | Polydispersity index | 0.054 | 0.056 |
| pH 7.0 | Average particle size (nm) | 92.9 | 94.5 |
|  | Polydispersity index | 0.056 | 0.036 |
| pH 7.5 | Average particle size (nm) | 92.6 | 91.6 |
|  | Polydispersity index | 0.050 | 0.056 |
| pH 8.0 | Average particle size (nm) | 92.0 | 91.5 |
|  | Polydispersity index | 0.054 | 0.036 |
| pH 8.5✕ | Average particle size (nm) | 92.2 | 91.0 |
|  | Polydispersity index | 0.055 | 0.048 |

*The pH of the LNP solution was adjusted so as to reach pH 8.5, but the actual measurement immediately after the adjustment was pH 8.3.

Example 16: Physical Properties Test (Particle Diameter of siRNA-LNPs under Variation of pH of LNP Solution)

siRNA-008-34 shown in Table 4 was dissolved in 10 mM sodium citrate (pH 4.0) to prepare diluted siRNA solution. Lipid solution was prepared by dissolving 2-{9-oxo-9-[(3-pentyloctyl)oxy]nonyl}dodecyl 1-methylpiperidine-4-carboxylate, DSPC (Lipoid GmbH), Cholesterol (Dishman Carbogen Amcis Limited), and MPEG2000-DMG (NOF CORPORATION) at a mole ratio of 60/10.5/28/1.5 in ethanol. LNPs were obtained by mixing the diluted siRNA solution and the lipid solution at 3:1 of flow rates. The resulting LNP solution was subjected to substitution with PBS (pH 7.7) in accordance with a conventional method, and then the LNPs were concentrated. Subsequently, the concentrate of the LNPs was subjected to clarifying filtration and concentration adjustment, followed by filtration sterilization. The resulting LNP solution was applied to a dialysis membrane, and dialyzed with Britton-Robinson (BR) buffer solution at pH 2.0/5.0/9.0/10.0/11.0 under room temperature to obtain LNP solutions at different pH values. After the completion of the dialysis, the pH of each LNP solution was confirmed, and the LNP solution was defined as "Immediately after pH adjustment". After the pH adjustment, the LNP solutions were stored in a cool place (5° C.).

Results of measurement of the particle sizes of those LNPs by using a particle size analyzer (NICOMP380) are shown in Table 31.

TABLE 31

| | | Immediately after pH adjustment | After 2 weeks | After 1 month |
|---|---|---|---|---|
| pH 2.0 | Average particle size (nm) | 94.3 | 94.2 | 94.8 |
| | Polydispersity index | 0.02 | 0.02 | 0.03 |
| pH 5.0 | Average particle size (nm) | 92.9 | 93.4 | 93.5 |
| | Polydispersity index | 0.02 | 0.03 | 0.02 |
| pH 9.0 | Average particle size (nm) | 87.8 | 87.2 | 87.2 |
| | Polydispersity index | 0.02 | 0.02 | 0.03 |
| pH 10.0*1 | Average particle size (nm) | 88.6 | 87.0 | 90.0 |
| | Polydispersity index | 0.04 | 0.03 | 0.03 |
| pH 11.0*2 | Average particle size (nm) | 90.0 | 88.3 | 89.9 |
| | Polydispersity index | 0.03 | 0.01 | 0.02 |

*1: The pH after storage for 1 month was pH 9.7.
*2: The pH of the LNP solution was adjusted so as to reach pH 11.0, but the actual measurement immediately after the adjustment was pH 10.7. The pH after storage for 2 weeks was pH 10.5, and the pH after storage for 1 month was pH 10.3.

The invention claimed is:

1. A pharmaceutical composition comprising:
a lipid complex,
wherein the lipid complex comprises a double-stranded ribonucleic acid comprising a sense strand consisting of a nucleotide sequence set forth in SEQ ID NO: 145 and an antisense strand consisting of a nucleotide sequence set forth in SEQ ID NO: 146, and
a pH of a solution of the lipid complex is 5.0 or less or 7.5 or more.

2. The pharmaceutical composition according to claim 1, wherein the pH of the solution of the lipid complex is 2.0 or more and 5.0 or less, or 7.5 or more and 11.0 or less.

3. The pharmaceutical composition according to claim 1, wherein the pH of the solution of the lipid complex is 7.5 or more and 10.0 or less.

4. The pharmaceutical composition according to claim 1, wherein an average particle size of the lipid complex is 100 nm or less.

5. The pharmaceutical composition according to claim 1, wherein an average particle size of the lipid complex is 65 nm or more and 100 nm or less.

6. The pharmaceutical composition according to claim 1, wherein an average particle size of the lipid complex is 80 nm or more and 100 nm or less.

7. The pharmaceutical composition according to claim 1, wherein a change in an average particle size of the lipid complex after storage for 2 weeks is 10% or less from an average particle size of the lipid complex before the storage.

8. The pharmaceutical composition according to claim 7, wherein the change in the average particle size of the lipid complex is increase in the average particle size of the lipid complex.

9. The pharmaceutical composition according to claim 1, wherein the lipid complex comprises:
a cationic lipid; and
at least one lipid selected from the group consisting of neutral lipid, polyethylene glycol-modified lipid, and sterol.

10. The pharmaceutical composition according to claim 9, wherein the cationic lipid is 2-{9-oxo-9-[(3-pentyloctyl)oxy]nonyl}dodecyl 1-methylpiperidine-4-carboxylate.

11. The pharmaceutical composition according to claim 1, wherein the lipid complex is a lipid nanoparticle (LNP).

12. The pharmaceutical composition according to claim 1, wherein the lipid complex encapsulates a double-stranded ribonucleic acid comprising a combination of a sense strand and an antisense strand.

13. A method for treating paroxysmal nocturnal hemoglobinuria, comprising administering the pharmaceutical composition according to claim 1 to a patient in need thereof.

14. A method for treating atypical hemolytic uremic syndrome, comprising administering the pharmaceutical composition according to claim 1 to a patient in need thereof.

15. A method for producing the pharmaceutical composition according to claim 1, comprising:
adjusting the pH of the solution of the lipid complex to 5.0 or less, or 7.5 or more.

16. The method according to claim 15, comprising:
adjusting the pH of the solution of the lipid complex to 2.0 or more and 5.0 or less, or 7.5 or more and 11.0 or less.

17. A method for stabilizing the pharmaceutical composition according to claim 1, comprising:
adjusting the pH of the solution of the lipid complex to 5.0 or less, or 7.5 or more.

18. The method according to claim 17, comprising:
adjusting the pH of the solution of the lipid complex to 2.0 or more and 5.0 or less, or 7.5 or more and 11.0 or less.

19. The method according to claim 17, wherein the method for stabilizing the pharmaceutical composition is a method of suppressing a change in an average particle size of the lipid complex in the pharmaceutical composition.

20. The method according to claim 19, wherein the method of suppressing the change in the average particle size is a method of suppressing increase in the average particle size.

* * * * *